(12) United States Patent
Guo et al.

(10) Patent No.: US 10,440,882 B2
(45) Date of Patent: Oct. 15, 2019

(54) GRASS TRIMMER, OPERATING METHOD THEREOF AND CONTROL METHOD THEREOF

(71) Applicants: NANJING CHERVON INDUSTRY CO., LTD., Nanjing (CN); CHERVON (HK) LIMITED, Hong Kong (CN)

(72) Inventors: Jianpeng Guo, Nanjing (CN); Maohui Li, Nanjing (CN); Fangjie Nie, Nanjing (CN); Toshinari Yamaoka, Nanjing (CN)

(73) Assignees: Nanjing Chervon Industry Co., LTD., Nanjing (CN); Chervon (HK) Limited, Hong Kong (CN)

(*) Notice: Subject to any disclaimer, the term of this patent is extended or adjusted under 35 U.S.C. 154(b) by 0 days.

(21) Appl. No.: 15/994,548

(22) Filed: May 31, 2018

(65) Prior Publication Data

US 2018/0271012 A1    Sep. 27, 2018

Related U.S. Application Data

(63) Continuation-in-part of application No. 15/839,257, filed on Dec. 12, 2017, now Pat. No. 10,264,725, and
(Continued)

(30) Foreign Application Priority Data

Jan. 22, 2016 (CN) .......................... 2016 1 0044465
Aug. 1, 2016 (CN) .......................... 2016 1 0626524
Oct. 7, 2016 (CN) .......................... 2016 1 0875071

(51) Int. Cl.
*A01D 34/416*    (2006.01)
*A01D 34/00*    (2006.01)

(52) U.S. Cl.
CPC ....... *A01D 34/4166* (2013.01); *A01D 34/006* (2013.01)

(58) Field of Classification Search
CPC ................ A01D 34/412; A01D 34/416; A01D 34/4161; A01D 34/4162; A01D 34/4163
See application file for complete search history.

(56) References Cited

U.S. PATENT DOCUMENTS 4,195,408 A * 4/1980 Palmieri ............ A01D 34/4161
                                                              30/276
4,959,904 A * 10/1990 Proulx ............... A01D 34/4163
                                                              30/276
(Continued)

FOREIGN PATENT DOCUMENTS

CN          2737757 Y      11/2005
CN        201097498 Y       8/2008
(Continued)

OTHER PUBLICATIONS

Written Opinion issued by International Bureau dated Mar. 14, 2017 for International Application PCT/CN2016/110351.
(Continued)

*Primary Examiner* — Jason Daniel Prone
*Assistant Examiner* — Richard D Crosby, Jr.
(74) *Attorney, Agent, or Firm* — Finnegan, Henderson, Farabow, Garrett & Dunner, LLP

(57) ABSTRACT

A grass trimmer includes a trimming head, a driving device for driving the trimming head to rotate so as to cut vegetation and an operating device for a user to operate so as to control the driving device. The trimming head includes a spool and a line holding member, the spool is used to wind a cutting line, and the line holding member is formed with a line holding structure. The driving device includes a motor. The grass trimmer has an auto-winding mode. In the auto-winding mode, the motor drives at least one of the spool and
(Continued)

the line holding member to make the spool and the line holding member rotate relatively so that the cutting line is wound on the spool automatically.

29 Claims, 63 Drawing Sheets

Related U.S. Application Data a continuation of application No. PCT/CN2016/110351, filed on Dec. 16, 2016.

(56) References Cited

U.S. PATENT DOCUMENTS

| | | | | |
|---|---|---|---|---|
| 6,487,780 B1* | 12/2002 | Peterson | ............ | A01D 34/4162 30/276 |
| 2005/0076515 A1* | 4/2005 | Proulx | ............... | A01D 34/4163 30/276 |
| 2005/0217120 A1* | 10/2005 | Proulx | ................ | A01D 34/416 30/276 |
| 2008/0047148 A1* | 2/2008 | Proulx | ................ | A01D 34/416 30/276 |
| 2008/0052917 A1* | 3/2008 | Proulx | ................ | A01D 34/416 30/276 |
| 2014/0190017 A1* | 7/2014 | Maynez | .................... | B25F 5/00 30/276 |
| 2015/0121707 A1* | 5/2015 | Li | ...................... | A01D 34/4161 30/276 |
| 2015/0342116 A1 | 12/2015 | Sprungman et al. | | |
| 2018/0098492 A1 | 4/2018 | Guo et al. | | |
| 2018/0098493 A1* | 4/2018 | Sergyeyenko | ......... | G16H 10/20 |
| 2018/0271012 A1* | 9/2018 | Guo | ................... | A01D 34/4166 |

FOREIGN PATENT DOCUMENTS

| | | |
|---|---|---|
| CN | 101816241 A | 9/2010 |
| CN | 203399522 U | 1/2014 |
| CN | 203633147 U | 6/2014 |
| CN | 204539943 U | 8/2015 |
| CN | 106993426 A | 8/2017 |
| JP | 2015-181475 A | 10/2015 |
| WO | WO2017/124865 A1 | 7/2017 |

OTHER PUBLICATIONS

International Search Report issued by International Bureau dated Mar. 14, 2017 for International Application PCT/CN2016/110351.
Notice of Reasons for Refusal issued by Japan Patent Office (JPO) dated Jul. 30, 2019 for the counterpart Japanese Application No. JP 2019-506898A, and English translation thereof.

\* cited by examiner

GRASS TRIMMER, OPERATING METHOD THEREOF AND CONTROL METHOD THEREOF

RELATED APPLICATION INFORMATION

The present application claims the benefits of priority to International Application Number PCT/CN2016/110351, filed on Dec. 16, 2016, which is based upon and claims priority to Chinese Patent Application No. 201610044465.6, filed on Jan. 22, 2016, Chinese Patent Application No. 201610626524.0, filed on Aug. 1, 2016, and Chinese Patent Application No. 201610875071.5, filed on Oct. 7, 2016. The present application also claims priority to U.S. application Ser. No. 15/839,257, filed Dec. 12, 2017. The contents of the above-referenced applications are incorporated herein by reference in their entireties.

FIELD OF THE DISCLOSURE

The present disclosure relates generally to grass trimmers and, more particularly, to a grass trimmer having an auto-winding mode, an operating method thereof and a control method thereof.

BACKGROUND OF THE DISCLOSURE

Grass trimmers are a kind of gardening tools, which are used to trim the lawn. The grass trimmer includes a trimming head. The trimming head rotates at high speed to drive a cutting line mounted thereon to rotate so as to realize the cutting function.

The trimming head includes a spool allowing the cutting line to wind thereon. During the cutting operation, the cutting line is worn away gradually due to wear. After operating for a period, it is needed to change a new cutting line and wind the new cutting line around the spool. For the currently known cutting line, a user needs to rotate the spool manually to wind the cutting line around the spool. The winding operation is inconvenient and the winding speed is slow.

SUMMARY

To solve the shortcomings of the related art, the purpose of this disclosure is to provide a grass trimmer with auto-winding mode and method for its operation and control method.

Embodiments of the disclosure provide a grass trimmer. The grass trimmer can include: a trimming head; a driving device for driving the trimming head to rotate so as to cut vegetation; and an operating device for a user to operate so as to control the driving device. The trimming head includes a spool and a line holding member, the spool is used to wind a cutting line, and the line holding member is formed with a line holding structure allowing the cutting line to pass through or bypass, the driving device includes a motor, the grass trimmer has an auto-winding mode, in the auto-winding mode, the motor drives at least one of the spool and the line holding member to make the spool and the line holding member rotate relatively so that the cutting line is wound on the spool automatically.

In some embodiments, the operating device includes a first operating element for starting the motor, and a second operating element for the user to operate so as to choose the auto-winding mode.

In some embodiments, the operating device includes a first operating element for starting the motor so that the motor runs in a first running state and a second operating element for starting the motor so that the motor runs in a second running state.

In some embodiments, the rotation direction of the motor in the first running state is different from the rotation direction of the motor in the second running state.

In some embodiments, the rotation speed of the motor in the first running state is different from the rotation speed of the motor in the second running state.

In some embodiments, the operating device comprises: a first operating element having a first preset operating state, a second operating element having a second preset operating state, wherein when the first operating element and the second operating element are in the first preset operating state and the second preset operating state respectively, the grass trimmer can start the auto-winding mode.

In some embodiments, the operating device includes a first reset assembly for making the first operating element disengage the first preset operating state when the first operating element isn't operated.

In some embodiments, the operating device includes a second reset assembly for making the second operating element disengage the second preset operating state when the second operating element isn't operated.

In some embodiments, the grass trimmer includes a damping device for damping at least one of the spool and the line holding member so as to make the grass trimmer be in the auto-winding mode.

In some embodiments, the damping device includes a damping element for applying a resistance force on the spool to stop the spool from rotating.

In some embodiments, the damping device includes a damping element for applying a resistance force on the line holding member to damp the rotation of the line holding member.

In some embodiments, the damping device includes a first damping element for applying a first resistance force on the spool to damp the rotation of the spool, a second damping element for applying a second resistance force on the line holding member to damp the rotation of the line holding member.

In some embodiments, the damping device includes a damping element for stopping the spool from rotating in a first direction, and the line holding member is rotated in the first direction in the auto-winding mode.

In some embodiments, the damping device includes a damping element for stopping the line holding member from rotating in a second direction, and the spool is rotated in the second direction in the auto-winding mode.

In some embodiments, the line holding member is a head housing for accommodating the spool, the head housing is formed with outer apertures allowing the cutting line to pass through, and the spool is formed with inner apertures for fixing the cutting line or allowing the cutting line to pass through, wherein the grass trimmer has a cutting mode, in the cutting mode, the spool and the head housing are rotated synchronously, and when the cutting mode is finished, the outer apertures and the inner apertures are aligned automatically in a circumferential direction.

In some embodiments, the grass trimmer includes a line breaking device for cutting off the dotting line automatically in the auto-winding mode.

In some embodiments, the line breaking device includes a line breaking element, the trimming head is able to rotate relative to the line breaking element, and in the auto-winding mode, the trimming head drives the cutting line to pass the line breaking element so as to cut off the cutting line.

In some embodiments, the line breaking device includes a line breaking element, the trimming head and the line breaking element are rotated synchronously, and in the auto-winding mode, the trimming head drives the cutting line to close to the line breaking element so as to cut off the cutting line.

In some embodiments, the grass trimmer has a cutting mode, in the cutting mode, the trimming head and the line breaking element are rotated synchronously, the trimming head is rotated in a first direction in the cutting mode, and one of the spool and the line holding member is rotated relative to the other in a second direction in the auto-winding mode.

In some embodiments, the driving mechanism is in a first driving state in the cutting mode and in a second driving state in the auto-winding mode, the first driving state is different from the second driving state.

In some embodiments, the motor is rotated forwardly in the cutting mode and rotated reversely in the auto-winding mode.

In some embodiments, the motor is rotated at a first speed in the cutting mode and rotated at a second speed in the auto-winding mode, the first speed is different from the second speed.

In some embodiments, the motor is rotated forwardly at a higher first speed in the cutting mode and rotated reversely at a lower second speed in the auto-winding mode.

In some embodiments, a ratio between the first speed and the second speed is greater than or equal to 5 and less than or equal to 300.

In some embodiments, the grass trimmer includes: a detecting device being capable of detecting a physical parameter for determining whether the winding of the cutting line is finished, a controller for controlling the motor so as to make the grass trimmer exit the auto-winding mode according to electric signal of the detecting device.

In some embodiments, the detecting device is connected electrically with the motor detect current of the motor.

In some embodiments, the controller cuts off the power of the motor when the current of the motor is greater than a preset value.

In some embodiments, the controller cuts off the power of the motor when the current slope of the motor is greater than a preset value.

In some embodiments, the grass trimmer includes a magnetic element mounted on one of the spool and the line holding member, and the detecting device comprises a Hall sensor for detecting the magnetic element, wherein the controller determines the rotation speed of the magnetic element according to a signal of the Hall sensor, when the rotation speed of the magnetic element reaches a preset value, the grass trimmer exits the auto-winding mode.

In some embodiments, the grass trimmer includes a magnetic element mounted on one of the spool and the line holding member, and the detecting device comprises a Hall sensor for detecting the magnetic element, wherein the controller determines the rotation number of the magnetic element according to a signal of the Hall sensor, when the rotation number of the magnetic element reaches a preset value, the grass trimmer exits the auto-winding mode.

In some embodiments, the detecting device detects the rotation speed of the motor, and when the rotation speed of the motor reaches a preset value, the power of the motor is cut off.

In some embodiments, the detecting device detects the rotation number of the motor, and when the rotation number of the motor reaches a preset value, the power of the motor is cut off.

In some embodiments, the detecting device includes a position sensor for detecting the position of the cutting line.

Embodiments of the disclosure further provide an operating method for winding a cutting line of a grass trimmer. The method can include: providing the grass trimmer, the grass trimmer comprising a spool allowing the cutting line to be wound thereon, a line holding member being formed with a line holding structure allowing the cutting line to pass through or bypass and a motor being capable of driving at least one of the spool and the line holding member; making the cutting line pass through or bypass the line holding member and insert in the spool; and starting the motor to make the spool and the line holding member rotate relatively.

In some embodiments, the operating method further includes: switching off the motor to make the spool and the line holding member be relatively static.

In some embodiments, the motor can be started through operating an operating element disposed on the grass trimmer.

In some embodiments, the operating method further includes: switching off the motor to make the spool and the line holding member be relatively static, wherein the motor can be started through triggering an operating element disposed on the grass trimmer, and the motor can be switched off through releasing the operating element.

In some embodiments, the operating method further includes: switching off the motor to make the spool and the line holding member be relatively static, wherein the motor can be started through triggering an operating element disposed on the grass trimmer, and the motor can be switched off through triggering another operating element disposed on the grass trimmer.

In some embodiments, the operating method further includes: switching off the motor to make the spool and the line holding member be relatively static, wherein the motor can be started through triggering an operating element disposed on the grass trimmer, and the motor can be switched off through triggering the operating element again.

An operating method for winding a cutting line of a grass trimmer, comprising: making the cutting line pass through or bypass a line holding member disposed on the grass trimmer and insert in a spool disposed on the grass trimmer; and starting a motor to make the spool and the line holding member rotate relatively.

Embodiments of the disclosure further provide a control method for controlling winding of a cutting line of a grass trimmer, wherein the grass trimmer comprises: a spool allowing the cutting line to be wound thereon; a line holding member being formed with a line holding structure allowing the cutting line to pass through or bypass; and a motor being capable of driving at least one of the spool and the line holding member to make the spool and the line holding member rotate relatively. The control method can include: supplying power to the motor to make the spool and the line holding member rotate relatively.

In some embodiments, the grass trimmer supplies power to the motor when it is operated by a user.

In some embodiments, the motor is supplied power when an operating element disposed on the grass trimmer is triggered.

In some embodiments, the grass trimmer stops supplying power to the motor when an operating element disposed on the grass trimmer is released.

In some embodiments, the grass trimmer stops supplying power to the motor when another operating element disposed on the grass trimmer is triggered.

In some embodiments, the grass trimmer stops supplying power to the motor when the operating element is triggered again.

In some embodiments, the grass trimmer stops supplying power to the motor when the load slope of the motor is greater than a preset value.

In some embodiments, the power supplying of the motor lasts for a preset time.

In some embodiments, the motor is supplied different power so that the spool and the line holding member are rotated at a first relative speed and a second relative speed respectively.

In some embodiments, the first relative speed is less than a rotation speed of the spool when the grass trimmer cuts vegetation.

In some embodiments, the second relative speed is less than a rotation speed of the spool when the grass trimmer cuts vegetation.

The advantages of the present disclosure is that the grass trimmer has an auto-winding mode, the cutting line can be automatically wound to the spool under the action of the motor.

DETAILED DESCRIPTION

The following description of the preferred embodiments is merely exemplary in nature and is in no way intended to limit the scope of the disclosure hereinafter claimed, its application, or uses.

Figure 1A:
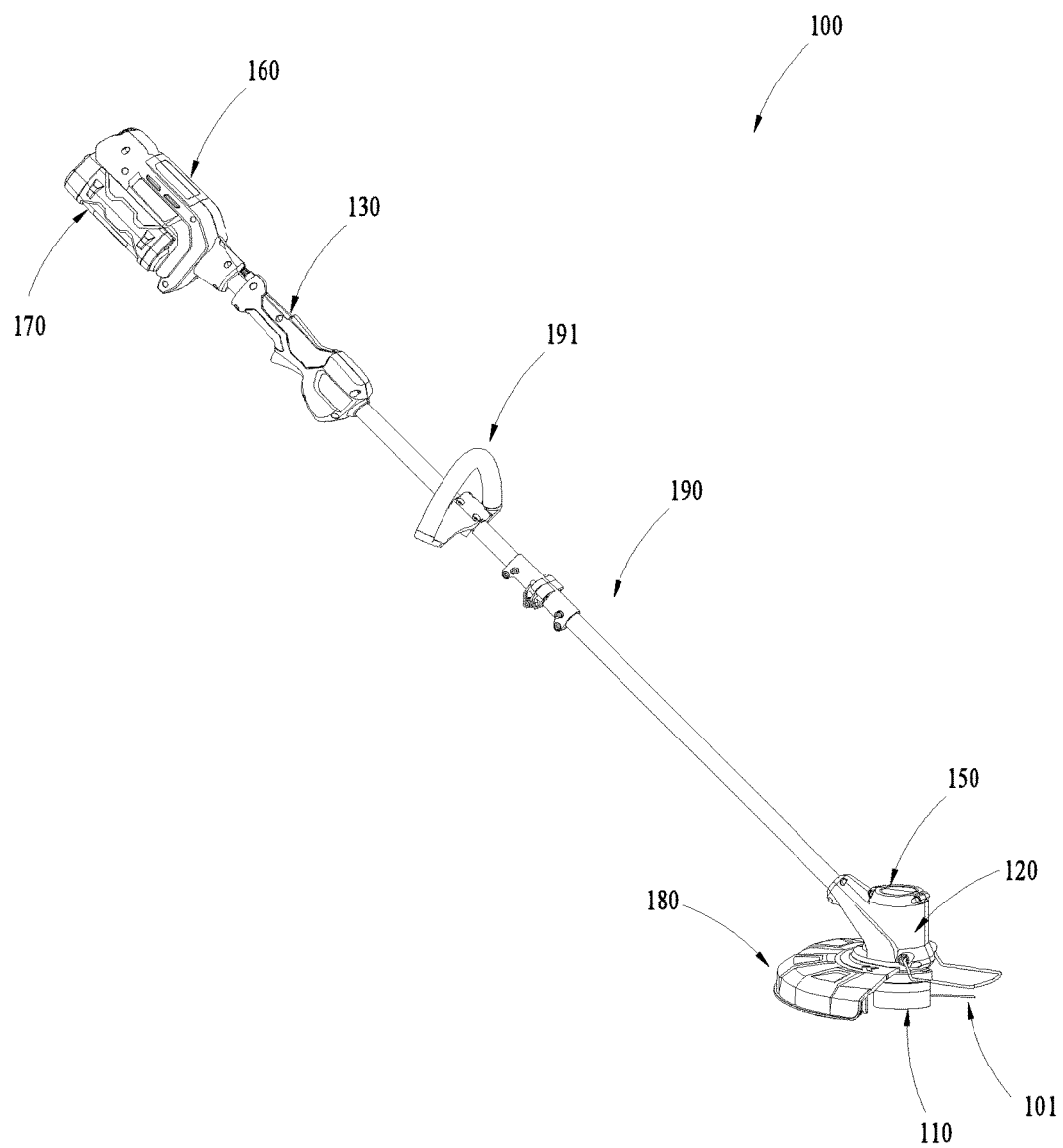
FIG. 1A is a schematic view of an exemplary grass trimmer.
Figure 1B:
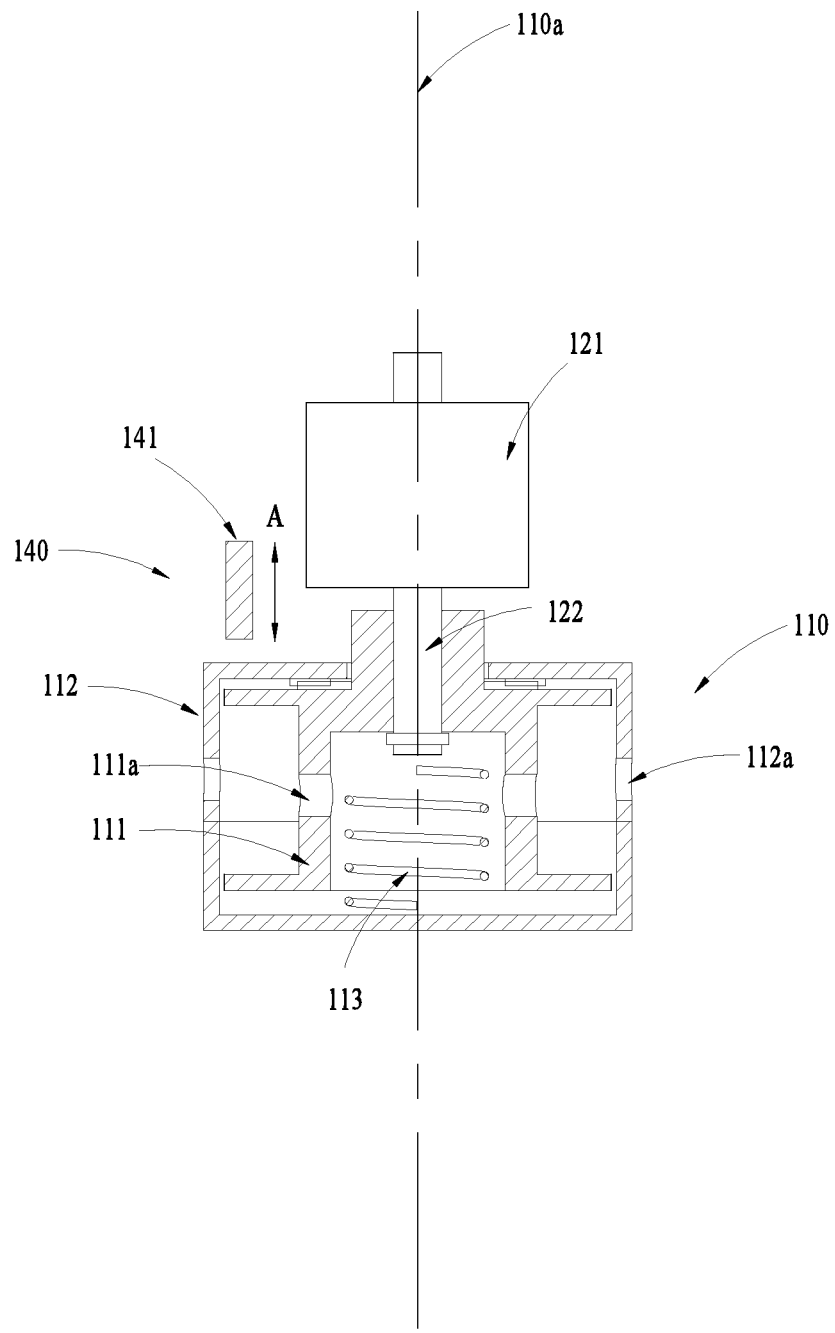
FIG. 1B a schematic view showing the structure of a part of the grass trimmer in FIG. 1A.
Figure 1C:
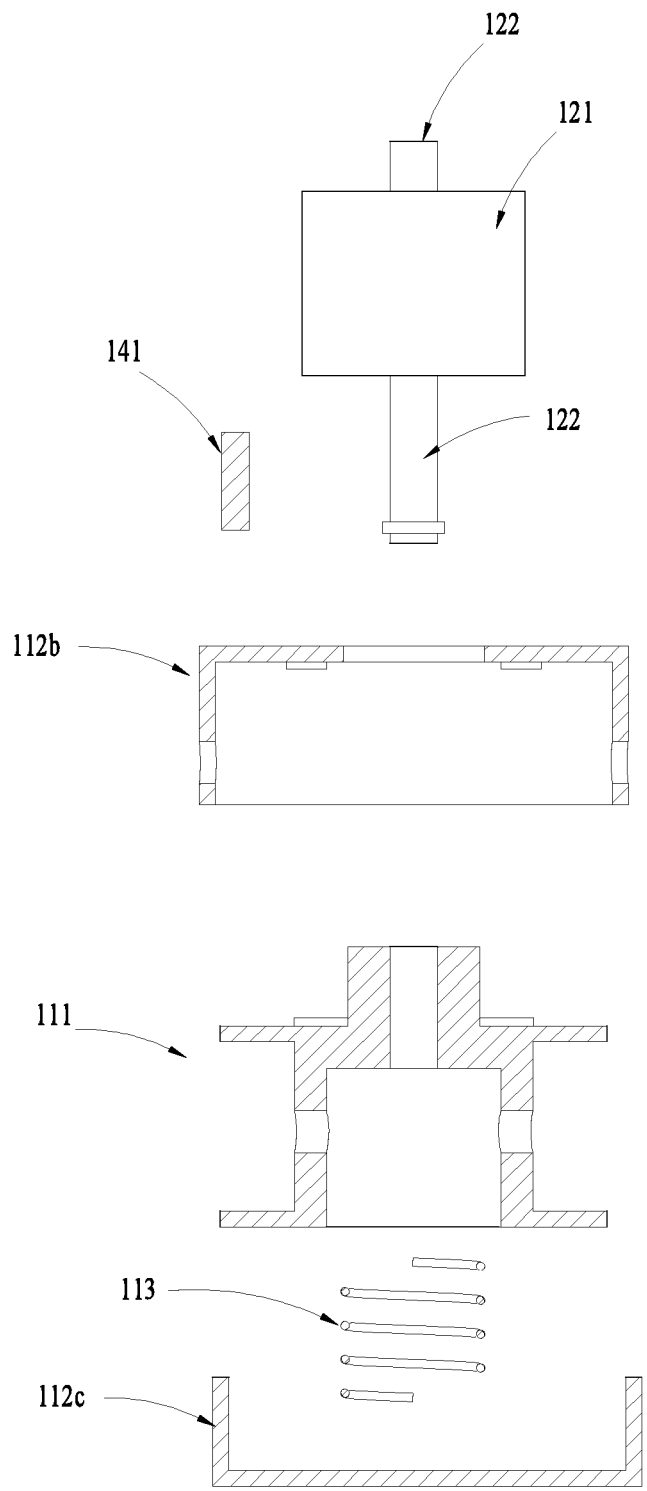
FIG. 1C is an exploded view of the structure in FIG. 1B.

Referring to FIGS. 1A-1C, a grass trimmer 100 includes a trimming head 110, a driving device 120 and an operating device 130.

The trimming head 110 is configured to mount and accommodate a cutting line 101. The cutting line 101 is partially accommodated in the trimming head 110. The cutting line 101 has a part extending out of the trimming head 110 which is used to cut vegetation when the trimming head 110 is rotated.

The driving device 120 can drive the trimming head 110 to rotate about an axis 110a so as to cut vegetation. The operating device 130 is used for a user to control the grass trimer 100.

For example, the driving device 120 can include a motor 121 and a driving shaft 122. The driving shaft 122 is connected with the trimming head 110 so as to drive the trimming head 110 to rotate.

The grass trimmer 100 further includes a first housing 150, a second housing 160 and a battery pack 170. The first housing 150 is configured to mount and accommodate the motor 121. The battery pack 170 acting as a power source at least can supply power to the grass trimmer 100. The second housing 160 is configured to engage with the battery pack 170 detachably.

A circuit board is accommodated in the second housing 160, which is connected with the motor 121 electrically so that the battery pack 170 can supply power to the motor 121 and control the motor 121. The first housing 150 and the second housing 160 are connected with each other through a connecting rod assembly 190. The operating device 130 is fixedly mounted on the connecting rod assembly 190. The grass trimmer 100 further includes an auxiliary handle 191 for the user to grip which is fixedly mounted on the connecting rod assembly 190.

The trimmer head 110 includes a spool 111 and a head housing 112. The spool 111 is accommodated in the head housing 112 for winding the cutting line 101. The spool 111 is formed with an inner aperture 111a. The head housing 112 is formed with an outer aperture 112a. As an example, the head housing 112 includes an upper cover 112b and a lower cover 112c, so that the head housing 112 is easy to assemble with the spool 111 and it is easy for the user to open the head housing 112 to check the inside of the head housing 112.

The trimmer head 110 includes a spring 113 which can apply a force between the head housing 112 and the spool 111. The force applied by the spring 113 makes the spool 111 depart from the lower cover 112c.

When it is needed to mount a new cutting line 101, the inner aperture 111a and the outer aperture 112a can be aligned, and then the cutting line 101 can be passed through the outer aperture 112a and entered into the inner aperture 111a. At this moment, as long as the spool 111 is moved relative to the head housing 112, the cutting line 101 can be wound on the spool 111 under the limiting action of the outer aperture 112a. The driving shaft 122 is connected with the head housing 112, which can drive the spool 111 to rotate about the axis 110a directly.

The spool 111 is connected rotatably with the head housing 112, which can rotate relative to the head housing 112. Meanwhile, the head housing 112 is able to move relative to the spool 111 in a direction parallel to the axis 110a.

Figure 1D:
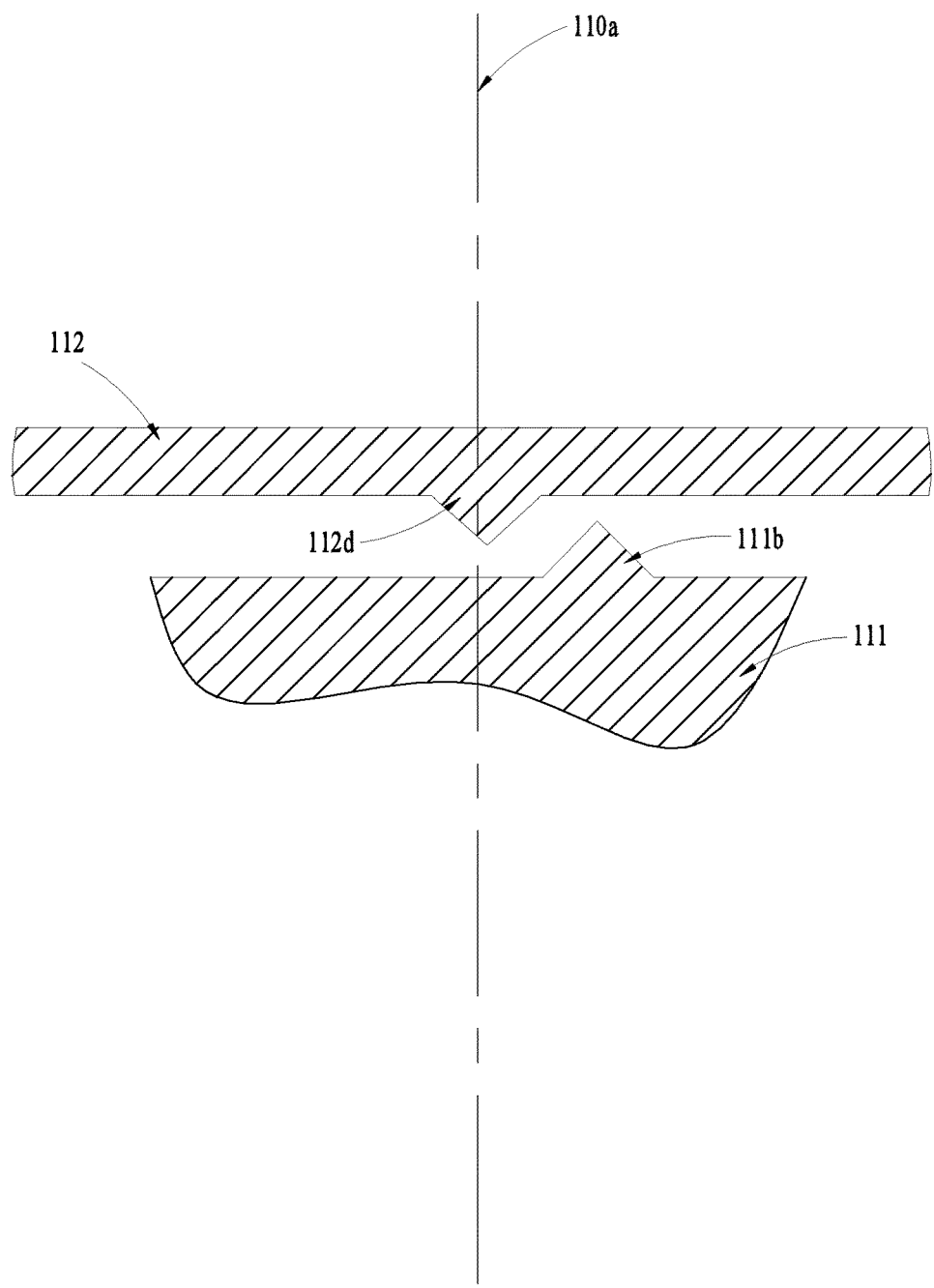
FIG. 1D is a schematic view showing the transmission of a spool and a head housing in FIG. 1B.

As shown in FIG. 1D, the spool 111 is provided with a first circumferential structure 111b, and the head housing 112 is provided with a second circumferential structure 112d. Under the action of the spring 113, the spool 111 can move upward so that the first circumferential structure 111b is engaged with the second circumferential structure 112d. Thus, the spool 111 can be rotated synchronously with the head housing 112. It is noted that, the first circumferential structure 111b and the second circumferential structure 112d have a transmitting surface therebetween which is obliquely inclined with the axis 110a.

When the first circumferential structure 111b and the second circumferential structure 112d are engaged with each other, the user can start the motor 121 to make the grass trimmer 100 be in a cutting mode. At this moment, if the cutting line 101 wound on the spool 111 is sufficiently long, a part of the cutting line 101 exposed out of the head housing 112 can cut the vegetation in a whipping action.

Referring to FIGS. 1B-1C, the grass trimmer 100 further includes a damping device 140. In some embodiments, the damping device 140 includes a friction element 141. The friction element 141 is connected slidably with the first housing 150 and can move along a direction A. When the friction element 141 is moved to contact with the head housing 112, the head housing 112 can rotate relative to the spool 111. As the friction increases, a component force in the direction of the axis 110a is acted on the head housing 112 due to the inclined transmitting surface between the first circumferential structure 111b and the second circumferential structure 112d. The component force can overcome the spring force of the spring 113 sufficiently to make the head housing 112 move upward, so that the first circumferential structure 111b is disengaged with the second circumferential structure 112d. Thus, the spool 111 can rotate relative to the head housing 112, and the grass trimmer 100 is in an auto-winding mode. In the auto-winding mode, the spool 111 driven by the motor 121 can rotate relative to, the head housing 112 under the action of the friction element 141 so as to realize an auto-winding function.

However, when the spool 111 is wound with enough cutting line 101 and the part of the cutting line 101 exposed out of the head housing is not long enough to cut the vegetation, the spool 111 can rotate relative to the head housing 112 so as to feed the cutting line 101 automatically for cutting purposes.

In some embodiments, the friction element 141 can produce damping on the head housing 112 so as to slow down the head housing 112. Thus, the relative rotation is occurred between the head housing 112 and the spool 111. The user can operate the friction element 141 directly or indirectly to switch the grass trimmer 100 between the cutting mode and the auto-winding mode. However, the user can operate the friction element 141 in a status corresponding to the desired mode firstly, and then start the motor 121.

Figure 2A:
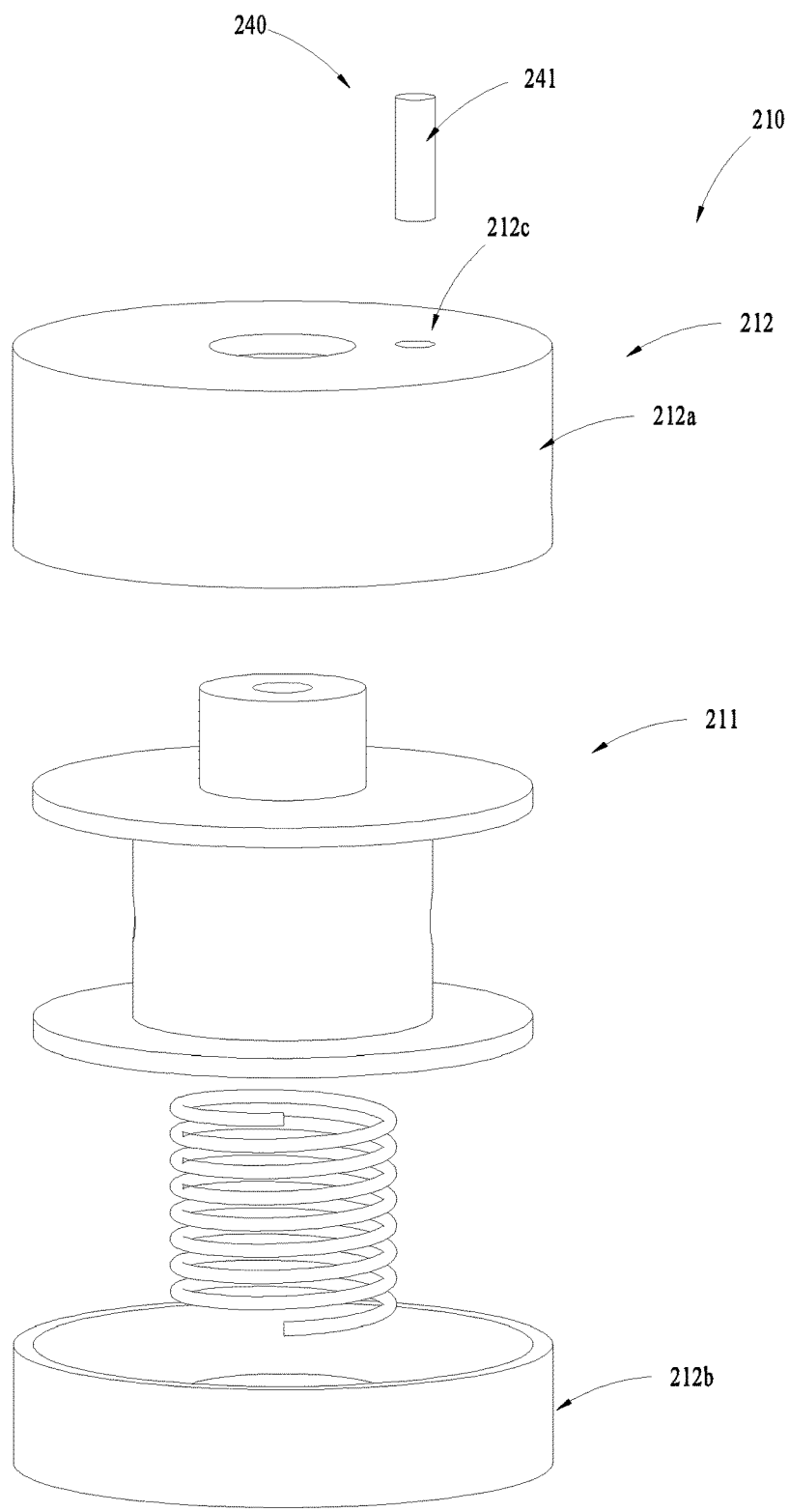
FIG. 2A is an exploded view of an exemplary trimming head and an exemplary damping device.
Figure 2B:
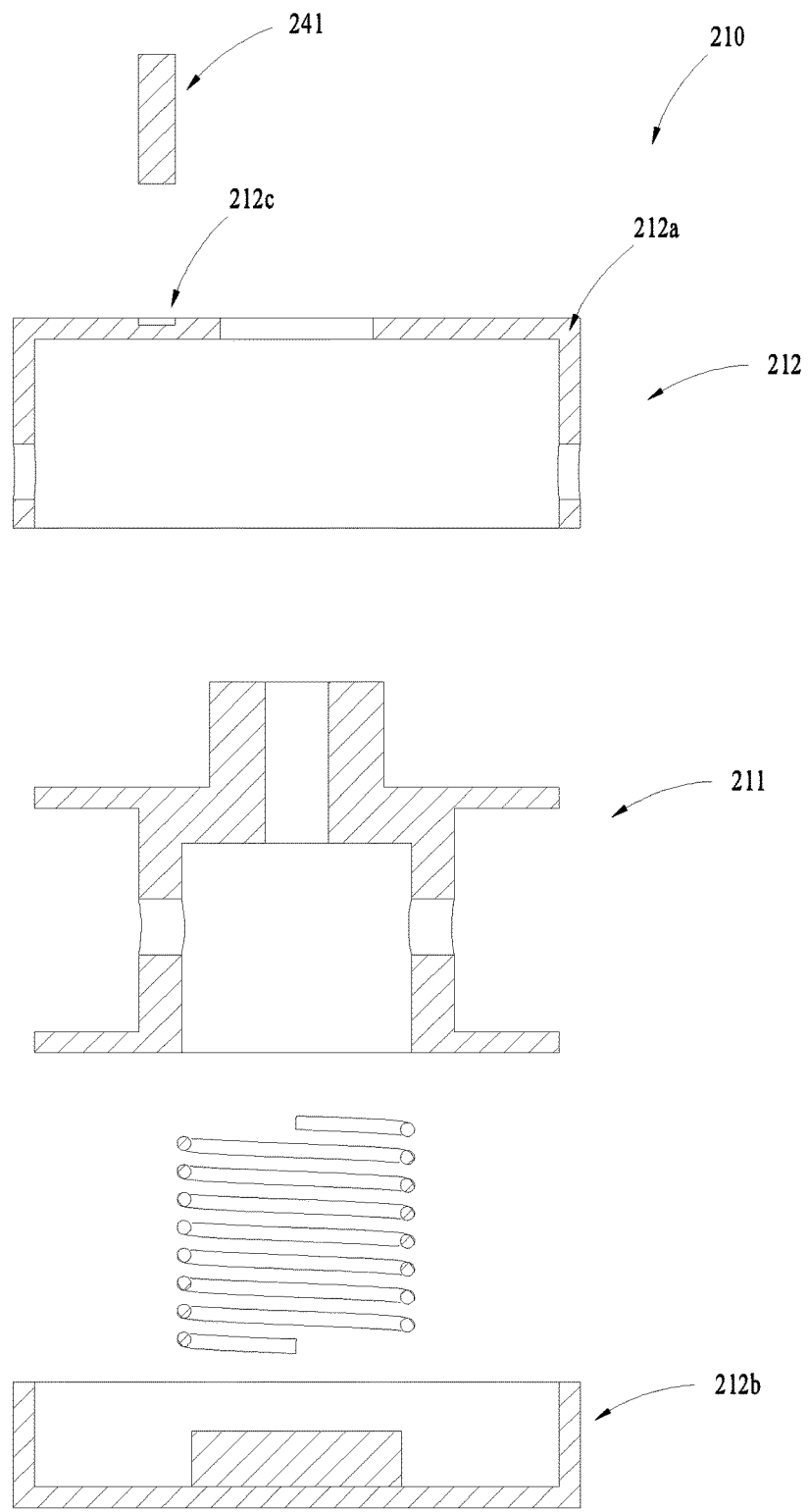
FIG. 2B is a section view of the trimming head and the damping device in FIG. 2A.

Referring to FIGS. 2A-2B, a trimming head 210 which is similar to the trimming head 110 includes a spool 211 and a head housing 212. The spool 211 and the head housing 212 are similar to the spool 111 and the head housing 112 in FIGS. 1-3. The head housing 212 includes an upper cover 212a and a lower cover 212b.

A difference between this example and the prior example is that a damping device 240 in FIGS. 2A-2B includes a stop pin 241 for stopping the head housing 212 rotating wherein the head housing 212 is formed with a stop recess 212c for engaging with the stop pin 241. In some embodiments, the stop recess 212c is disposed on the upper cover 212a. In the auto-winding mode, the stop pin 241 is inserted in the stop recess 212c so that the head housing 212 is stopped from rotating relative the grass trimmer. As the principle described above, the relative rotation between the spool 211 and the head housing 212 can realize the function of auto-winding.

The stop pin 241 can also damp the rotation of the head housing 212. The difference is that, the damping function of the friction element 141 is to slow down, and the damping function of the stop pin 241 is to limit the movement. Here, slowing down and limiting movement are both defined as damping. Both the friction element 141 and the stop pin 241 can be considered as a kind of the damping device.

Figure 3A:
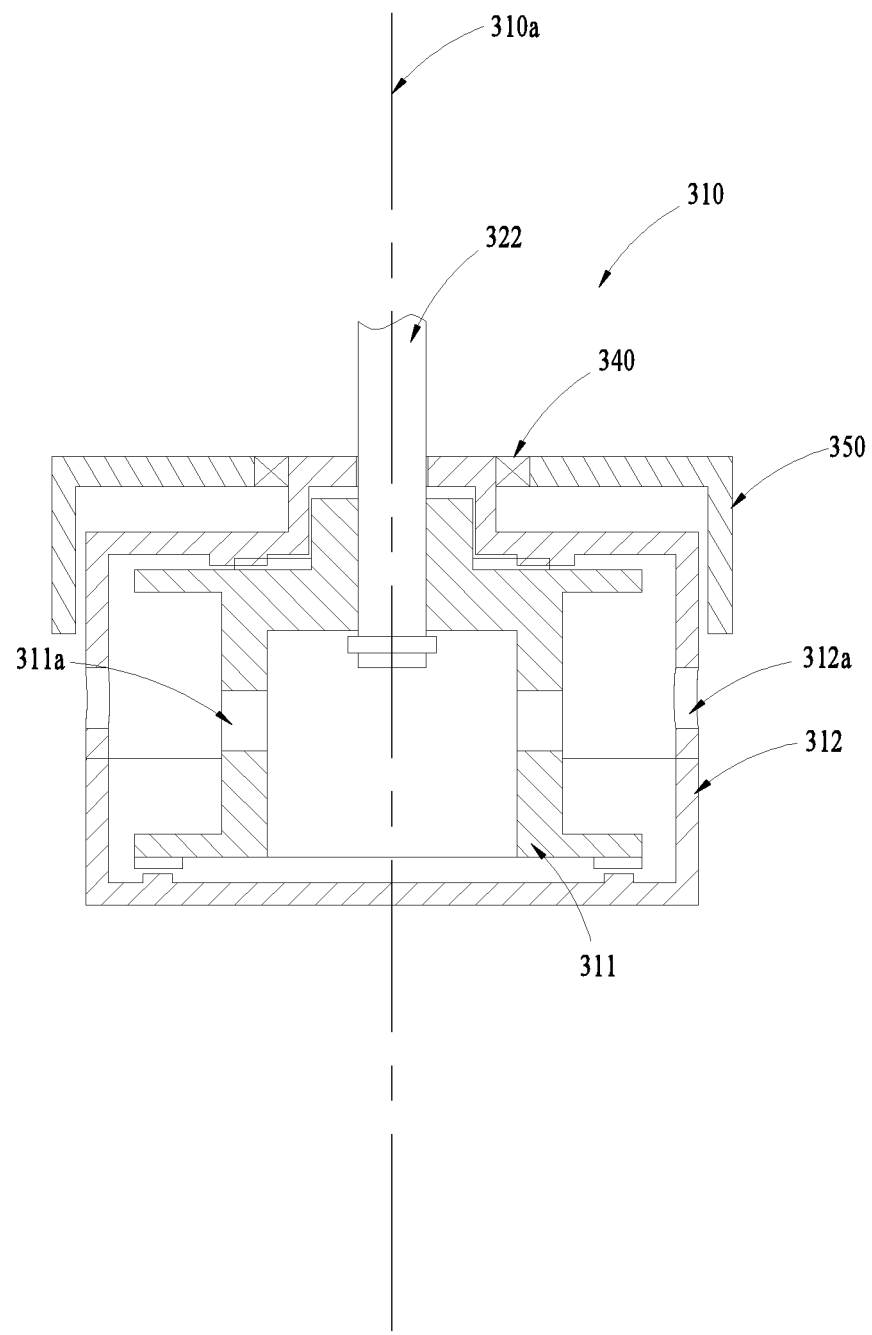
FIG. 3A is also a schematic view of an exemplary trimming head and an exemplary damping device.
Figure 3B:
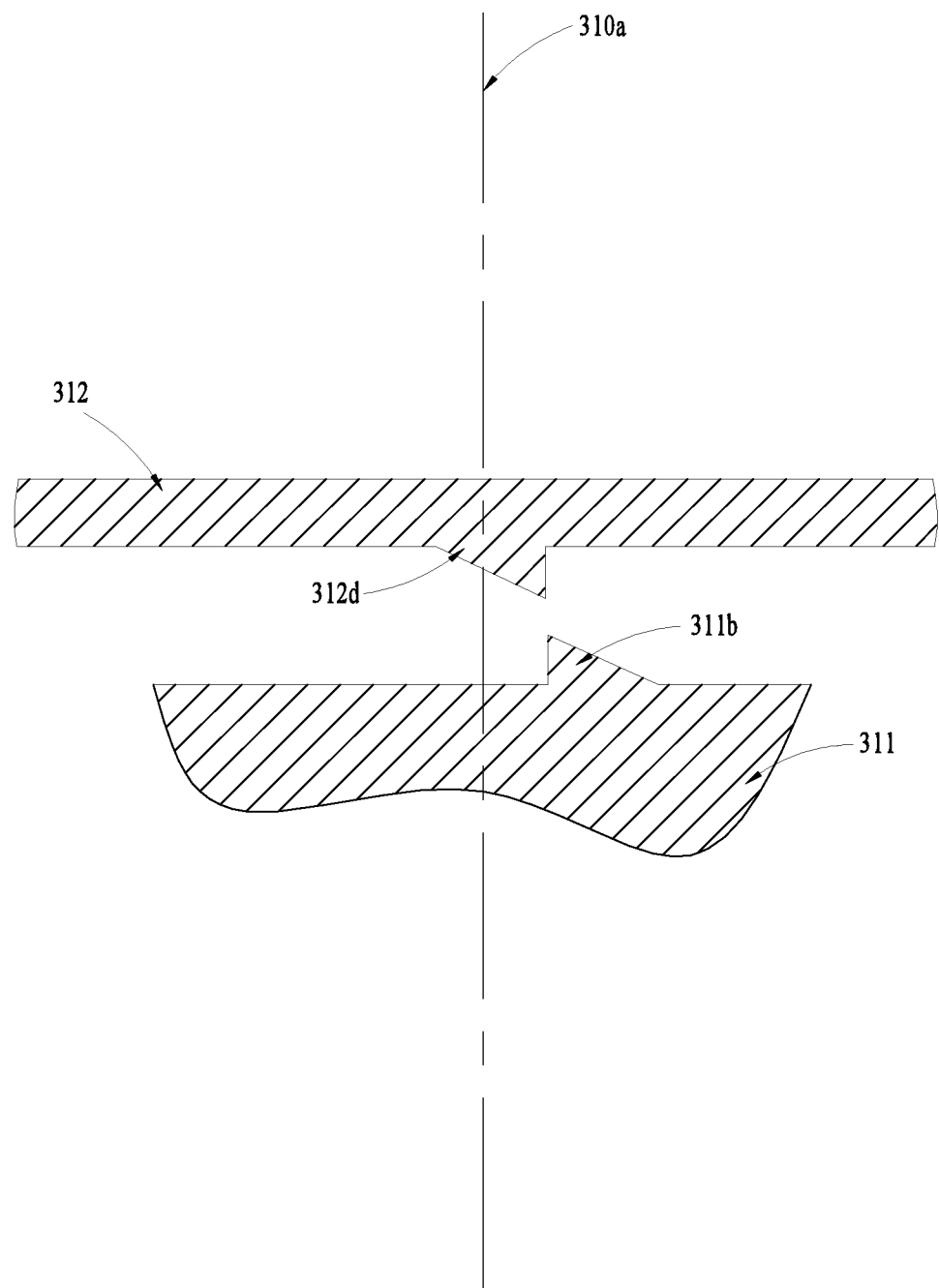
FIG. 3B is a schematic view showing the transmission of a spool and a head housing in FIG. 3A.

Referring to FIGS. 3A-3B, a trimming head 310 can be driven to rotate about an axis 310a. For example, the trimming head 310 can include a spool 311 and a head housing 312. The head housing 312 is formed with an outer aperture 312a allowing a cutting line to pass through. The spool 311 is formed with an inner aperture 311a.

In this example, a one-way bearing 340 and a supporting element 350 are provided. The one-way bearing 340 allows two elements or two parts connected therewith to be able to rotate relatively in one direction, but does not allow them to rotate relatively in another direction. The supporting element 350 is connected rotatably with a part of the trimming head 310 and can support the trimming head 310 rotatably. The supporting element 350 may be a first housing for accommodating a motor or a component connected with the first housing fixedly, for example a trimming guard.

In some embodiments, the one-way bearing 340 is disposed between the supporting element 350 and the head housing 312, so that the supporting element 350 is able to rotate unidirectionally relative to the head housing 312. Taking the supporting element 350 as a reference, the head housing 312 can rotate in one direction and cannot rotate in another direction.

A driving shaft 322 is connected fixedly with the spool 311, so that the spool 311 can rotate relative to the supporting element 350 in two directions. Taking the supporting element 350 as a reference, the spool 311 can rotate forwardly and reversely.

Similar to the foregoing examples, the spool 311 is provided with a first circumferential structure 311a, and the head housing 312 is provided with a second circumferential structure 312a which is able to engage with the first circumferential structure 311a. The difference is that at least one of the transmitting surfaces of the first circumferential structure 311a and the second circumferential structure 312a is substantially parallel to the axis 310a. Thus, when the first circumferential structure 311a and the second circumferential structure 312a are rotated in a direction, they cannot disengage with each other.

Based on the arrangement described above, when the motor is rotated in a forward direction, the spool 311 is driven by the driving shaft 322 to rotate forwardly. At this moment, the torque is transmitted through the transmitting surfaces of the first circumferential structure 311a and the second circumferential structure 312a which are substantially parallel to the axis 310a. Meanwhile, the one-way bearing 340 allows the head housing 312 to be able to rotate forwardly relative to the supporting element 350, i.e. the grass trimmer. So, the spool 311 is rotated synchronously with the head housing 312, and the grass trimmer performs the cutting mode. When the motor is rotated in a reverse direction, the spool 311 is driven by be driving shaft 322 to rotate reversely. The head housing 312 is stopped from rotating reversely by the one-way bearing 340, so that a relative rotation is created between the spool 311 and the head housing 312. At this moment, the first circumferential structure 311a and the second circumferential structure 312a are disengaged with each other because their contacting surfaces are inclined surfaces. The first circumferential structure 311a and the second circumferential structure 312a cannot stop the relative rotation between the spool 311 and the head housing 312 thoroughly, so the relative rotation is created continuously and the grass trimmer performs the auto-winding mode.

The function of the one-way bearing 340 is similar to the stop pin 241 which is to stop the head housing 312 from rotating. So, the one-way bearing 340 can be considered as a kind of the damping device. The difference in the examples is that the friction element 141 and the stop pin 241 are needed to be operated or activated whereas the one-way bearing 340 can realize the damping function in response to a change in the driving direction of the motor. Thereby, the mechanical structure for activating the auto-winding mode is simplified. The auto-winding mode and the cutting mode can be switched therebetween by means of controlling the forward and revers rotation of the motor.

Figure 4A:
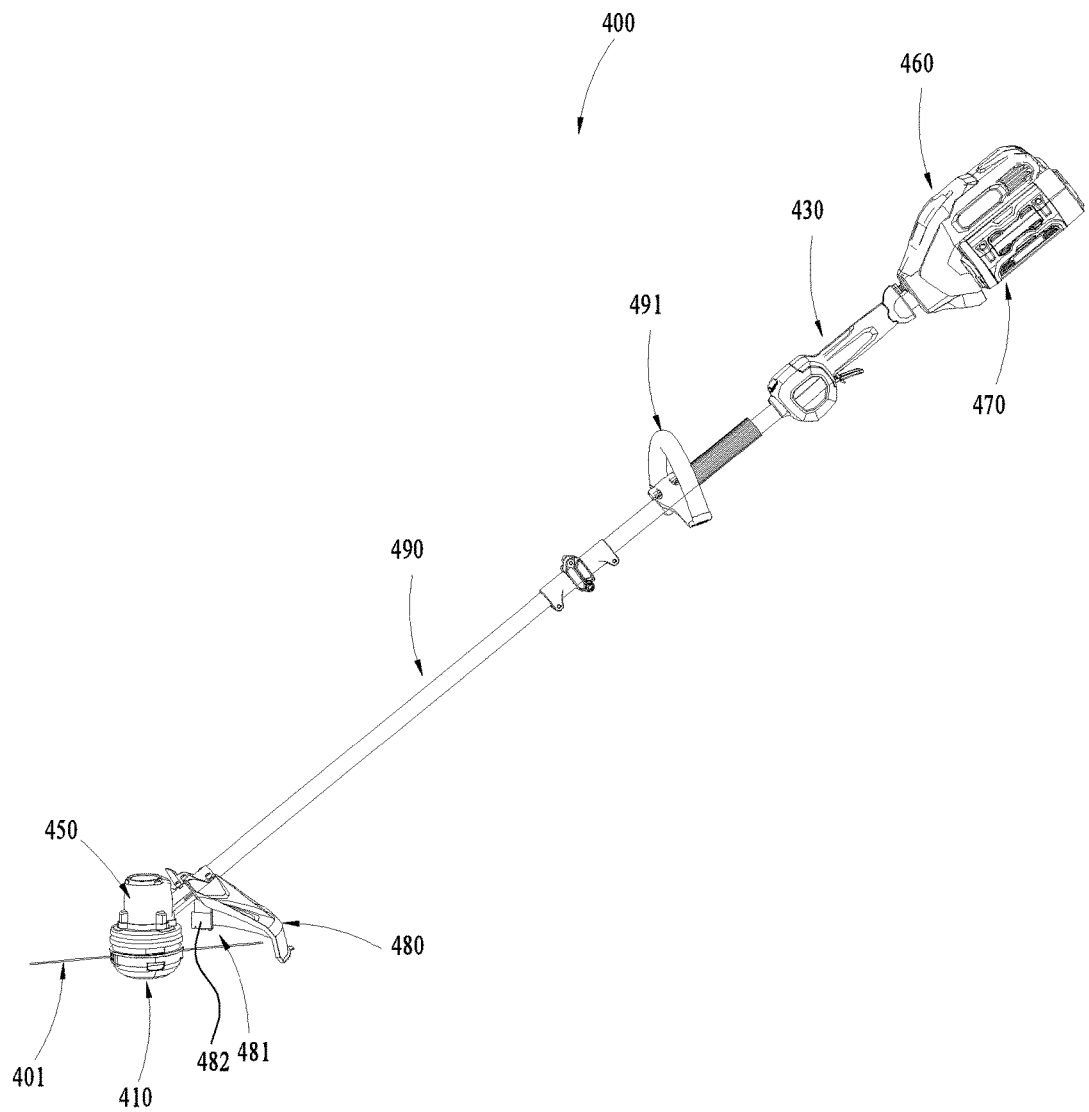
FIG. 4A is also a schematic view of an exemplary grass trimmer.
Figure 4B:
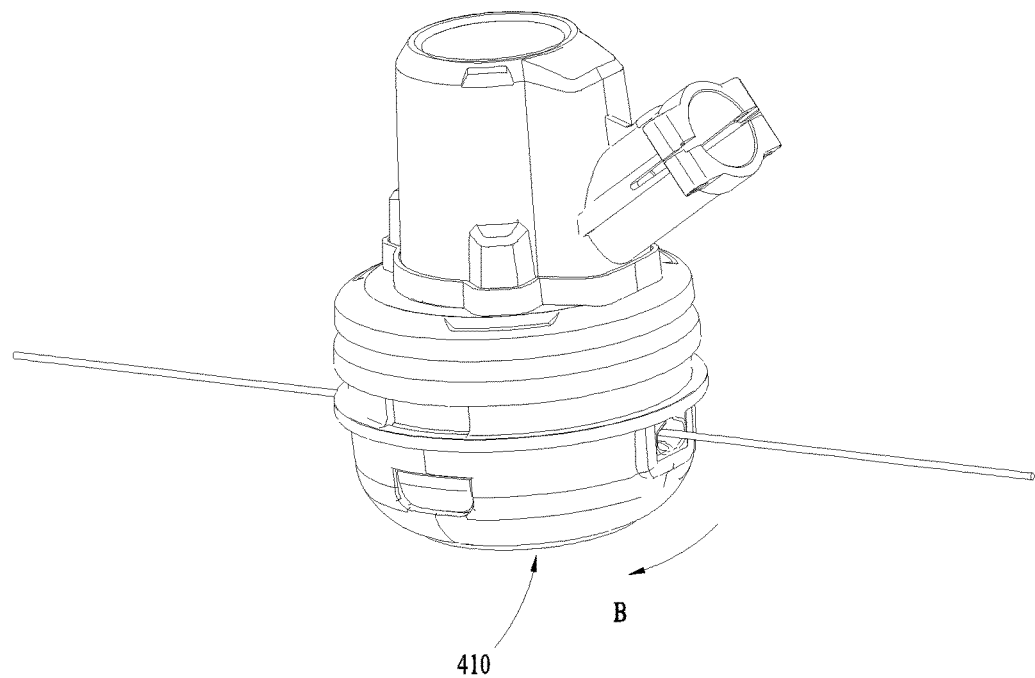
FIG. 4B is a schematic view showing the structure of a part of the grass trimmer in FIG. 4A.
Figure 4C:
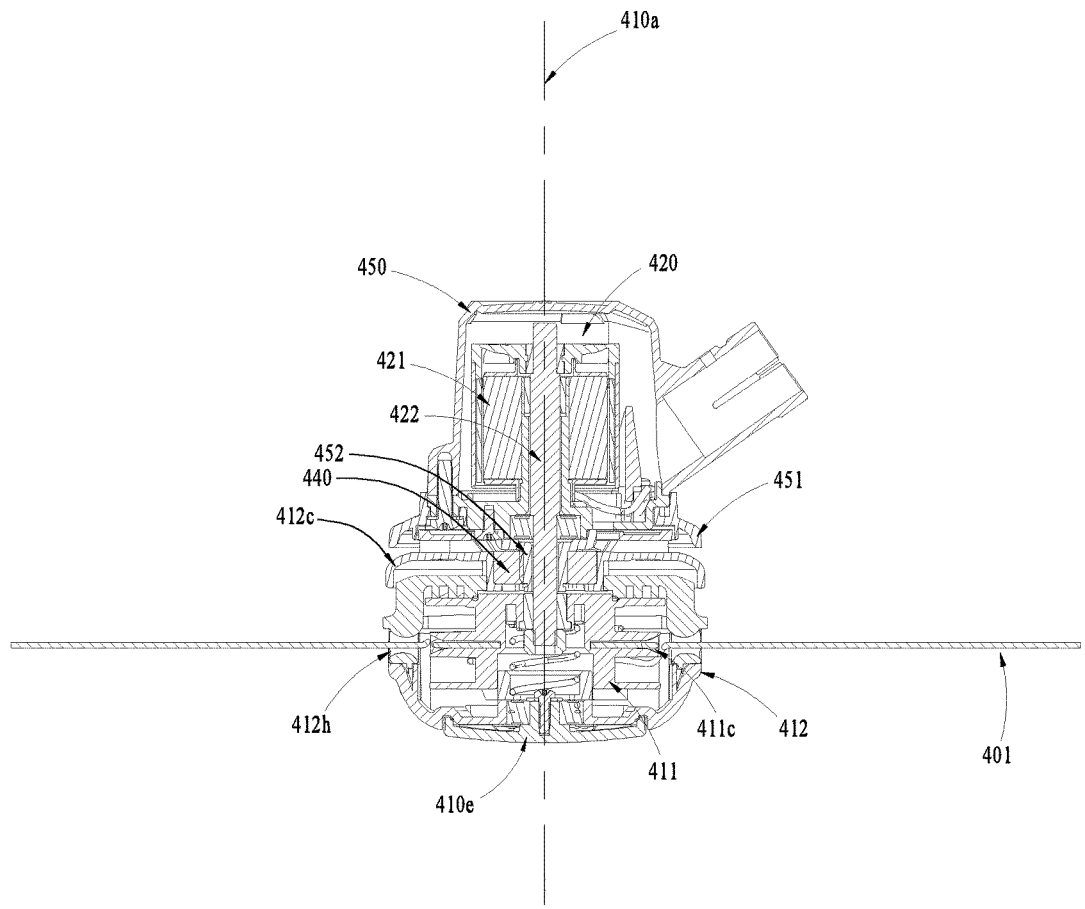
FIG. 4C is a section view of the structure in FIG. 4B.
Figure 4D:
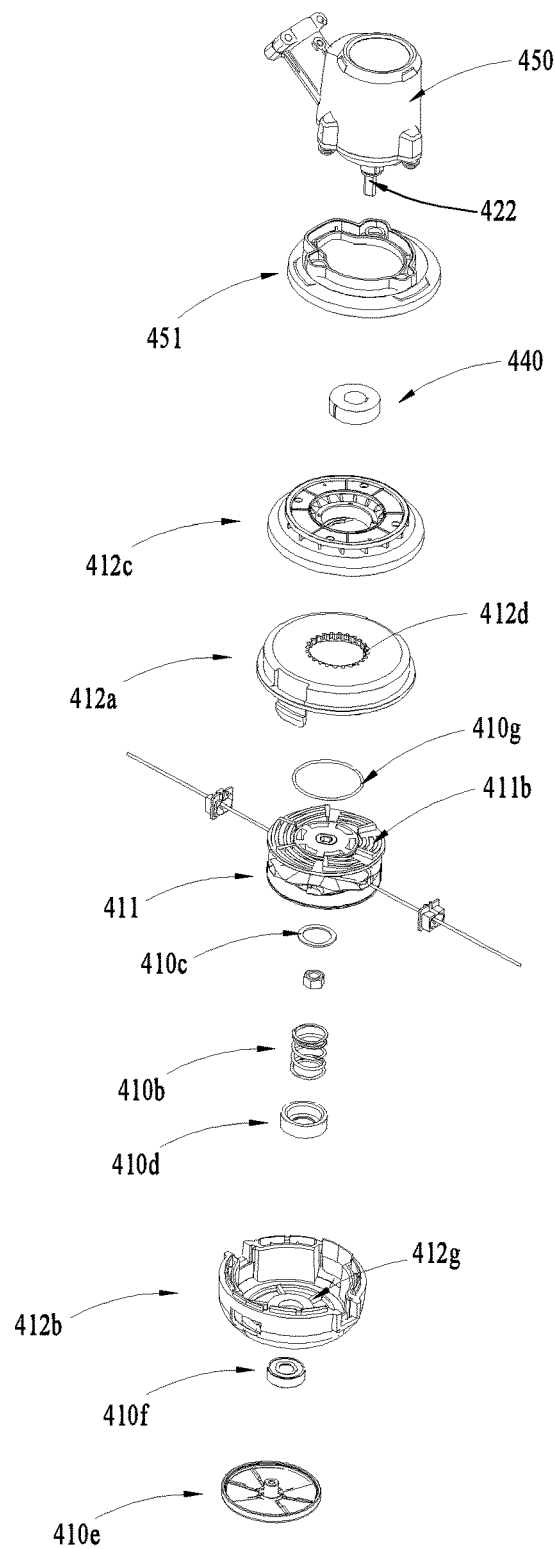
FIG. 4D is an exploded view of the structure in FIG. 4B.
Figure 4E:
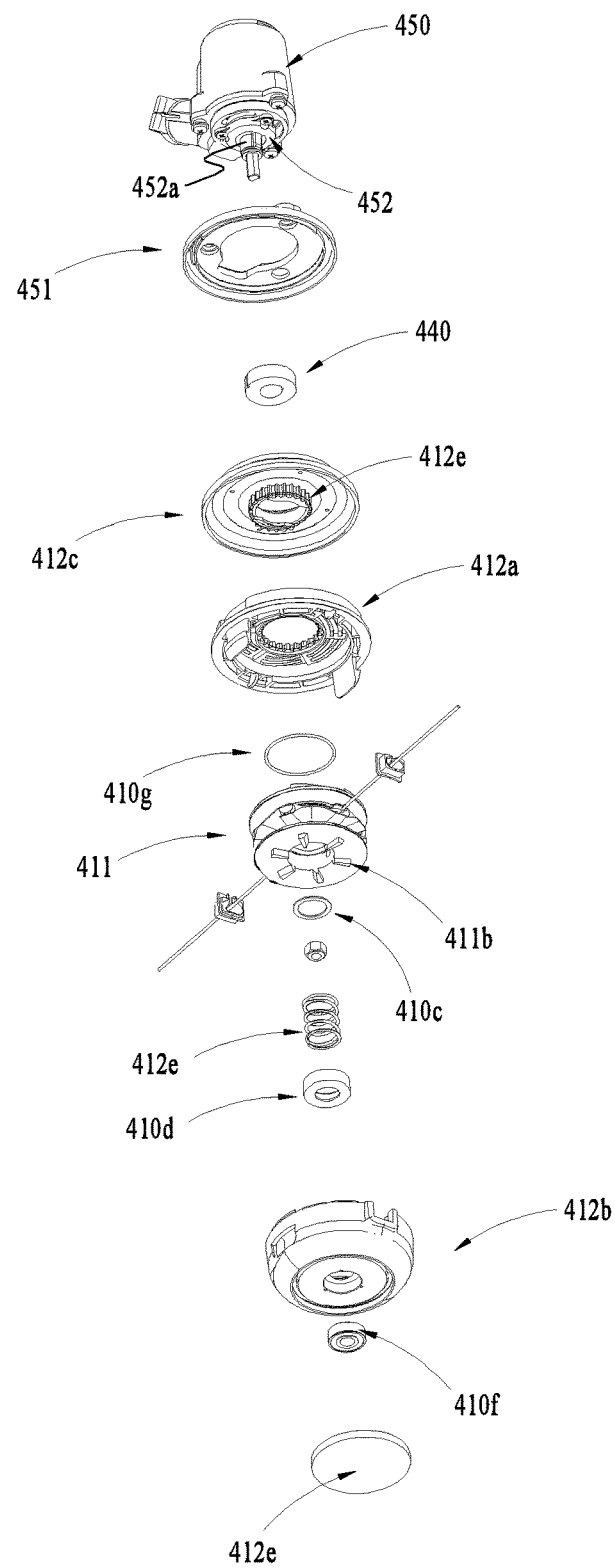
FIG. 4E is another exploded view of the structure in FIG. 4B.
Figure 4F:
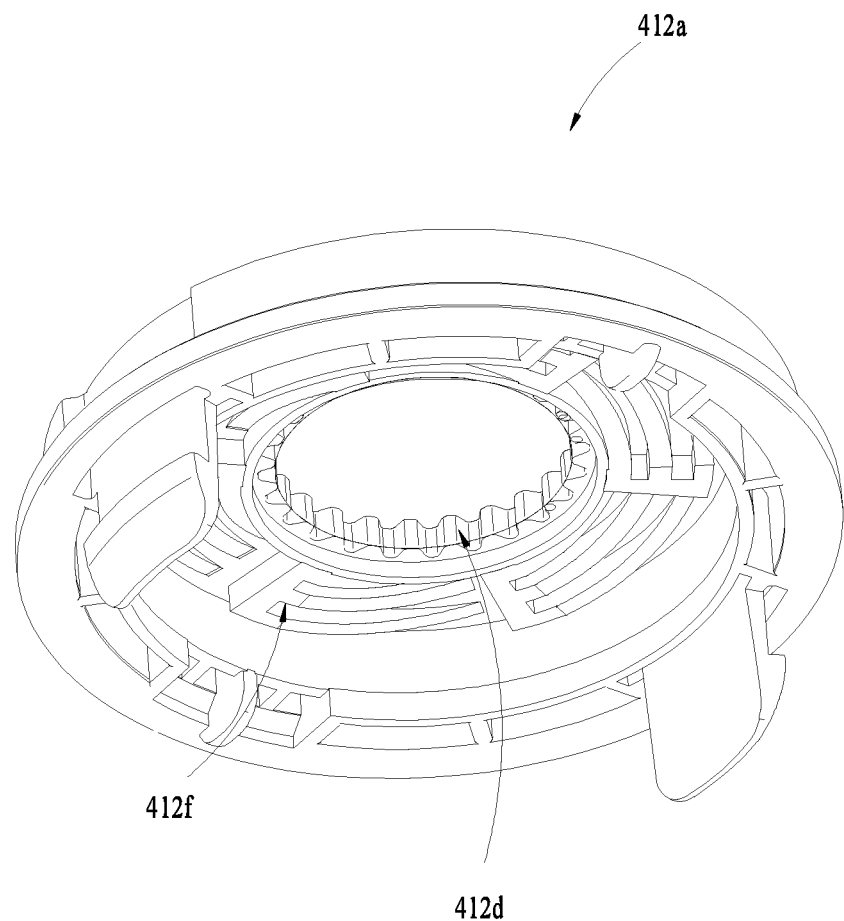
FIG. 4F is a section view of an upper cover in FIG. 4E.
Figure 4G:
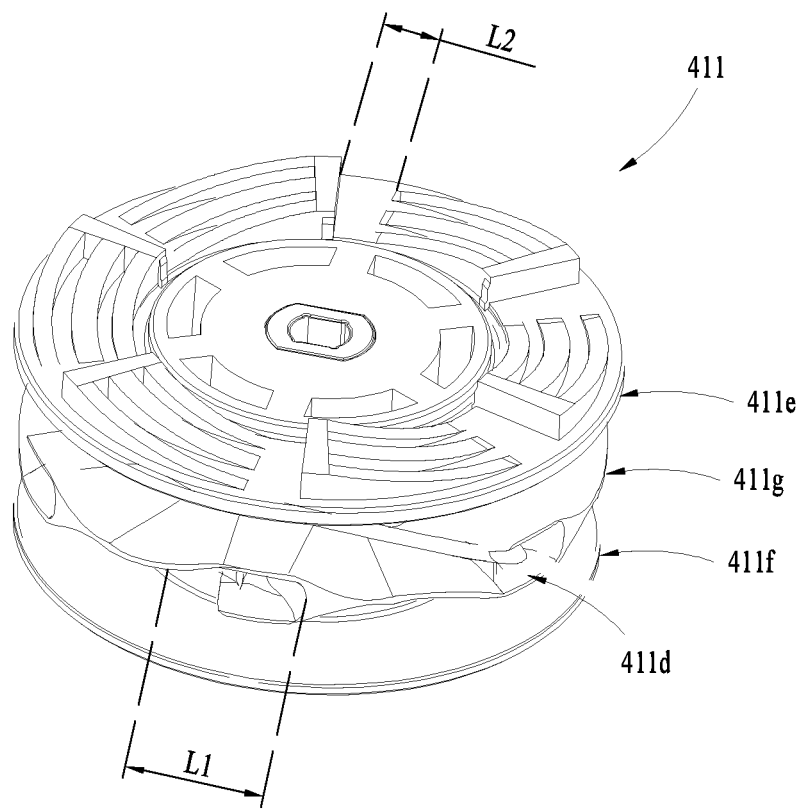
FIG. 4G is a section view of a spool in FIG. 4E.

Referring to FIGS. 4A-4C, a grass trimmer 400 includes a trimming head 410, a driving device 420 and an operating device 430.

The trimming head 410 is configured to mount and accommodate a cutting line 401. The cutting line 401 is partially accommodated in the trimming head 410. The cutting line 401 has a part extending out of the trimming head 410 which is used to cut vegetation when the trimming head 410 is rotated.

The trimming head 410 can be driven by the driving device 420 to rotate about an axis 410a so as to drive the cutting line 401 to cut vegetation. The operating device 430 is used for the user to operate so as to control the grass trimmer 400.

In some embodiments, the driving device 420 includes a motor 421 and a driving shaft 422. The driving shaft 422 is connected fixedly with the trimming head 410 so as to drive the trimming head 410 to rotate.

The grass trimmer 400 further includes a first housing 450, a second housing 460 and a battery pack 470. The first housing 450 is configured to mount and accommodate the motor 421. The battery pack 470 acting as a power source at least can supply power to the motor 421 of the grass trimmer 400. The second housing 460 is configured to engage with the battery pack 470 detachably.

A circuit board is accommodated in the second housing 460, which is connected with the motor 421 electrically so that the battery pack 470 can supply power to the motor 421 and control the motor 421. The first housing 450 and the second housing 460 are connected with each other through a connecting rod assembly 490. The operating device 430 is fixedly mounted on the connecting rod assembly 490. The grass trimmer 400 further includes an auxiliary handle 491 for the user to grip which is fixedly mounted on the connecting rod assembly 490.

The cutting line 401 is mounted on the trimming head 410. A guard 480 is used to prevent the cutting line 401 from hurting the user, so that it can realize the function of safety and protection.

Referring to FIGS. 4C-4H, the trimming head 410 includes a spool 411 and a head housing 412.

The spool 411 for winding the cutting line 401 is connected with the driving shaft 422 and can be driven by the driving shaft 422 to rotate about the axis 410a.

The head housing 412 includes an upper cover 412a and a lower cover 412b. The trimming head 410 further includes a fan 412c. The fan 412c includes blades for generating airflow. The fan 412c can be driven by the motor 421 to rotate so as to generate airflow.

In the embodiment in FIGS. 4A-4E, a one-way bearing 440 acting as a damping device is used. The function of the one-way bearing 440 is to make the head housing 412 connect with the motor 421 in a unidirectional rotary way. In some embodiments, a supporting element 452 is connected with the motor 421, which allows the driving shaft 422 to pass through. The supporting element 452 is formed with a projecting portion 452a for supporting an inner ring of the one-way bearing 440. The one-way bearing 440 is not connected with the head housing 412 directly, but connected between the supporting element 452 and the fan 412c. So, the fan 412c is only able to rotate unidirectionally relative to the supporting element 452. Because the fan 412c is connected with the head housing 412 fixedly, the head housing 412 is only able to rotate unidirectionally relative to the supporting element 452 as well.

The upper cover 412a is formed with first connecting teeth 412d. The fan 412c is formed with second connecting teeth 412e for engaging with the first connecting teeth 412d. Through the engagement between the first connecting teeth 412d and the second connecting teeth 412e, the upper cover 412a can be rotated with the fan 412c synchronously. The engagement between the first connecting teeth 412d and the second connecting teeth 412e can provide a guiding effect, so that the head housing 412 is able to slide relative to the fan 412c along the axis 410a and the fan 412c is able to rotate about the axis 410a together with the head housing 412. That is the fan 412c is connected with the head housing 412 fixedly.

The grass trimmer 400 further includes a guard 451 fastened to the first housing 450. The guard 451 is able to cover the blades of the fan 412c in a radial direction of the axis 410a so as to prevent grass clippings from winding on the fan 412c. And the guard 451 is able to change the direction of the airflow of the fan 412c, so that the airflow generated by the fan 412c can blow the grass clippings outward along the radial direction of the axis 410a.

The spool 411 is driven directly by the driving shaft 422 to rotate. The head housing 412 can rotate relative to the spool 411 and slide relative to the spool 411 in the direction of the axis 410a.

Referring to FIGS. 4D-4G, the spool 411 is formed with first engaging teeth 411a on the upper portion and second engaging teeth 411b on the lower portion. The head housing 412 is formed with first matching teeth 412f and second matching teeth 412g therein. In some embodiments, the first matching teeth 412f is formed on the upper cover 412a, and the second matching teeth 412g is formed on the lower cover 412b.

When the head housing 412 is at a first axial position relative to the spool 411, the first matching teeth 412f are engaged with the first engaging teeth 411a. So, when the spool 411 is rotated, it can drive the head housing 412 to rotate synchronously. In some embodiments, the transmitting surfaces of the first matching teeth 412f and the first engaging teeth 411a are inclined surfaces, so that the first matching teeth 412f and the first engaging teeth 411a only can rotate together unidirectionally. When the spool 411 is rotated reversely, the spool 411 rotates relative to the head housing 412 due to the skid between the inclined surfaces.

When the head housing 412 is at a second axial position relative to the spool 411, the second engaging teeth 411b is engaged with the second matching teeth 412g. Because the transmitting surfaces of the second engaging teeth 411b and the second matching teeth 412g are inclined surfaces, the skid can occur between the second engaging teeth 411b and the second matching teeth 412g. So, when the head housing 412 is at the second axial position relative to the spool 411, the head housing 412 cannot be driven by the spool 411 completely. The head housing 412 still can rotate relative to the spool 411, but the speed difference of the relative rotation is decreased by the engagement of the second engaging teeth 411b and the second matching teeth 412g.

The trimming head 410 includes a spring 410b. The spring 410b can generate a force acting between the lower cover 412b and the spool 411, so that the head housing 412 is biased to the axial position and can rotate with the spool 411 synchronously. That is the first axial position described above.

The trimming head 410 further includes a first contacting element 410c and a second contacting element 410d. The spring 410b is disposed between the first contacting element 410c and the second contacting element 410d and can act on the first contacting element 410c and the second contacting element 410d directly. The first contacting element 410c and the second contacting element 410d can prevent the spring 410b from wearing on the spool 411 and the head housing 412, which are made of metal.

The trimming head 410 further includes a button 410e which is connected rotatably with the lower cover 412b. A bearing 410f is disposed between the button 410e and the lower cover 412b, so that the button 410e can be rotated relative to the lower cover 412b. Meanwhile, the button 410e and the lower cover 412b can move together in the direction of the axis 410a. When the position of the button 410e is changed, the lower cover 412b can move therewith. That is, the axial position of the head housing 412 can be changed when the button 410e is bumped.

When the grass trimmer 400 is in the cutting mode, the user can bump the trimming head 410, and the button 410e contacts with the ground to make the head housing 412 slide, so that the first engaging teeth 411a is disengaged with the first matching teeth 410f and rotated relative to the first matching teeth 410f. Further, when the button 410e is bumped, the head housing 412 can slide to the second axial position relative the spool 411 and rotate at a lower speed relative to the spool 411. So, the trimmer line 401 wound on the spool 411 can be fed out of the head housing 412 partially, and the grass trimmer 400 performs a line feeding mode. This arrangement has advantages that is, when the motor 421 is rotated at a speed in the cutting mode, the relative rotation speed of the head housing 412 and the spool 411 is controlled, so that the trimmer line 401 cannot be fed excessively during each bumping.

The button 410e is able to rotate freely relative to the lower cover 412b under the action of the bearing 410f, so that the wearing of the trimmer head 410 is reduced. The spring 410b can generate a force acting on the head housing 412 so as to the head housing 412 move downwardly relative to the spool 411. An anti-vibration element 410g is disposed between the upper cover 412e and the spool 411 for reducing the impact between the upper cover 412e and the spool 411. In some embodiments, the anti-vibration element 410g is a rubber washer.

The spool 411 is formed with an inner aperture 411c and the head housing 412 is formed with an outer aperture 412h allowing the cutting line 401 to pass from the inside to the outside of the head housing 412. When the cutting mode is finished, the inner aperture 411c and the outer aperture 412h are aligned automatically in the circumferential direction. Or, when the cutting line 40a is not mounted on the trimming head 410 and the motor 421 is stopped, the inner aperture 411c and the outer aperture 412h are aligned automatically in the circumferential direction.

The spool 411 is formed with several inner apertures 411c, and the number of the inner apertures 411c is even. The several inner apertures 411c are distributed uniformly in the circumferential direction of the axis 410e. In some embodiments, the number of the first engaging teeth 411a is corresponded with the number of the inner apertures 411c. Similarly, the number of the second engaging teeth 411b is corresponded with the number of the inner apertures 411c. The spool 411 is formed with six inner apertures 411c. The spool 411 is further formed with six first engaging teeth 411a and six second engaging teeth 411b.

The spool 411 is formed with a guiding opening 411d for guiding the cutting line 401 to enter the inner apertures 411c. The guiding opening 411d is expanded gradually along the radial direction of the rotating axis of the spool 411. The first engaging teeth 411a are formed with inclined surfaces.

The guiding opening 411d has a maximum size L1 in the circumferential direction of the axis 410a which is greater than a maximum size L2 between two adjacent first engaging teeth 411a in the circumferential direction of the axis 410a.

When the grass trimmer 400 is in the cutting mode, the transmitting surfaces of the first engaging teeth 411a and the first matching teeth 412f are so arranged that the outer apertures 412h and the inner apertures 411c can be aligned automatically in the circumferential direction when the motor 421 is stopped. Here, the word "align" means that the cutting line 401 passing through the outer apertures 412h can be guided into the inner apertures 411c directly.

The spool 411 is formed with a first flange 411e and a second flange 411f on its two ends. The spool 411 is further formed with a division plate 411g in the middle portion. A first winding portion for winding and accommodating the trimmer line 401 is formed between the first flange 411e and the division plate 411g. A second winding portion for winding and accommodating the trimmer line 401 is formed between the second flange 411f and the division plate 411g.

In the cutting mode, the spool 411 is driven by the driving shaft 422 to rotate, and the upper cover 412a is driven by the spool 411 to rotate. The fan 412c is driven by the upper cover 412a to rotate. The fan 412c can rotate relative to the second housing 460 in a first direction referring to an arrow B in FIG. 4b. At this moment, the motor 421 is rotated forwardly so as to drive the spool 411 and the head housing 412 to rotate in the first direction.

Figure 4H:
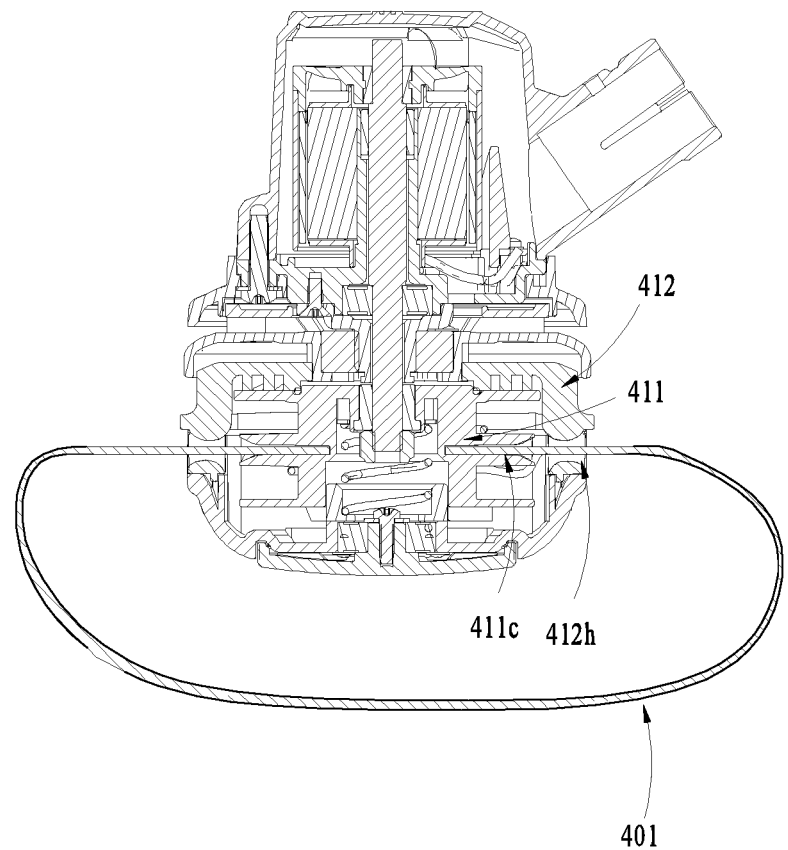
FIG. 4H is a schematic view showing the inserting method of a trimming head in FIG. 4A.

As shown in FIG. 4h, when it is needed to supplement the cutting line 401, two ends of the cutting line 401 can be passed through the opposite outer apertures 412h of the head housing 412 respectively, and then the two ends of the cutting line 401 are extended into the two opposite inner apertures 411c of the spool 411 respectively. Sure, the user can insert two cutting lines 401 into the two inner apertures 411c respectively. At this moment, the user can control the grass trimmer 400 to make it perform the auto-winding mode. The motor 421 is rotated reversely so as to drive the spool 411 to rotate in a second direction opposite to the first direction. Due to the effect of the one-way bearing 440, the fan 412c cannot rotate in the second direction. The fan 412c is connected with the head housing 412 through the first connecting teeth 412d and the second connecting teeth 412e, so the head housing 412 cannot rotate in the second direction. The spool 411 is driven by the driving shaft 422 to rotate relative to the head housing 412 in the second direction so as to realize the auto-winding function.

Otherwise, the first engaging teeth 411a, the second engaging teeth 411b, the first matching teeth 410f and the second matching teeth 410g are inclined teeth. The inclined surfaces of the inclined teeth cannot stop the spool 411 rotating relative to the head housing 412.

When the spool 411 is wound with enough cutting line 401, the excess cutting line 401 which has not been wound needs to be to cut off. Referring to FIGS. 4A and 4H, the grass trimmer 400 includes a line breaking device 481 for cutting off the cutting line 401 automatically in the auto-winding mode.

The line breaking device 481 includes a line breaking element 482. The trimming head 410 can rotate relative to the line breaking element 482. The line breaking element 482 is fastened to the guard 480. In the auto-winding mode, the cutting line 401 can be driven by the trimming head 410 to pass the line breaking element 482. When the cutting line 401 is tensioned, it can be cut off by the line breaking element 482. In the cutting mode and feeding mode, the cutting line 401 can be cut off in the middle by the line breaking element 482, and the cutting line 401 is divided into two parts.

Sure, the cutting line 401 can be cut off in a bumping way when it is tensioned on the outside of the head housing 412.

Figure 4I:
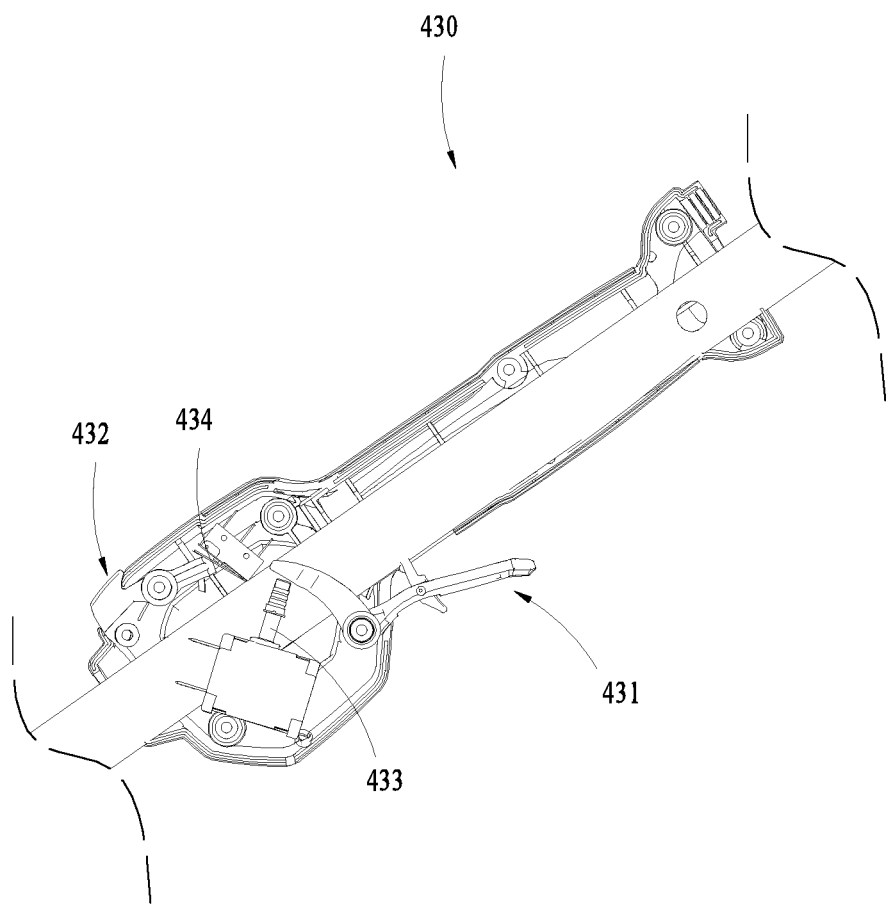
FIG. 4I is a schematic view of an operating device in FIG. 4A.
Figure 4J:
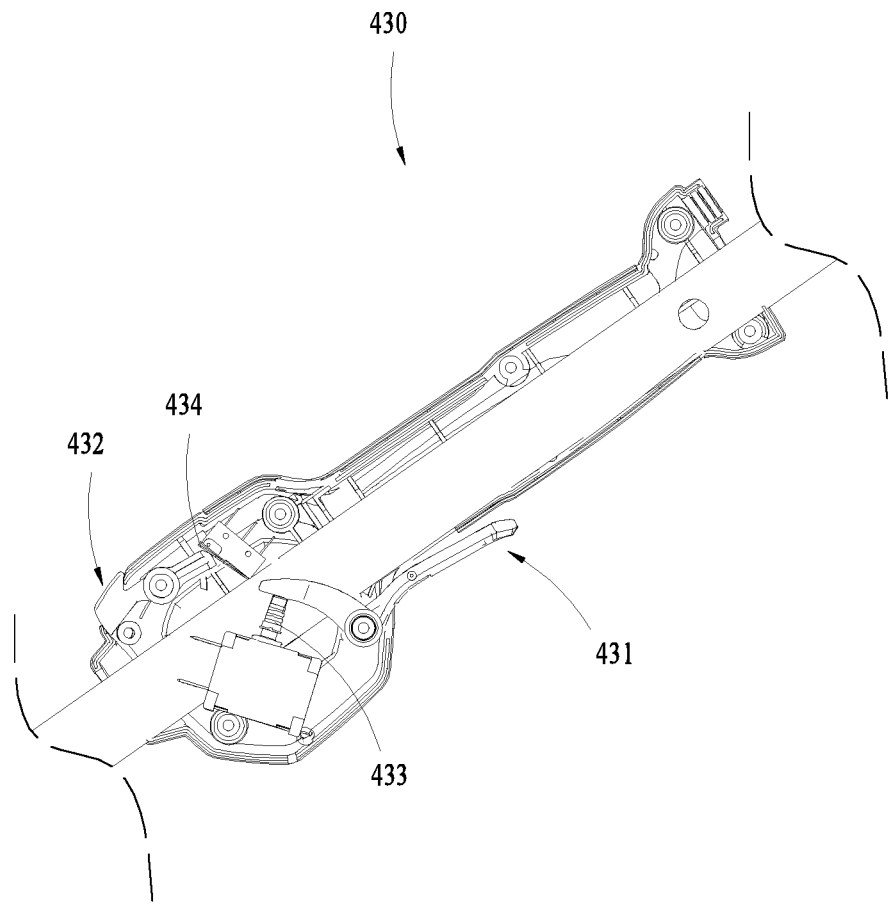
FIG. 4J is another schematic view of the operating device in FIG. 4A, wherein a first operating element and a second operating element are in a first preset operating state and a second preset operating state respectively.

Referring to FIGS. 4I and 4J, the operating device 430 includes a first operating element 431 and a second operating element 432. The first operating element 431 has an initial status and a first preset operating status. The second operating element 432 has an initial status and a second preset operating status. As shown in FIG. 4I, the first operating element 431 and the second operating element 432 are in the initial status. As shown in FIG. 4J, the first operating element 431 is in the first preset operating status and the second operating element 432 is in the second preset operating status. When the first operating element 431 and the second operating element 432 are in the first preset operating status and the second preset operating status respectively, the grass trimmer 100 can start the auto-winding mode.

The operating device 430 includes a first resetting assembly 433 and a second resetting assembly 434. The first resetting assembly 433 can make the first operating element 431 get out of the first preset operating status when the first operating element 431 is not operated by the user. The second resetting assembly 434 can make the second operating element 432 get out of the second preset operating status when the second operating element 432 is not operated by the user.

When the user only operates the first operating element 431 and does not operate the second operating element 432, that is the second operating element 432 is not in the second preset operating status, the first operating element 431 is operated to move to the first preset operating status. At this moment, the grass trimmer 400 is in the cutting mode.

Figure 4K:
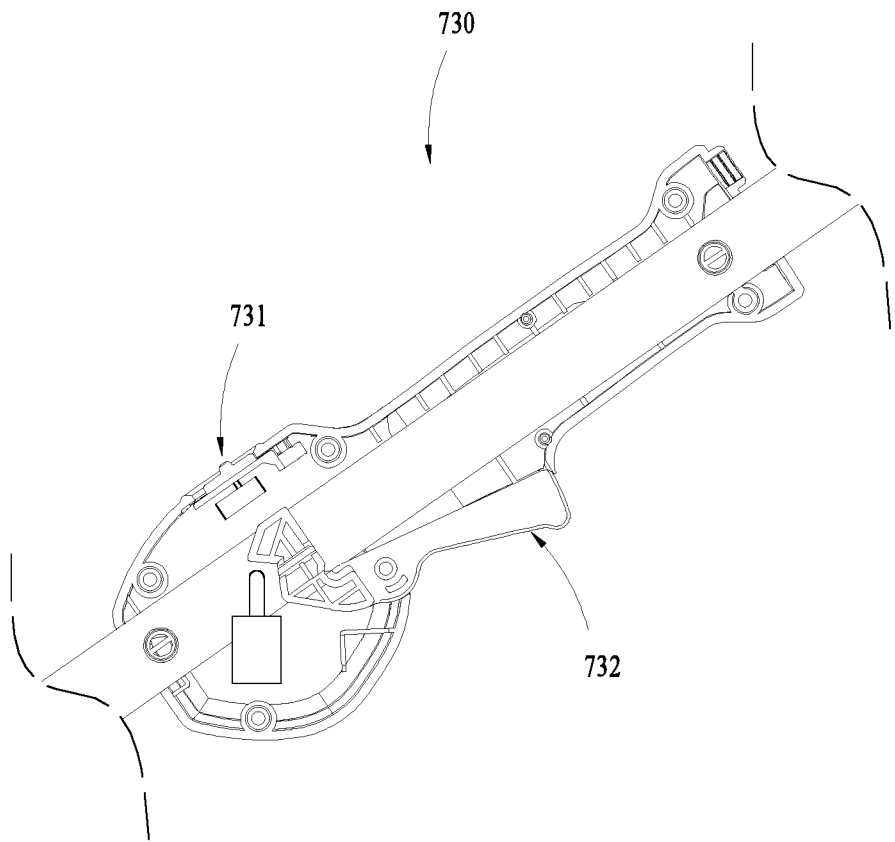
FIG. 4K is a schematic view of an operating device.
Figure 4L:
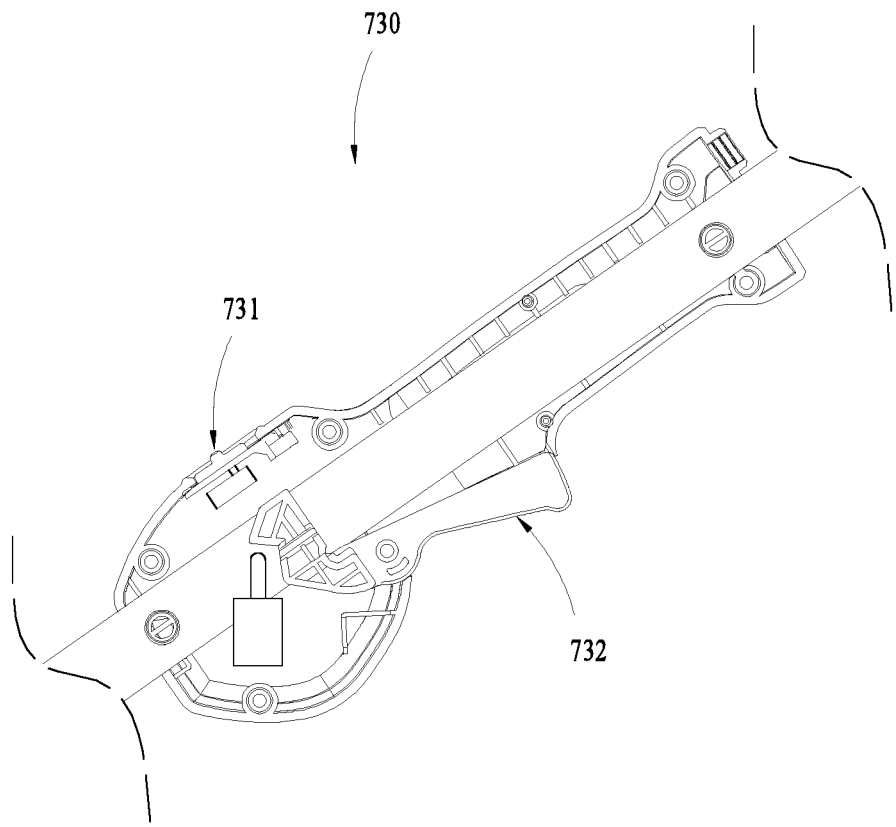
FIG. 4L is a schematic view showing a second operating element of the operating device in FIG. 4K, wherein the second operating element is in a second position.

Referring to FIGS. 4K and 4L, another operating device 730 includes a first operating element 731 and a second operating element 732. The first operating element 731 is used to activate a motor. The second operating element 732 is used for the user to operate so as to choose the auto-winding mode of the grass trimmer. The second operating element 732 has a first position a second position. As shown in FIG. 4K, the second operating element 732 is in the first position which corresponds with the auto-winding mode. At this moment, when the motor is activated by the first operating element 731, the grass trimmer goes into the auto-winding mode. As shown in FIG. 4L, the second operating element 732 is in the second position which corresponds with the cutting mode. At this moment, when the motor is activated by the first operating element 731, the grass trimmer goes into the cutting mode.

Figure 4M:
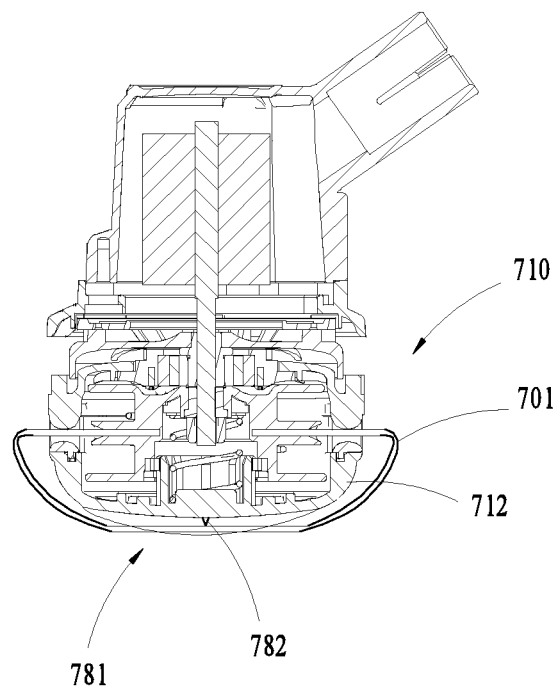
FIG. 4M is a schematic view of a line breaking device.

As shown in FIG. 4M, in another alternative embodiment, a line breaking device 781 can cut off a cutting line 701 in the auto-winding mode. The line breaking device 781 includes a line breaking element 782 which is able to rotate with a trimming head 710 synchronously. In the auto-winding mode, the cutting line 701 is driven by the trimming head 710 to close to the line breaking element 782 so that the cutting line 701 is cut off. The line breaking element 782 is fixed to a head housing 712. In the auto-winding mode, the cutting line 701 is close to the head housing 712. When the cutting line 701 is tensioned and contacts with the line breaking element 782, it is cut off by the line breaking element 782.

In the embodiment in FIG. 4A, the head housing 412 is formed with outer apertures 412h. In the auto-winding mode, the head housing 412 is rotated relative to the spool 411. The head housing 412 acts as a hand of the user winding the cutting line 401, and the outer apertures 412h act as the fingers of the user holding the cutting line 401. So, the head housing 412 can be defined as a line holding member. The line holding member can hold the cutting line 401 so that the cutting line 401 can rotate relative to the spool 411. The outer apertures 412h can be defined as a line holding structure. The line holding structure acts as the fingers to hold and locate the cutting line 401, and meanwhile allow the cutting line 401 to pass the outer apertures 412h continuously and wind on the spool 411.

Figure 5A:
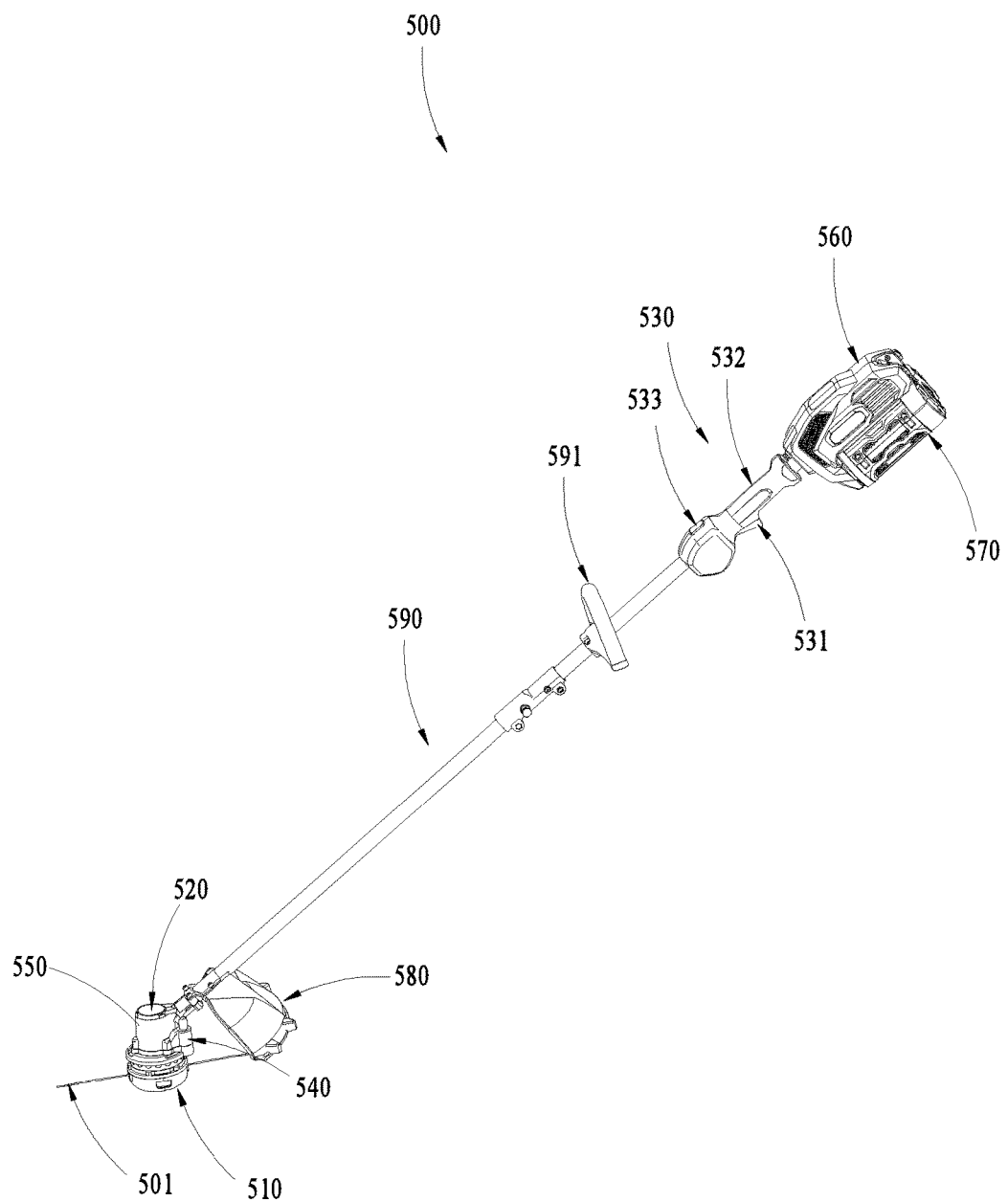
FIG. 5A is also a schematic view of an exemplary grass trimmer.
Figure 5B:
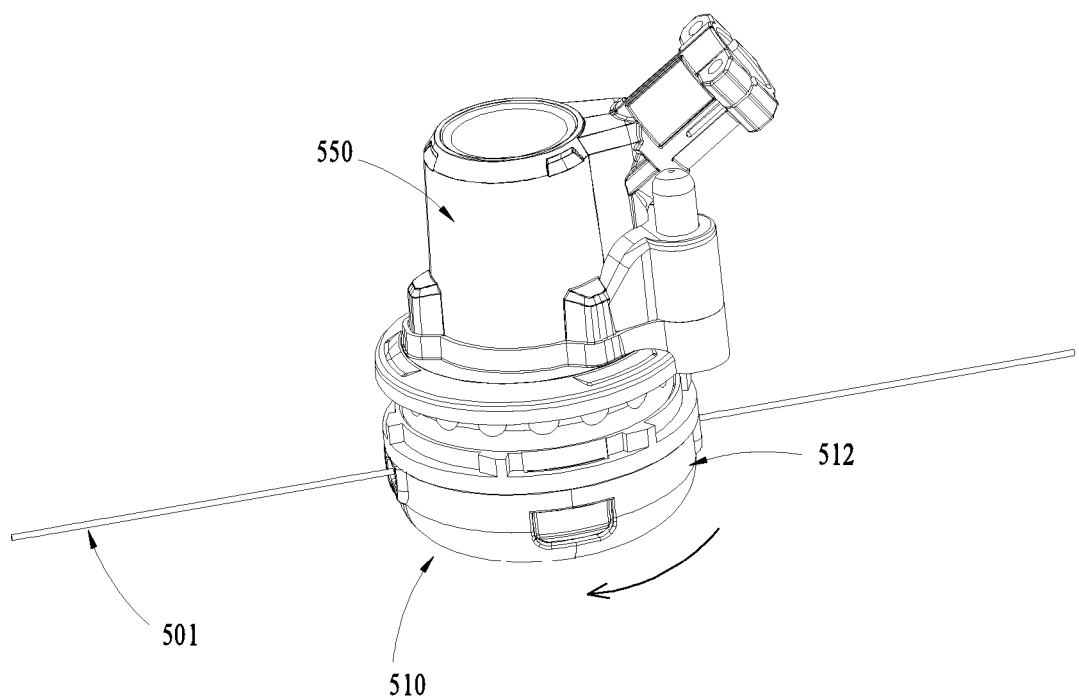
FIG. 5B is a schematic view of a trimming head and a first housing of the grass trimmer in FIG. 5A.
Figure 5C:
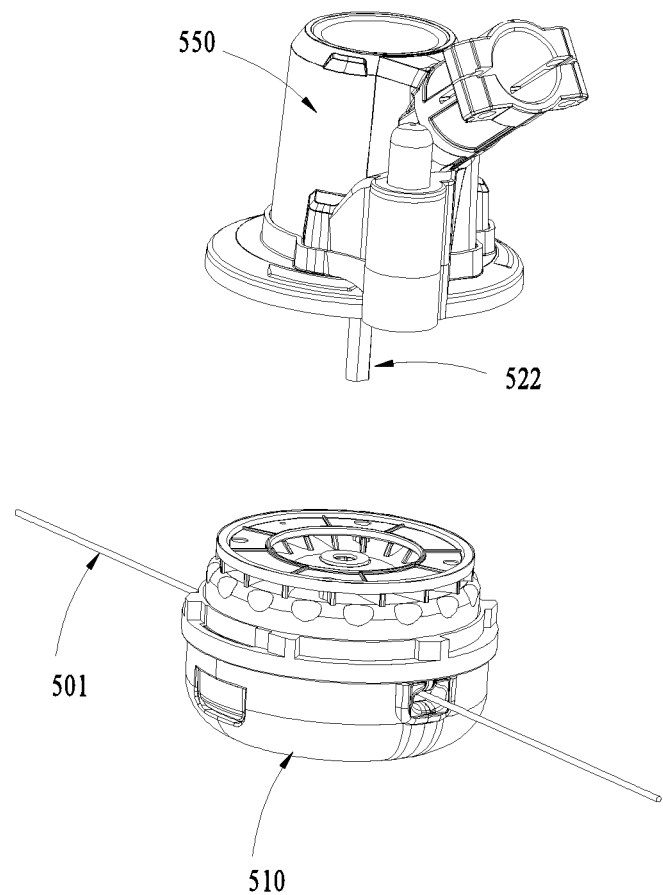
FIG. 5C is a schematic view of the trimming head and the first housing in FIG. 5B, wherein the trimming head and the first housing are separated.
Figure 5D:
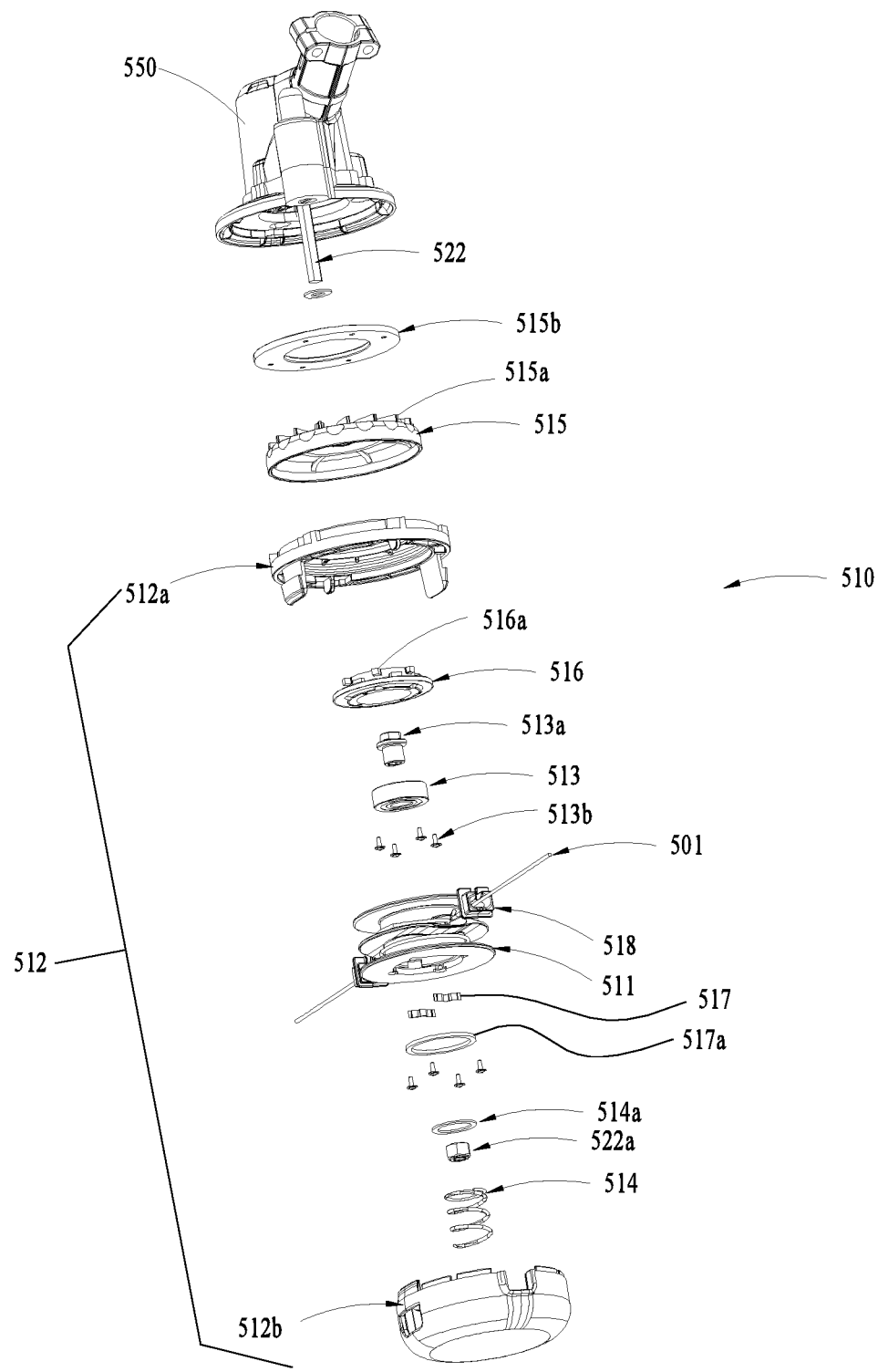
FIG. 5D is an exploded view of the structure in FIG. 5B.
Figure 5E:
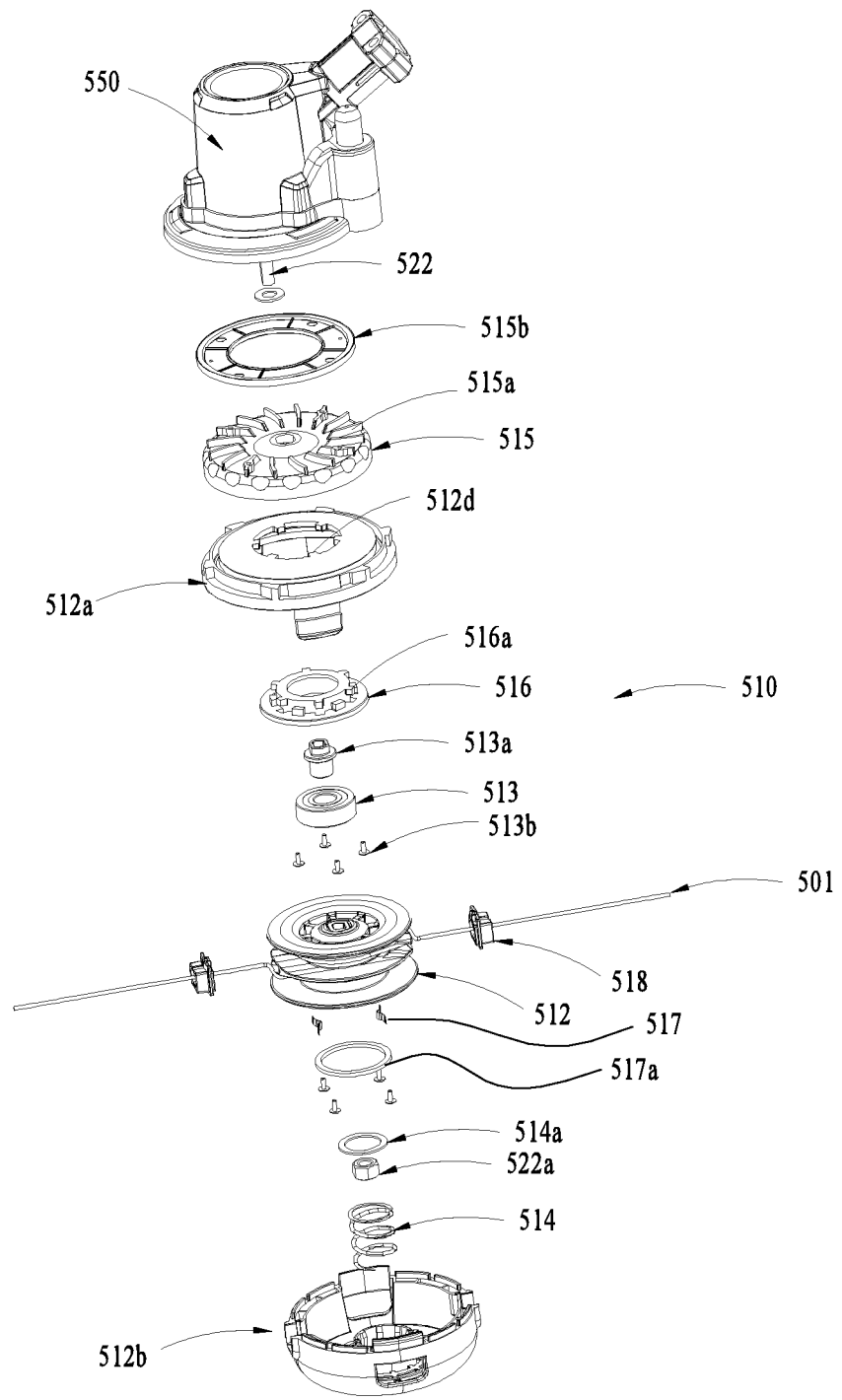
FIG. 5E is another exploded view of the structure in FIG. 5B.

Referring to FIGS. 5A-5C, a grass trimmer 500 includes a trimming head 510, a driving device 520 and an operating device 530.

The driving device 520 includes a driving shaft 522. The driving shaft 522 is connected with the trimming head 510 so as to drive the trimming head 510 to rotate about a central axis 502. The driving device 520 further includes a motor 521. In some embodiments, the driving shaft 522 is an output shaft of the motor 521.

The grass trimmer includes a first housing 550, a second housing 560 and a battery pack 570. The motor 521 is fixed to the first housing 550. The battery pack 570 for supplying power to the motor 521 is connected with the second housing 560 detachably. Further, a circuit board is disposed in the second housing 560, which is connected with the motor 521 to control the motor 521. The first housing 550 and the second housing 560 is connected through a connecting rod assembly 590. The operating device 530 is fixed to the connecting rod assembly 590. The grass trimmer 500 further includes an auxiliary handle 591 fixed to the connecting rod assembly 590 for the user to grip.

A cutting line 501 is mounted on the trimming head 510. A guard 580 can prevent the cutting line 501 from hurting the user so as to realize the function of protection.

Referring to FIGS. 5D-5G, the trimming head 510 includes a spool 511 and a head housing 512. The spool 511 allowing the cutting line 501 to wind thereon is formed with an inner aperture 511a and the end of the cutting line 501 is extended into the inner aperture 511a. In some embodiments, the spool 511 is formed with two inner apertures 511a on the opposite sides. Two cutting lines 501 can be inserted in the two inner apertures 511a respectively. Or, two ends of one cutting line 501 can be inserted in the two inner apertures 511a respectively. The spool 511 is accommodated in the head housing 512. The head housing 512 includes an upper cover 512a and a lower cover 512b which are coupled with each other through a snap join.

The spool 511 is disposed between the upper cover 512a and the lower cover 512b. The head housing 512 is formed with outer apertures 512c allowing the cutting line 501 to go through the head housing 512 from the inside. In soiree embodiments, the outer apertures 512c are formed on the lower cover 512b. Further, the trimming head 510 includes eyelets 518 fastened on the lower cover 512b which allow the cutting line 501 to pass through. In some embodiments, the eyelets 518 are made of metal which can prevent the cutting line 501 from wearing the lower cover 512b.

The grass trimmer 500 further includes a one-way bearing 513. When the one-way bearing 513 is rotated in one direction, an inner ring and an outer ring of the one-way bearing 513 are rotated synchronously. While, when the one-way bearing 513 is rotated in the reverse direction, the inner ring is rotated relative to the outer ring. When the driving shaft 522 is rotated in one direction, the one-way bearing 513 allows the head housing 512 and the spool 511 to rotate synchronously. While, when the driving shaft 522 is rotated in the reverse direction, the spool 511 is rotated relative the head housing 512 under the action of the one-way bearing 513.

The trimming head 510 includes an elastic element 514 which is able to generate a force between the head housing 512 and the spool 511. The force acts on the head housing 512 to make the head housing 512 depart from the first housing 550 or the motor 521. In some embodiments, elastic element 514 is disposed between the lower cover 512b and the spool 511. The spool 511 can apply force on the lower cover 512b and the spool 511 respectively through its two ends. The two ends can be connected with the lower cover 512b and the spool 511 directly and apply force on them, or connected with the lower cover 512b and the spool 511 indirectly and apply force on them through other components.

In some embodiments, the trimming head 510 further includes a washer 514a disposed between the elastic element 514 and the spool 511. The force of the elastic element 514 is transferred to the spool 511 through the washer 514a.

When the spool 511 is rotated relative to the head housing 512, the elastic element 514 is rotated relative to the spool 511. The washer 514a is able to prevent the elastic element 514 from wearing the spool 511. When the trimming head 510 is bumped by the user, the elastic element 514 is compressed, and the head housing 512 is moved in a direction close to the first housing 550 or the motor 521. As shown in FIG. 5B, the head housing 512 is moved upward. When the bumping is finished, the elastic element 514 can apply force on the lower cover 512b so as to make the lower cover 512b to move downward or in the direction far from the first housing 550 or the motor 521. So, the line bump feeding is realized.

The grass trimmer 500 further includes a fan 515. The fan 515 can be formed by the head housing 512 or a separate element. In some embodiments, the fan 515 is a separate element, which is connected with the driving shaft 522 and driven by the driving shaft 522 to rotate. Alternatively, the fan can be connected with the head housing and driven by the head housing to rotate.

In some embodiments, the fan 515 is provided with several blades 515a. The trimming head 510 includes an end cap 515b fixed to the fan 515. In some embodiments, the end cap 515b is fixed to the blades 515a. The end cap 515b has an annular shape and allows the driving shaft 522 to pass through. The fan 515 is disposed between the motor 521 and the head housing 512. The fan 515 is also disposed between the first housing 550 and the head housing 512. The fan 515 is also disposed between the first housing 550 and the spool 511. The upper cover 512a is disposed between the fan 515 and the lower cover 512b. The upper cover 512a is also disposed between the fan 515 and the spool 511. It can be considered as the fan 515 is disposed above the head housing 512.

The spool 511 is connected with the driving shaft 522 so as to rotate with the driving shaft 522 synchronously. The fan 515 is rotated with the driving shaft 522 and the spool 511 synchronously. The spool 511 is fixed to the driving shaft 522 through a locating nut 522a, so the axial position of the spool 511 relative to the driving shaft 522 is limited.

The trimming head 510 further includes a connecting element 516 which is formed with a plurality of feeding teeth 516a for feeding line. The head housing 512 is formed with a plurality of matching teeth 512d for engaging with the feeding teeth 516a. The matching teeth 512d is engaged with the feeding teeth 516a so as to control the line bump feeding.

The trimming head 510 further includes a connecting shaft 513a fixed to the driving shaft 522. The fan 515 is fixed to the connecting shaft 513a, so that the fan 515 can be driven by the driving shaft 522 to rotate. The one-way bearing 513 is fixed to the connecting shaft 513a. In some embodiments, the connecting shaft 513a is disposed in the inner ring of the one-way bearing 513. So, the driving shaft 522 can drive the inner ring of the one-way bearing 513 to rotate, and the inner ring is rotated with the driving shaft 522 synchronously. Further, the connecting shaft 513a can limit the axial position of the one-way bearing 513 relative to the driving shaft 522. The connecting element 516 is fixed to the outer ring of the one-way bearing 513 and rotated with the outer ring synchronously. The one-way bearing 513 and the connecting element 516 are fixed by a screw 513b, so the displacement of the one-way bearing 513 and the connecting element 516 in the axial direction is limited. The connecting element 516 is engaged with the head housing 512 through the engagement of the feeding teeth 516a and the matching teeth 512d. The head housing 512 is driven to rotate by the connecting element 516.

Referring to FIGS. 5D-5L, the trimming head 510 further includes locating elements 517 for aligning the inner apertures 511a and the outer apertures 512c. When it is needed to add a new cutting line 501 to the spool 511, the user can make the head housing 512 rotate to align with the spool 511 conveniently. The cutting line 501 is passed through the outer apertures 512c of the head housing 512 and entered into the inner apertures 511a. The locating elements 517 are fixed to the spool 511. The trimming head 510 includes a pressing plate 517a for fixing the locating elements 517 to the spool 511. The lower cover 512b is formed with locating recesses 512e for engaging with the locating elements 517. When the locating elements 517 are entered into the locating recesses 512e partially, the inner apertures 511a and the outer apertures 512c are aligned.

Figure 5F:
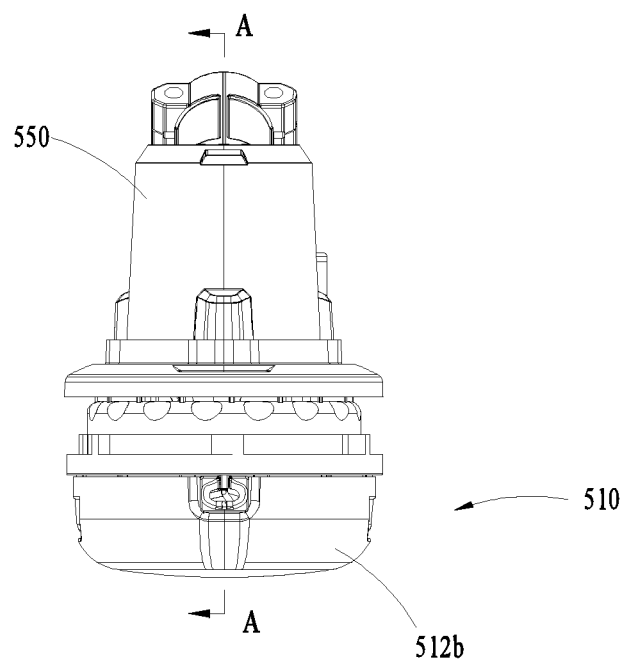
FIG. 5F is a plane view of the structure in FIG. 5B.
Figure 5G:
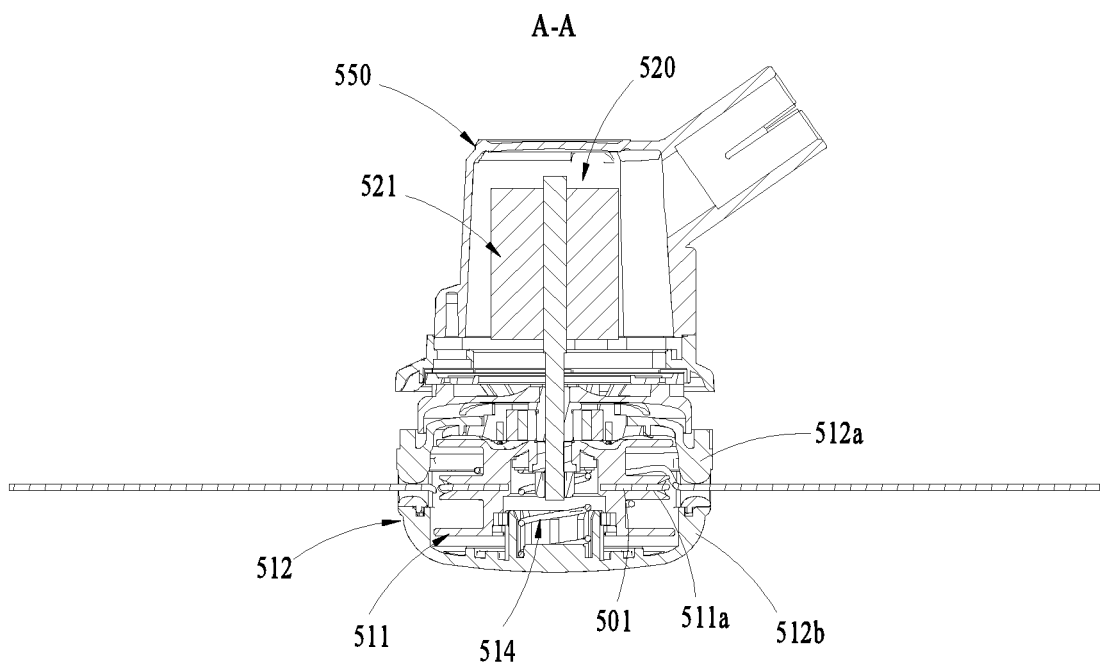
FIG. 5G is a sectional view of the structure cut along line A-A in FIG. 5F.
Figure 5H:
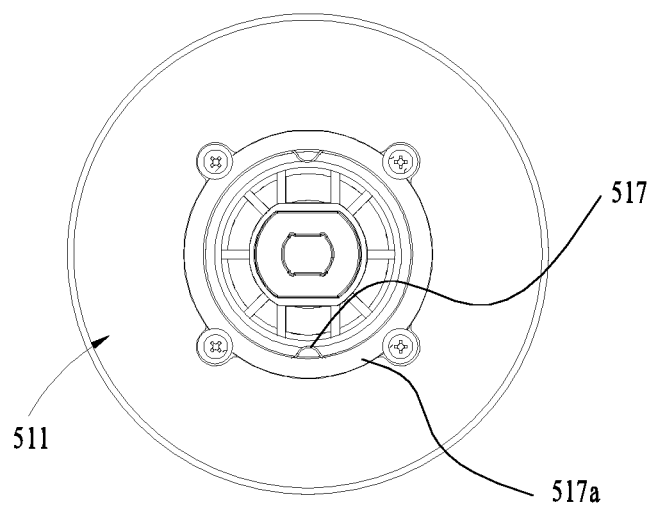
FIG. 5H is a schematic view of a spool and a positioning element in FIG. 5D.
Figure 5I:
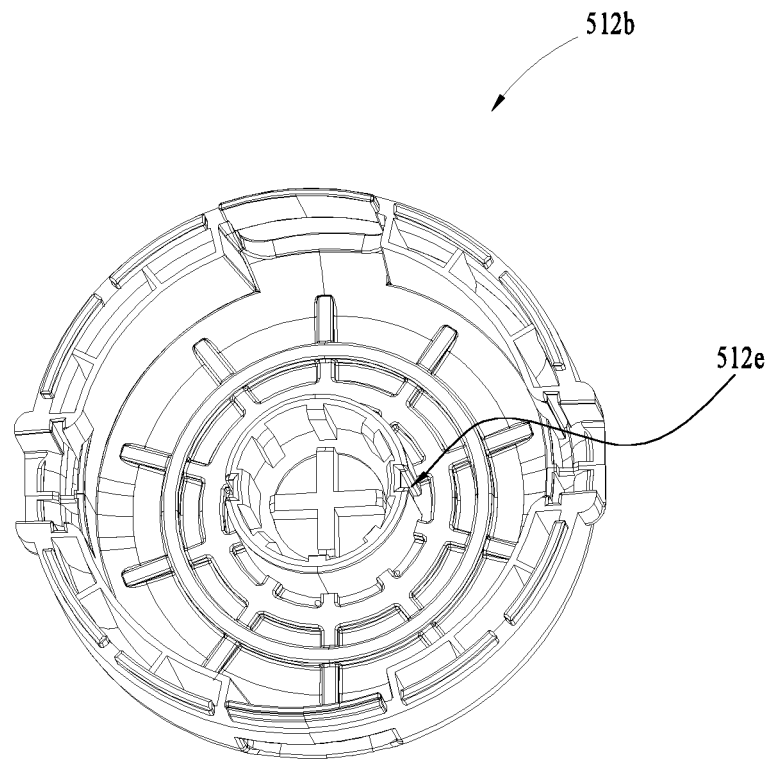
FIG. 5I is a schematic view of a lower cover in FIG. 5D.
Figure 5J:
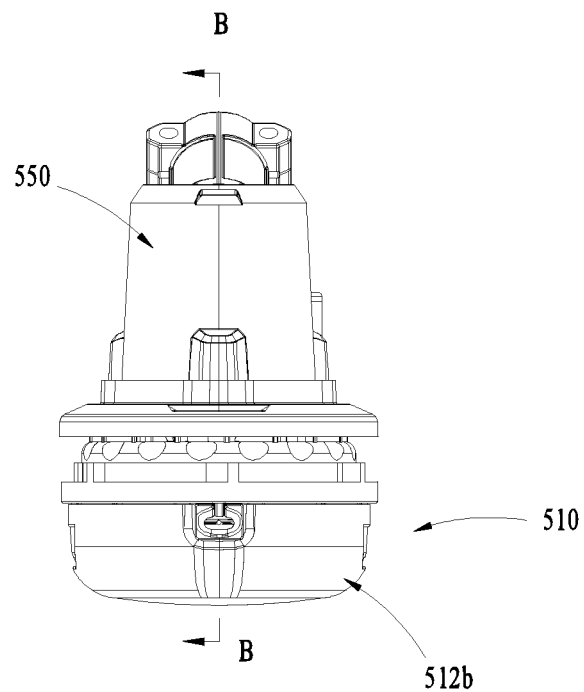
FIG. 5J is a schematic view of the trimming head in FIG. 5F, wherein the trimming head is moved upwardly relative to the first housing.
Figure 5K:
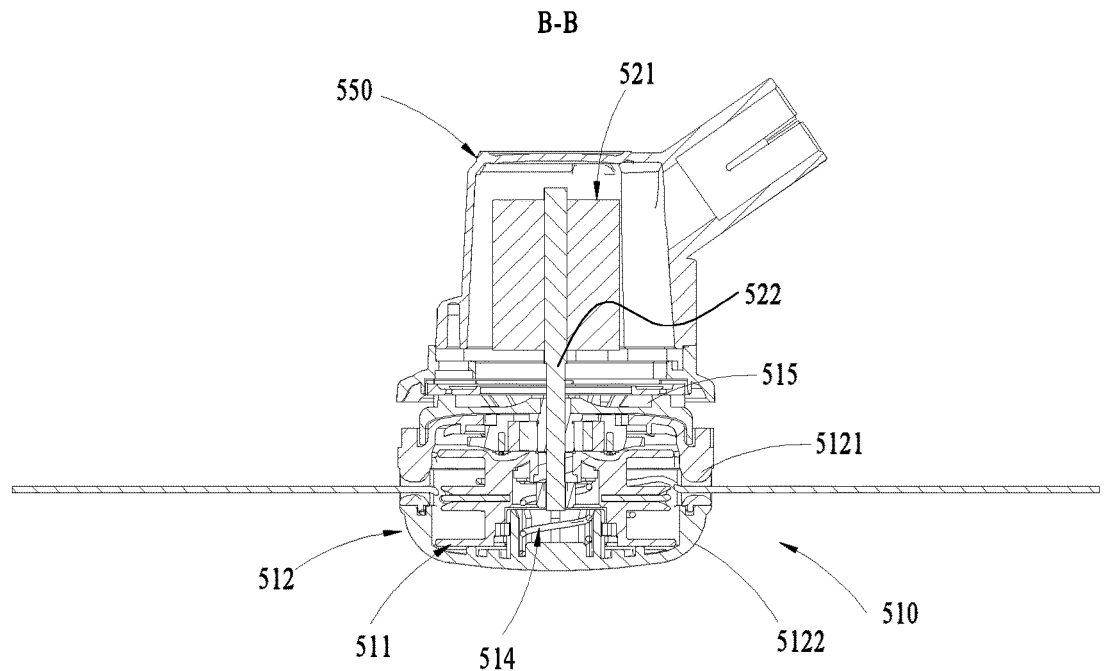
FIG. 5K is a sectional view of the structure cut along line B-B in FIG. 5J.

Referring to FIGS. 5F and 5G, the trimming head 510 is in a free state which is not bumped. Referring to FIGS. 5J and 5K, the trimming head 510 is in a compressed state which is bumped. When the user bumps the trimming head 510 to feed the cutting line 501, the lower cover 512b is contacted with the ground, and the ground applies an upward force to the lower cover 512b so that the upper cover 512a and the lower cover 512b move upward to the state in FIGS. 5J and 5K relative to the spool 511, the fan 515, the motor 521 and the driving shaft 522. At this moment, the head housing 512 is rotated to a certain angle relative to the spool 511. The angle is limited by the engagement of the feeding teeth 516a and the match teeth 512d, so a specific length of the cutting line 501 is released. When the user raises the trimming head 510, the force acting on the lower cover 512b by the ground disappears. The elastic element 514 generates a force to snake the lower cover 512b move downward or in a direction far from the spool 511 to the state in FIGS. 5F and 5G. The line bump feeding is finished. This feeding mode is called bump feeding mode. The feeding mode means that an end of the cutting line 501 is disengaged from the spool 511 and extended out of the head housing 512. Therefore, the length of the cutting line 501 located out of the head housing 512 is increased. In other words, the length of the cutting line 501 for cutting vegetation is increased.

As shown in FIG. 5B, when the grass trimmer is in the cutting mode, the trimming head 510 is rotated clockwise in a direction indicated by an arrow. The spool 511 and the head housing 512 are all rotated clockwise. In the cutting mode, the cutting line 501 is fixed relative to the trimming head 510. The spool 511 is fixed relative to the head housing 512. The grass trimmer 500 also has the auto-winding mode. In the auto-winding mode, the spool 511 is rotated relative to the head housing 512, and the cutting line 501 located out of the head housing 512 is wound on the spool 511 gradually. The rotation direction of the spool 511 in the auto-winding mode is opposite to the rotation direction of the spool 511 in the cutting mode. In the auto-winding mode, the head housing 512 is fixed. In some embodiments, the head housing 512 is stopped from rotating in the same direction as the spool 511. That is, the head housing 512 is stopped from rotating counterclockwise.

Refereeing to FIGS. 5L to 5Q, the grass trimmer 500 further includes a damping device 540 which is fixed by the first housing 550. The damping device 540 includes a stopping element 541 which is a damping element. The stopping element 541 is used to stop the head housing 512 rotating in one direction relative to the first housing 550. The damping device 540 further includes an activating element 542 and a reset spring 543. The stopping element 541 is controlled to be at different positions by the activating element 542. The reset spring 543 can generate force acting on the stopping element 541 so as to make the stopping element 541 restore to an initial state. The grass trimmer 500 further includes a guard 551 fixed on the first housing 550.

The reset spring 543 is connected with the stopping element 541 and the guard 551 on its two ends respectively and can apply force between the stopping element 541 and the guard 551. The damping device 540 includes a protecting element 544 and a guiding element 545. The activating element 542 is covered by the protecting element 544 so that the user is easy to operate the activating element 542. The guiding element 545 is engaged with the stopping element 541 and the activating element 542 so as to guide the stopping element 541 and the activating element 542. The guiding element 545 is fixed on the first housing 550, which can be integrated with the guard 551 or the first housing 550. The guard 551 can be integrated with the first housing 550. The guard 551, the first housing 550 and the guiding element 545 can be integrated as a component.

The head housing 512 is provided with stopping bulges 512f. The stopping bulges 512f can be engaged with the stopping element 541 for stopping the head housing 512 from rotating relative to the spool 511. In some embodiments, the stopping bulges 512f are formed on the upper cover 512a and located on the edge of the upper cover 512a.

Figure 5L:
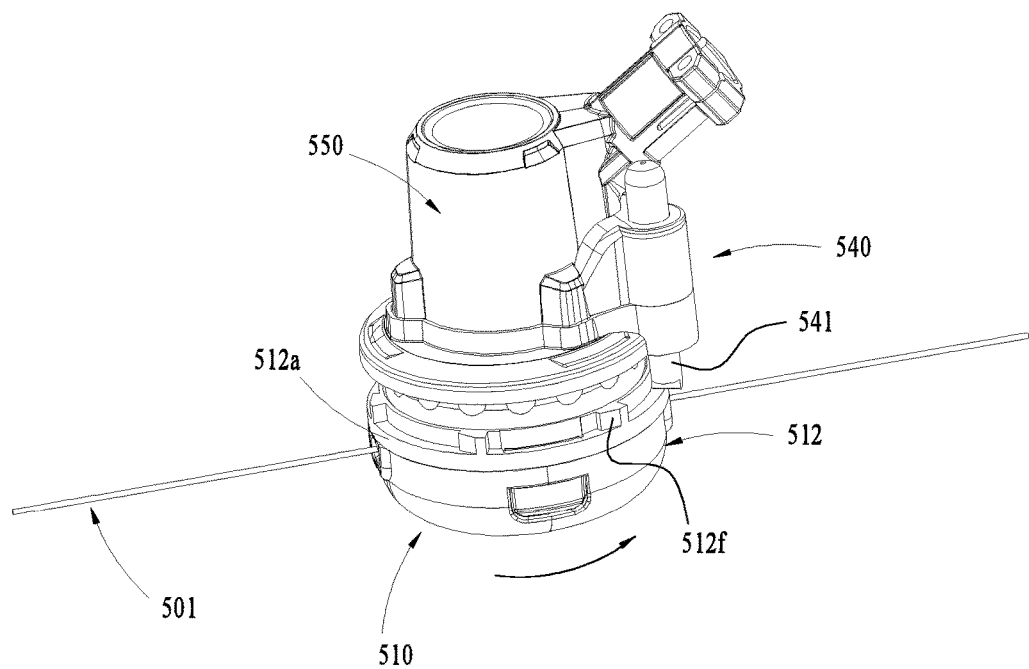
FIG. 5L is a schematic view of a damping device in FIG. 5A.
Figure 5M:
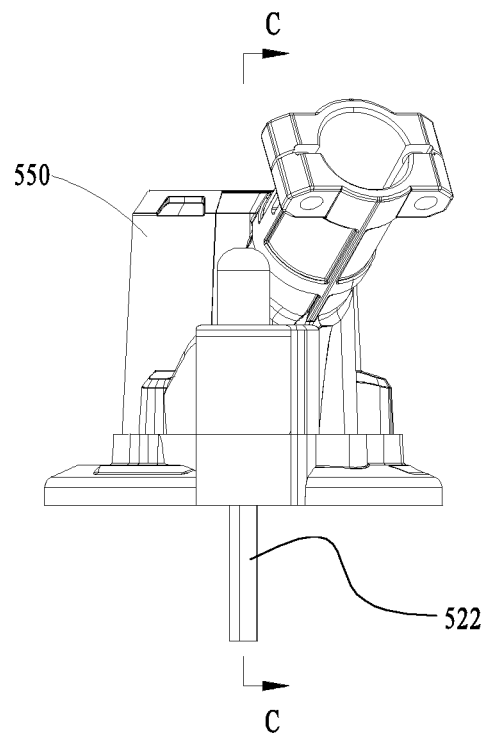
FIG. 5M is a schematic view of the first housing and a driving shaft in FIG. 5C.
Figure 5N:
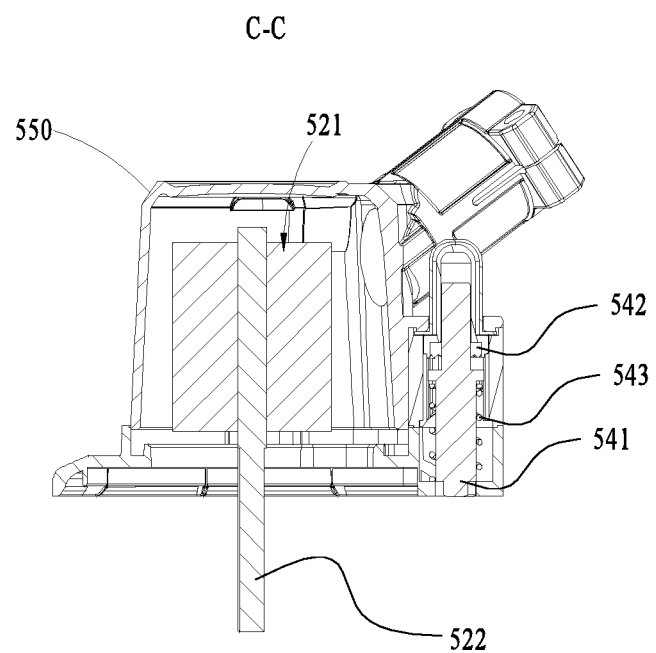
FIG. 5N is a sectional view of the structure cut along line C-C in FIG. 5M.
Figure 5O:
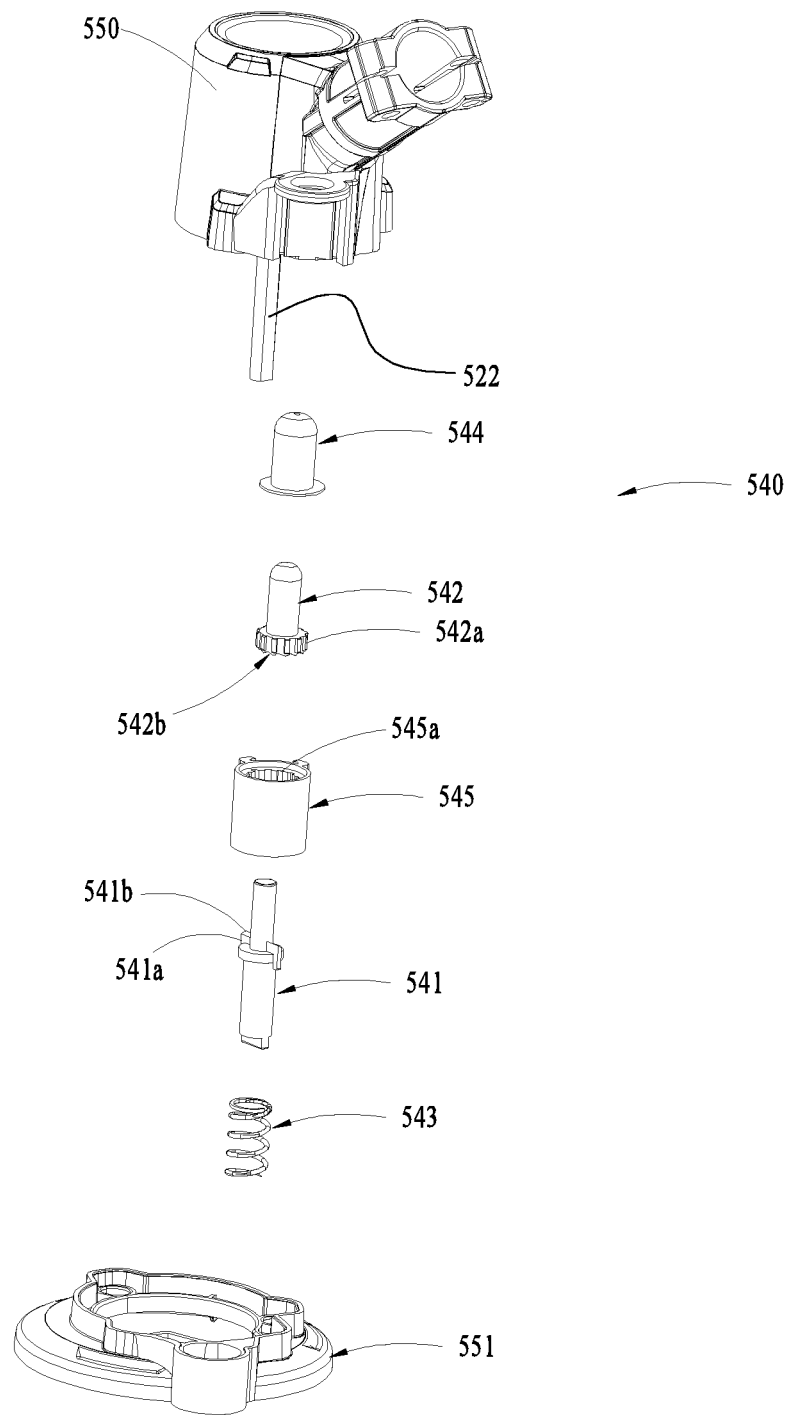
FIG. 5O is an exploded view of the damping device in FIG. 5A.
Figure 5P:
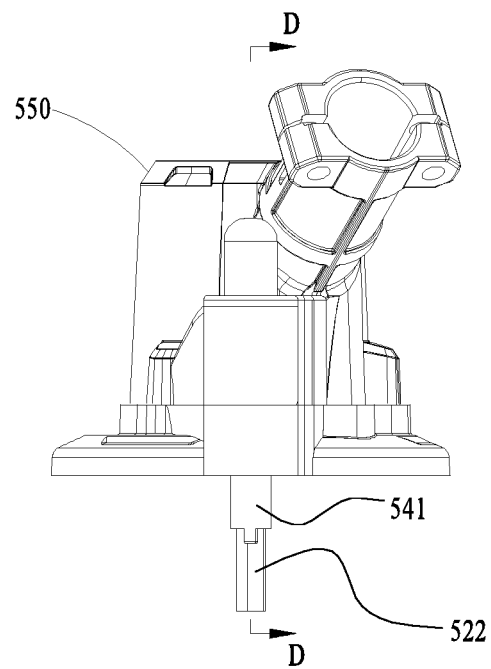
FIG. 5P is a plane view of the damping device in FIG. 5A, wherein a stopping element of the damping device is at a stopping position.
Figure 5Q:
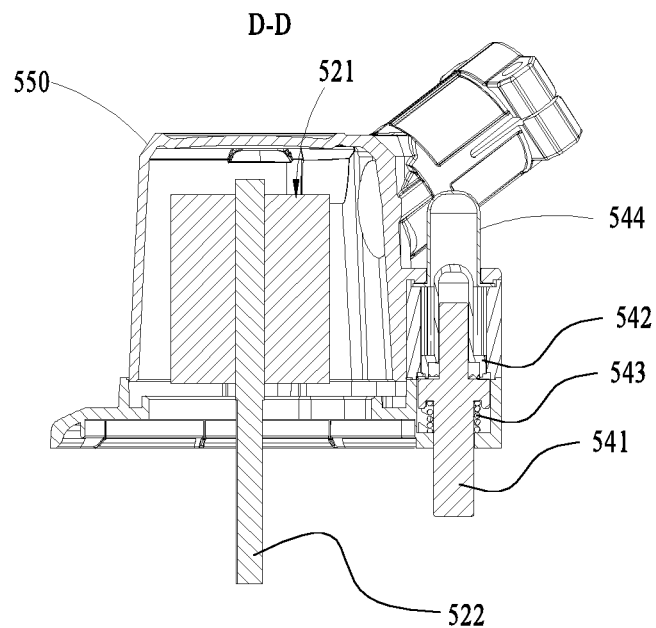
FIG. 5Q is a sectional view of the structure cut along line D-D in FIG. 5P.

The stopping element 541 has a first position and a second position relative to the trimming head 510 or the first housing 550. Referring to FIGS. 5B and 5N, in the first position, that is the initial position of the stopping element 541, the stopping element 541 is separated from the head housing 512 and disengaged with the stopping bulges 512f to stop the head housing 512 from rotating in one direction. Or, it could be said that the stopping element 541 is not extended downward. Referring to FIGS. 5L and 5Q, in the second position, that is a stopping position, the stopping element 541 is contacted with the head housing 512 so as to stop the head housing 512 from rotating in one direction relative to the first housing 550. In some embodiments, the engagement of the stopping element 541 and the stopping bulges 512f can stop the head housing 512 from rotating counterclockwise as the arrow shown in FIG. 5L.

The stopping element 541 is able to slide relative to the trimming head 510 or the first housing 550. The stopping element 541 is able to slide in the direction of the rotating axis of the trimming head 510. Or, it could be said that the sliding direction of the stopping element 541 is substantially parallel to the rotating axis of the trimming head 510. The stopping element 541 is able to rotate relative to the first housing 550 about a rotating axis. The rotating axis of the stopping element 541 is substantially parallel to the rotating axis of the trimming head 510 or the driving shaft 522.

In some embodiments, the stopping element 541 is provided with guiding ribs 541a. The guiding element 545 is formed with guiding slots 545a. When the stopping element 541 slides relative to the first housing 550, the guiding ribs 541a slide in the guiding slots 545a. The engagement of the guiding ribs 541a and the guiding slots 545a can stop the stopping element 541 from rotating relative to the first housing 550. The activating element 542 is provided with limiting ribs 542a. The engagement of the limiting ribs 542a and the guiding slots 545a can stop the activating element 542 from rotating relative to the first housing 550. The activating element 542 is formed with a driving surface 542b. The stopping element 541 is formed with an engaging surface 541b. In some embodiments, the driving surface 542b is formed on the bottom of the activating element 542, and the engaging surface 541b is formed on the top of the guiding ribs 541a. When the activating element 542 is pressed downward, the stopping element 541 is pressed to move downward by the activating element 542. The guiding ribs 541a of the stopping element 541 slide in the guiding slots 545a and disengage from the guiding slots 545a finally, and the limiting ribs 542a of the activating element 542 are still in the guiding slots 545a. So, the activating element 542 is stopped from rotating relative to the first housing 550. At this moment, the driving surface 542b is engaged with the engaging surface 541b so as to constitute an engagement of inclined surfaces. Thus, the stopping element 541 is rotated relative to the activating element 542 or the first housing 550 and reaches the stopping position finally.

When the auto-winding mode is finished, the user can control the trimming head 510 to enter the cutting mode or the feeding mode, and the trimming head 510 is rotated in another direction. In some embodiments, the rotation direction of the motor in the cutting mode is different from the rotation direction of the motor in the auto-winding mode. And the rotation direction of the motor in the feeding mode is different from the rotation direction of the motor in the auto-winding mode. When the auto-winding mode is finished and going into the cutting mode or the feeding mode, the trimming head 510 is driven to rotate reversely by the motor. At this moment, the head housing 512 is rotated clockwise in a direction indicated by the arrow in FIG. 19. This direction is opposite to the rotation direction of the head housing 512 stopped by the stopping element 541. The stopping bulges 512f on the head housing 512 is contacted with the stopping element 541 so as to drive the stopping element 541 to rotate. When the guiding ribs 541a of the stopping element 541 is rotated to align with the guiding slots 545a, the stopping element 541 is moved upward under the action of the reset spring 543. The guiding ribs 541a slide upward in the guiding slots 545a and restore to the initial position.

As shown in FIG. 5A, the operating device 530 includes a first operating element 531 and a second operating element 533. When the first operating element 531 is triggered, the grass trimmer 500 is in the cutting mode. The second operating element 533 is used for the user to start the auto-winding mode of the grass trimmer 500. The operating device 530 further includes a handle housing 532 for the user to grip. The first operating element 531 and the second operating element 533 are connected with the handle housing 532. The first operating element 531 and the second operating element 533 are close to each other for easy operation by the user.

In some embodiments, the grass trimmer 500 includes a first electronic switch and a second electronic switch. The first electronic switch is controlled by the first operating element 531, and the second electronic switch is controlled by the second operating element 533. When the first operating element 531 is triggered, the second operating element 533 cannot be triggered. Similarly, when the second operating element 533 is triggered, the first operating element 531 cannot be triggered. When the first operating element 531 is triggered, the grass trimmer 500 is in the cutting mode. And when the second operating element 533 is triggered while the first operating element 531 is not released, the grass trimmer 500 cannot go into the auto-winding mode. Similarly, when the second operating element 533 is triggered, the grass trimmer 500 is in the auto-winding mode. And when the first operating element 531 is triggered while the second operating element 533 is not released, the grass trimmer 500 cannot go into the feeding mode. Alternatively, the grass trimmer includes a first electronic switch which can be controlled by the first operating element and the second operating element.

The first operating element 531 is able to start the motor 521. When the motor 521 is started by the first operating element 531, the motor 521 rotates in a first running state.

The second operating element 533 is able to start the motor 521. When the motor 521 is started by the second operating element 533, the motor 521 rotates in a second running state. The rotation direction of the motor 521 in the first running state is different from the rotation direction of the motor 521 in the second running state. In the auto-winding mode, the motor 521 runs in the second running state. In the cutting mode, the motor 521 runs in the first running state, and the rotational speed of the motor 521 is greater than or equal to 4000 rpm and less than or equal to 8000 rpm.

In some embodiments, when the grass trimmer 500 is in the auto-winding mode, the rotational speed of the spool 511 is greater than or equal to 100 rpm and less than or equal to 2000 rpm. In some embodiments, the rotational speed of the spool 511 is greater than or equal to 300 rpm and less than or equal to 800 rpm. Alternatively, the rotational speed of the spool 511 is greater than or equal to 30 rpm and less than or equal to 600 rpm. Or, the rotational speed of the spool 511 is greater than or equal to 60 rpm and less than or equal to 300 rpm. A ratio of the rotational speeds of the spool 511 in the cutting mode and in the auto-winding mode is greater than or equal to 5 and less than or equal to 300. Further, the ratio of the rotational speeds of the spool 511 in the cutting mode and in the auto-winding mode is greater than or equal to 10 and less than or equal to 200.

Figure 6A:
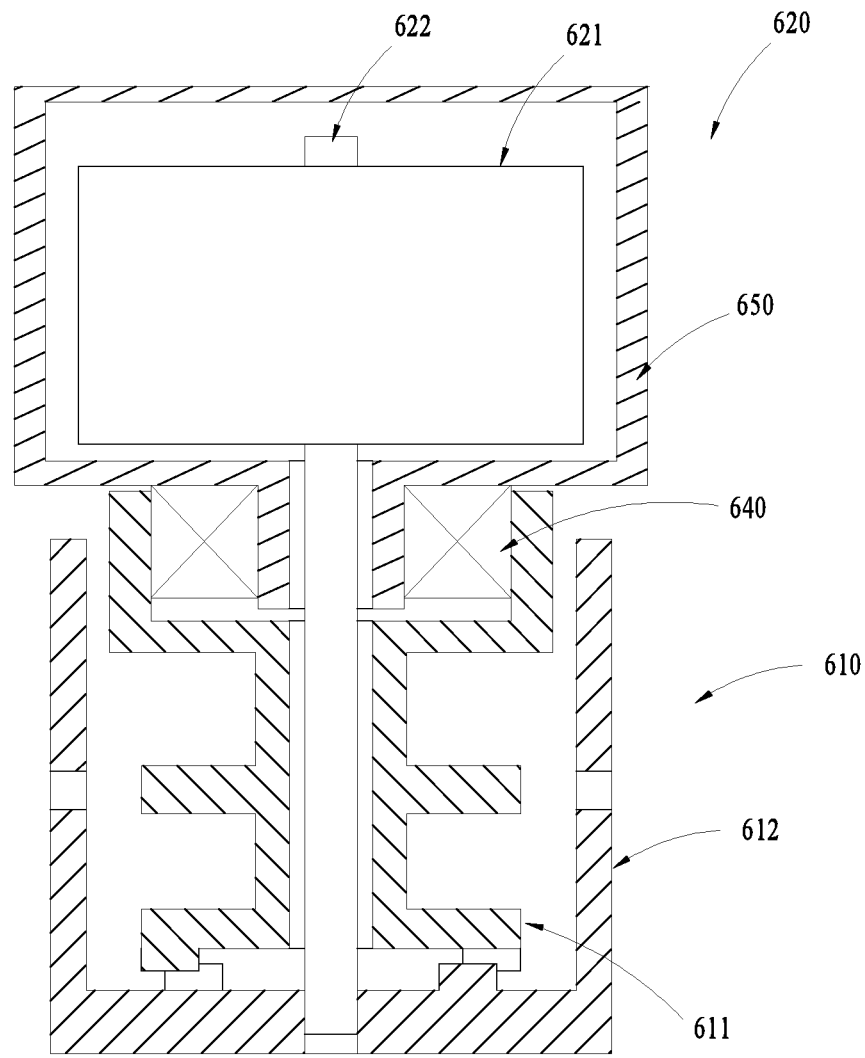
FIG. 6A is a schematic view of a trimming head, a motor and a damping device.

As shown in FIG. 6A, a motor 621 has a driving shaft 622 for driving a head housing 612 and a one-way bearing 640 and a damping device 611 are provided.

A driving device 620 includes the motor 621. A trimming head 610 includes a spool 611 and the head housing 612.

A supporting element 650 is configured as a housing for accommodating the motor 621, The one-way bearing 640 is disposed between the spool 611 and the supporting element 650, so that the spool 511 can only rotate unidirectionally relative to the supporting element 650.

The driving shaft 622 passes through the spool 611, but the spool 611 is not driven by the driving shaft 622 directly. That is, the torque is not transmitted directly between the driving shaft 622 and the spool 611. The driving shaft 622 is connected fixedly with the head housing 612, and the head housing 612 is driven by the head housing 612 directly. And then the spool 611 is driven by the head housing 612 through the transmission structure in FIG. 3B.

According to the example and the principle described above, when the motor 621 is rotated forwardly, the spool 611 and the head housing 612 can be rotated synchronously so as to perform the cutting mode. When the motor 621 is rotated reversely, the spool 611 is rotated relative to the head housing 612 so as to perform the auto-winding mode.

It can be understood that the damping device can not only apply a resistance force on the head housing to damp its rotation, but can also apply a resistance force on the spool to damp its rotation.

In another example, the damping device can apply a resistance force both on the head housing and on the spool. For example, more than one damping element can be disposed based on the embodiment in FIG. 6A, so that the head housing 612 can be damped and slowed down through contacting in the auto-winding made.

In other words, the damping device includes a first damping element and a second damping element. The first damping element can apply a first resistance force on the spool to damp its rotation. The second damping element can apply a second resistance force on the head housing to damp its rotation. Thus, the head housing can be rotated relative to the spool under the effect of the first resistance force and the second resistance force.

Figure 7A:
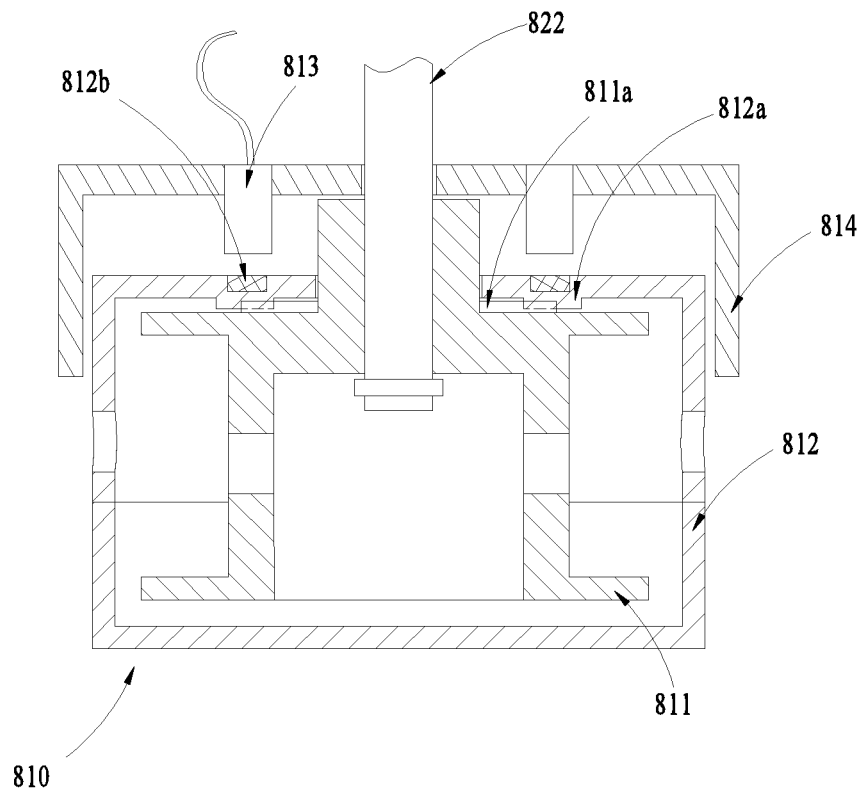
FIG. 7A is a schematic view of an electric magnet and a trimming head.
Figure 7B:
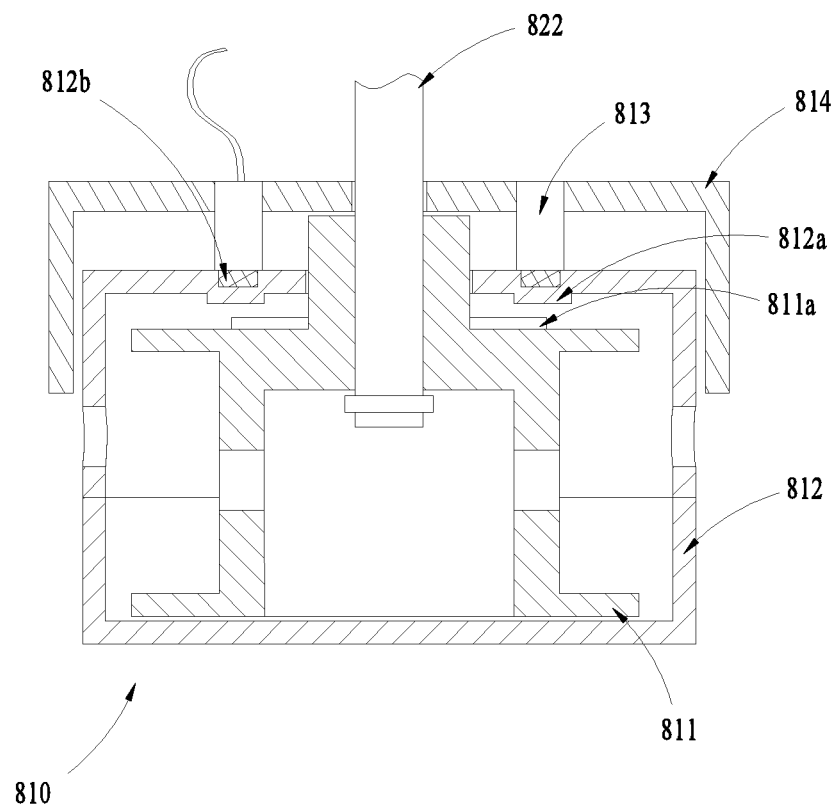
FIG. 7B is a schematic view of a head housing in FIG. 7A, wherein the head housing is moved relative to a spool.

Referring to FIGS. 7A-7B, a trimming head 810 includes a spool 811 and a head housing 812 which are similar to the spool and the head housing described previously. A driving shaft 822 is connected directly with the spool 811 so as to drive the spool 811 to rotate. The spool 811 and the head housing 812 are formed with transmission structures 811*a* and 812*a* respectively which can be engaged with each other. When the head housing 812 is at an axial position as shown in FIG. 7A, the transmission structures 811*a* and 812*a* are engaged with each other, so the head housing 812 is driven by the spool 811 to rotate together. While, when the head housing 812 is at an axial position as shown in FIG. 7B, the transmission structures 811*a* and 812*a* are disengaged from each other. At this moment, if the head housing 812 is damped, the spool 811 is rotated relative to the head housing 812.

For controlling the axial position of the head housing 812, an electromagnet 813 is provided, and a magnetic element 812*b* is fastened on the head housing 812. A supporting element 814 can be provided for mounting the electromagnet 813. The supporting element 814 can be a guard of the grass trimmer, a housing of the motor or other parts connected fixedly with them.

When it is needed to perform the auto-winding mode, the electromagnet 813 is powered on to generate a magnetic field so as to attract the magnetic element 812*b*. So, the axial position of the head housing 812 is changed. At this moment, the motor is controlled so as to make the driving shaft 822 drive the spool 811, and a relative rotation is created between the spool 811 and the head housing 812. While, when it is needed to perform the cutting mode, the electromagnet 813 does not generate the magnetic field, and the head housing 812 is moved in the axial direction so as to make the transmission structures 811*a* and 812*a* engage. Thus, the spool 811 and the head housing 812 are rotated synchronously.

Alternatively, the magnetic element 812*b* is an annular element. The electromagnet 813 is disposed at a corresponding position. However, a part of the head housing 812 can be made of magnetic material or metal material.

Figure 8A:
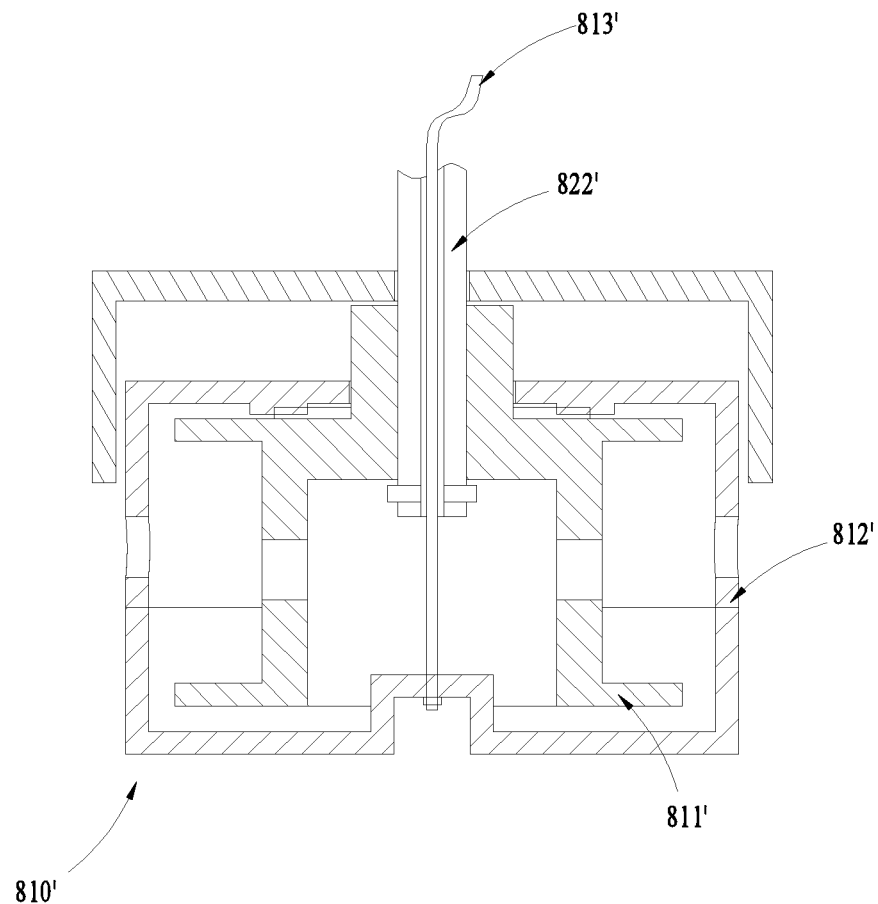
FIG. 8A is a schematic view of a head housing, wherein the head housing can be pulled by a rope.
Figure 8B:
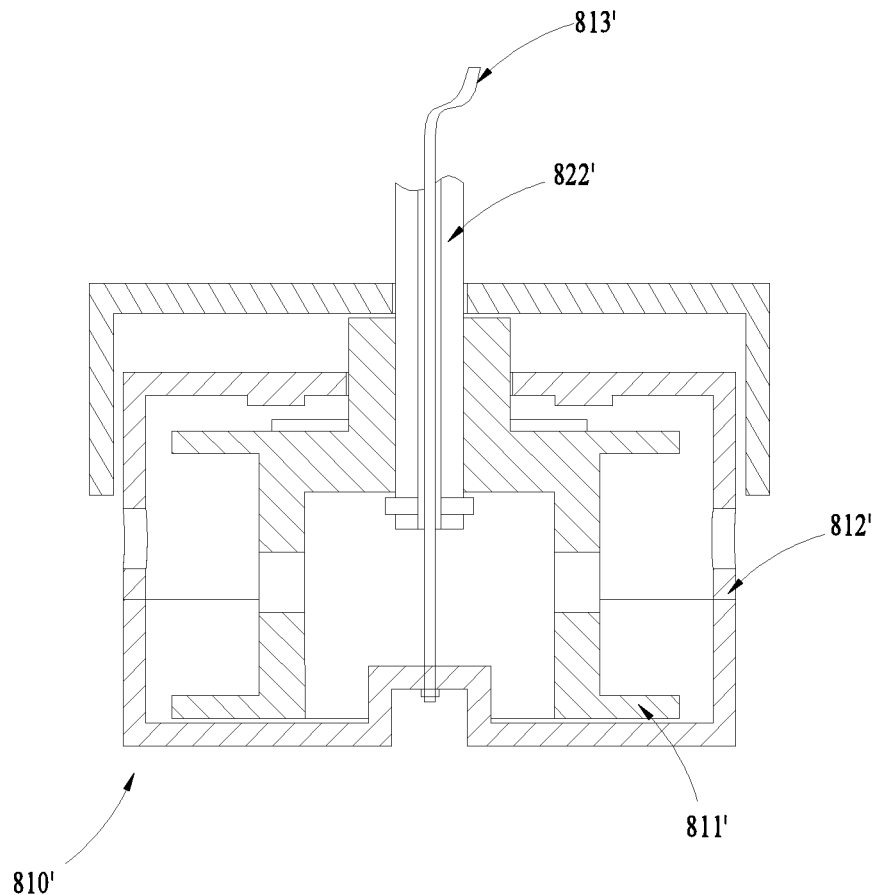
FIG. 8B is a schematic view of the head housing in FIG. 8a, wherein the head housing is moved relative to a spool.

Referring to FIGS. 8A-8B, a trimming head 810' includes a rope, wire, cable, or the like 813'. The rope 813' passes through a driving shaft 822' directly, which is used to pull a head housing 812' to change the position of the head housing 812'. Thus, a spool 811' can be rotated relative to the head housing 812'.

Figure 8C:
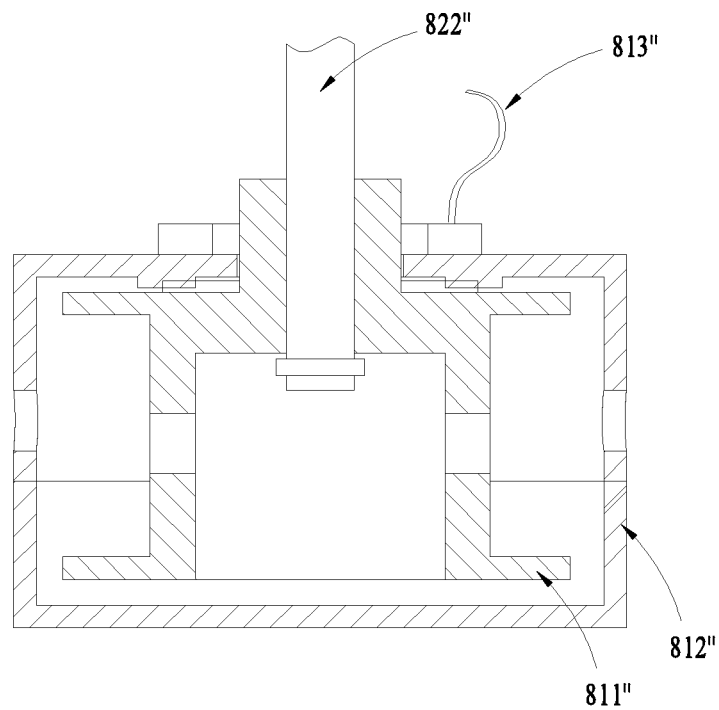
FIG. 8C is another schematic view of a head housing, wherein the head housing can be pulled by a rope.
Figure 8D:
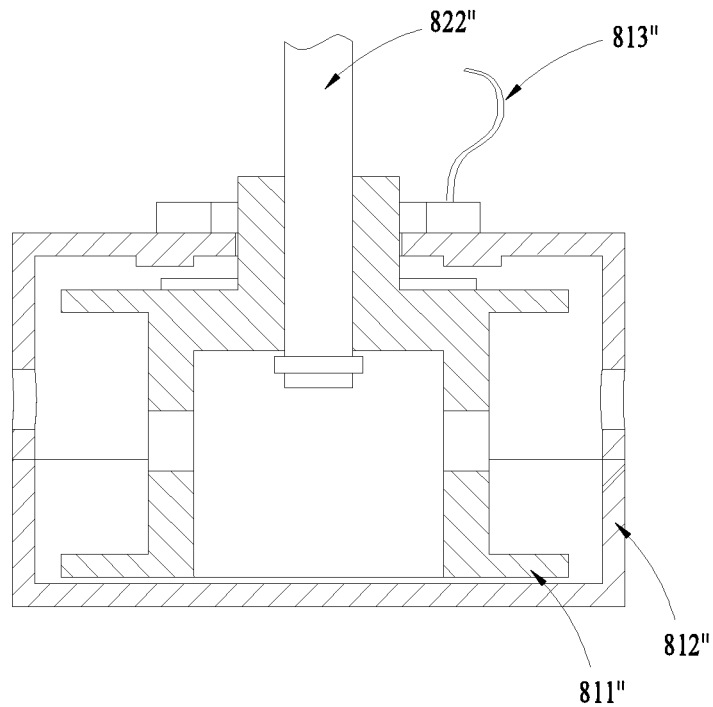
FIG. 8D is a schematic view of the head housing in FIG. 8C, wherein the head housing is moved relative to a spool.

Referring to FIGS. 8C-8D, a trimming head 810" includes a rope 813" for pulling a head housing 812" from the top so as to change the position of the head housing 812". Thus, a spool 811" can be rotated relative to the head housing 812". Surely, the motor can be used to drive the head housing or the similar method can be used to change its position so as to realize the function above.

In the embodiments as shown in FIG. 7A-8D, a clutch device is provided for disengaging the spool and the head housing when it is needed. So, only one of the spool and the head housing is driven by the driving shaft, and the relative rotation is created between them. While, when the spool and the head housing are needed to rotate synchronously, they are engaged, so that one of them can drive the other.

Figure 9A:
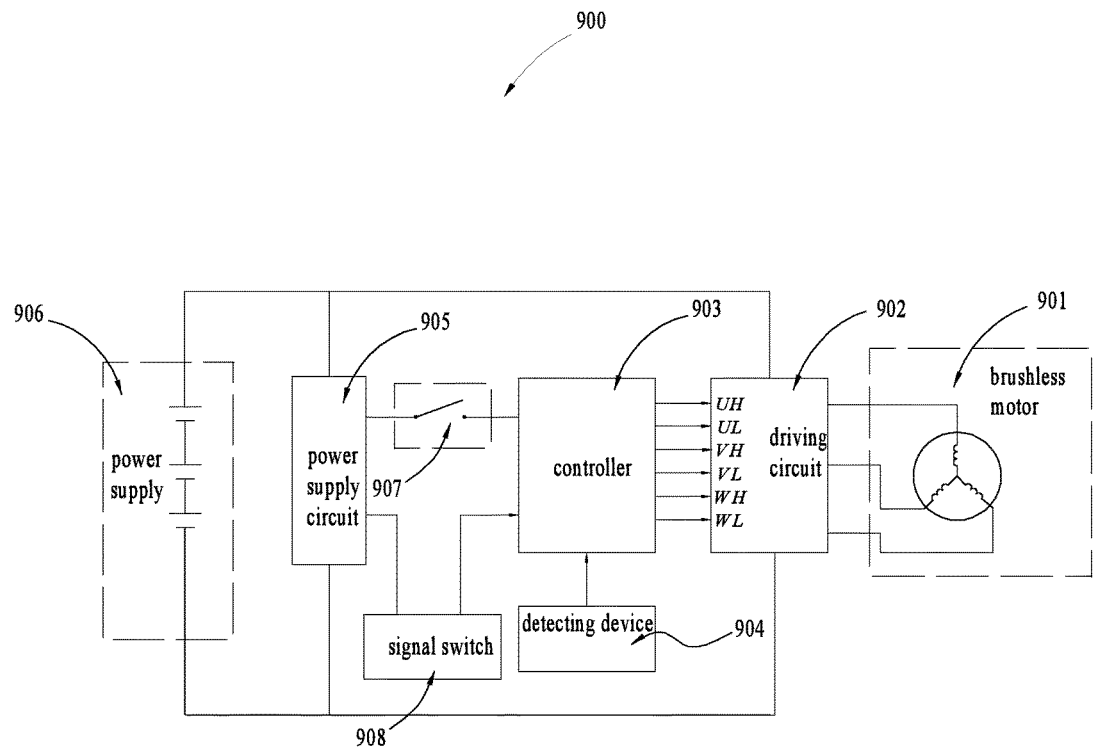
FIG. 9A is a circuit block diagram of a grass trimmer using a brushless motor.

As shown in FIG. 9A, a grass trimmer 900 includes a brushless motor 901, a driving circuit 902, a controller 903, a detecting device 904, a power supply circuit 905 and a power supply 906.

The brushless motor 901 includes three-phase windings with Y-type connection. Surely, the three-phase windings can use triangular connection.

Figure 9B:
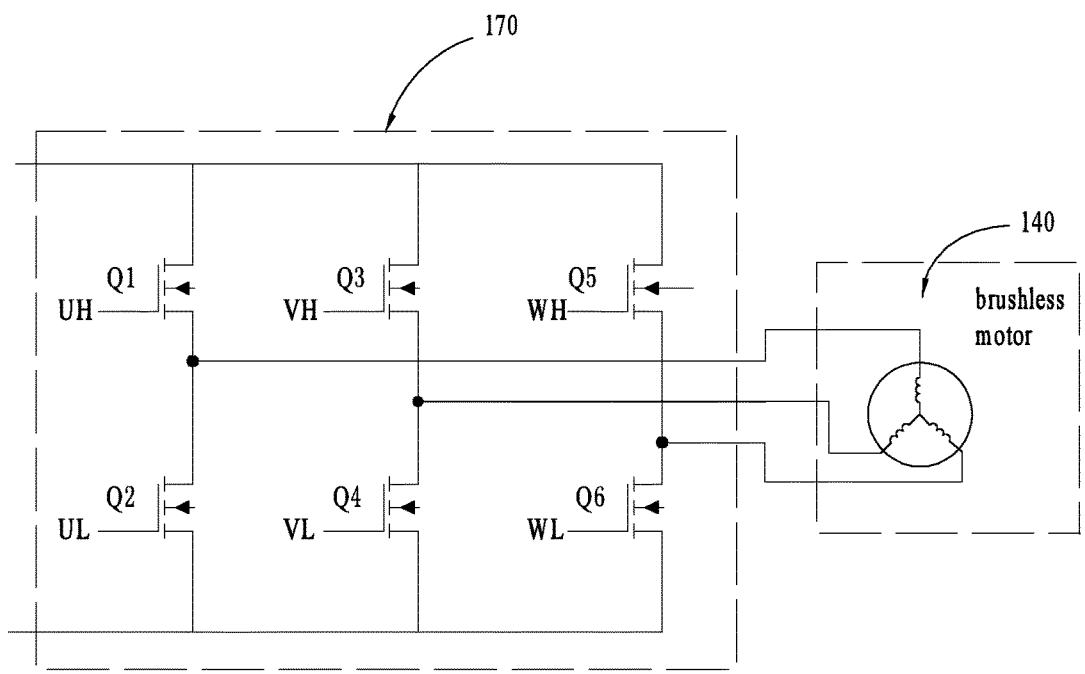
FIG. 9B is a schematic view of a driving circuit in FIG. 9A.

The driving circuit 902 is used to drive the brushless motor 901. As shown in FIG. 9B, the driving circuit 902 includes six semiconductor switches Q1-Q6 which constitute a full-bridge circuit with six arms. The terminals of the windings of the brushless motor 901 are connected between two corresponding semiconductor switches of the driving circuit 902. The semiconductor switches Q1-Q6 can be driven by corresponding electrical signals so as to conduct the circuit at a certain duty cycle. Thus, the current passes the corresponding winding to drive the brushless motor 901. It is noted that the controlling signal can control the current of the brushless motor 901 through controlling the duty cycle of the semiconductor switches Q1-Q6 so as to control the speed of the brushless motor 901.

The controller 903 is used to control the driving circuit 902, and in particular to send controlling signals to the driving circuit 902. The controller 903 can be constituted by a main chip mainly for operating and outputting signals and a driving chip mainly for sending driving signals to the driving circuit 902. The main chip controls the driving circuit 902 through controlling the driving chip. Surely, the controller 903 can be constituted by one chip.

The detecting device 904 includes a Hall sensor which including several Hall elements. The detecting device 904 can determine the speed of a rotor of the brushless motor 901 according to the signal change of the Hall elements.

The detecting device 904 can detect the voltage and current of the windings of the brushless motor 901 and feedback to the controller 903 as the control basis of the controller 903.

The power supply circuit 905 is mainly used to adjust the voltage of the power supply 906 so that the controller 903 can obtain proper power supply. The power supply 906 is mainly used to supply power to the grass trimmer 900. Alternatively, the power supply 906 is a battery device which can be charged repeatedly.

In this example, a physical switch 907 can be disposed between the controller 903 and the power supply circuit 905 which can be controlled by the user to switch on or off the electric connection between the controller 903 and the power supply circuit 905, so the controller 903 cannot drive the brushless motor 901.

The physical switch 907 can be acted as a main switch of the grass trimmer 900, which is used for the user to control the start of the brushless motor 901.

As shown in FIG. 9A, a signal switch 908 can be provided. The signal switch 908 is able to be operated by the user to send different signals. The controller 903 can output different control modes according to the signals sent by the signal switch 908, so that the brushless motor 901 has different running states. Thus, the signal switch 908 can be acted as an operating element for the user to choose the cutting mode or the auto-winding mode.

In some embodiments, when the user chooses the cutting mode, the signal switch 908 sends a first signal. At this moment, the user controls the physical switch 907 to power on the controller 903. The controller 903 enters a first control mode according to the first signal received and outputs the driving signal to the driving circuit 902 so as to make the brushless motor 901 rotate forwardly at a high speed. When the user chooses the auto-winding mode, the signal switch 908 sends a second signal which is different from the first signal. The controller 903 enters a second control mode according to the second signal and outputs the control signal so as to make the brushless motor 901 rotate reversely at a low speed.

Surely, two physical switches or two signal switches can be used, which can be used to switch the modes and control the start of the brushless motor 901 respectively.

The speed can be controlled by the duty cycle used for driving the driving circuit 902 when the controller 903 is in the first control mode and the second control mode. The controller 903 can output the driving signal at a high duty cycle in the first control mode, and output the driving signal at a low duty cycle in the second control mode.

Otherwise, in order to make the winding stop automatically, the current of the brushless motor 901 can be detected by the detecting device 904. As shown in FIG. 4H, when the winding is finished, the cutting line is tensioned, and the current of the brushless motor 901 is increased suddenly. The controller 903 can determine whether the cutting line is tensioned according to a current threshold or a current slop threshold so as to make the brushless motor 901 in the auto-winding mode stop.

Otherwise, as the cutting line is being wound, the load of the brushless motor 901 becomes high due to the increase of the mass of the cutting line. So, the current of the brushless motor 901 increases. Thus, a current threshold can be set to determine whether the winding is finished. Similarly, the speed of the motor decreases due to the increase of the load. Thus, a speed threshold or a speed slop threshold can be set to determine whether the winding is finished. When the speed decreases fast or decreases to a certain extent, the controller 903 determines that the auto-winding is finished.

Or, a position sensor or an optical sensor can be used to determine the position and state of the cutting line so as to finish the auto-winding mode.

Otherwise, based on the same principle, in order to prevent the user from starting the auto-winding mode accidentally while the trimming head still has cutting line stored therein, the controller 903 activates the auto-winding mode firstly. If a representation of the high load occurs, for example the large current or low speed, the controller 903 can determine that the auto-winding mode is not suitable for running at this moment. And then the brushless motor 901 is stopped to drive, and a sound signal or a light signal can be used to remind the user.

In a word, the controller 903 can determine the load state of the brushless motor 901 according to the speed or current of the brushless motor 901 so as to determine when to stop the winding and whether the auto-winding mode is suitable currently.

In some embodiments, the controller 903 can realize the controlling method as following:

a) starting the auto-winding mode;

b) determining whether the winding is suitable currently, if yes, then going to the next step, if no, the auto-winding is stopped; and c) determining whether the parameters (current, current slop, speed, speed slope) related to the load is beyond a preset range, if yes, the auto-winding mode is stopped, if no, the auto-winding mode is continued.

Figure 9C:
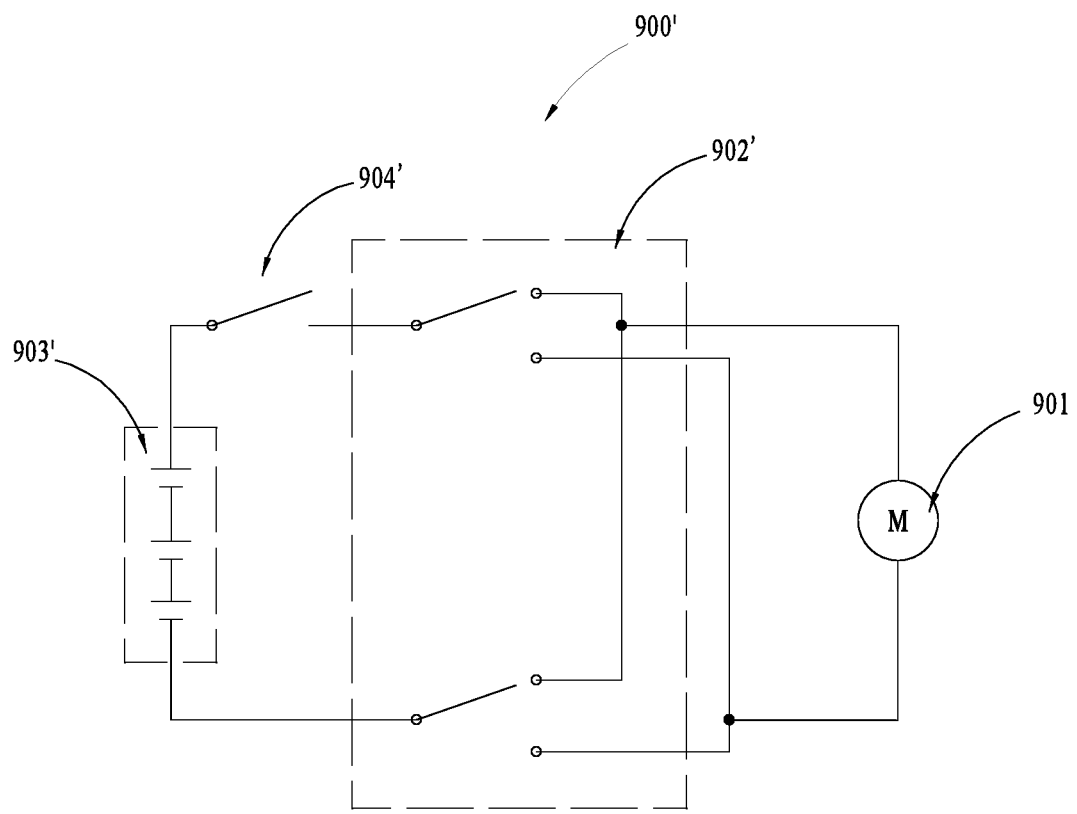
FIG. 9C is a circuit block diagram of a grass trimmer using a brush motor.

As shown in FIG. 9C, the grass trimmer 900 includes a brush motor 901'. In order to realize the switching between the forward rotation and the reverse rotation, a toggle switch 902' can be used to switch the connecting methods between the brush motor 901' and a power supply 903'. And then a main switch 904' can be operated to start the brush motor 901'.

Figure 10A:
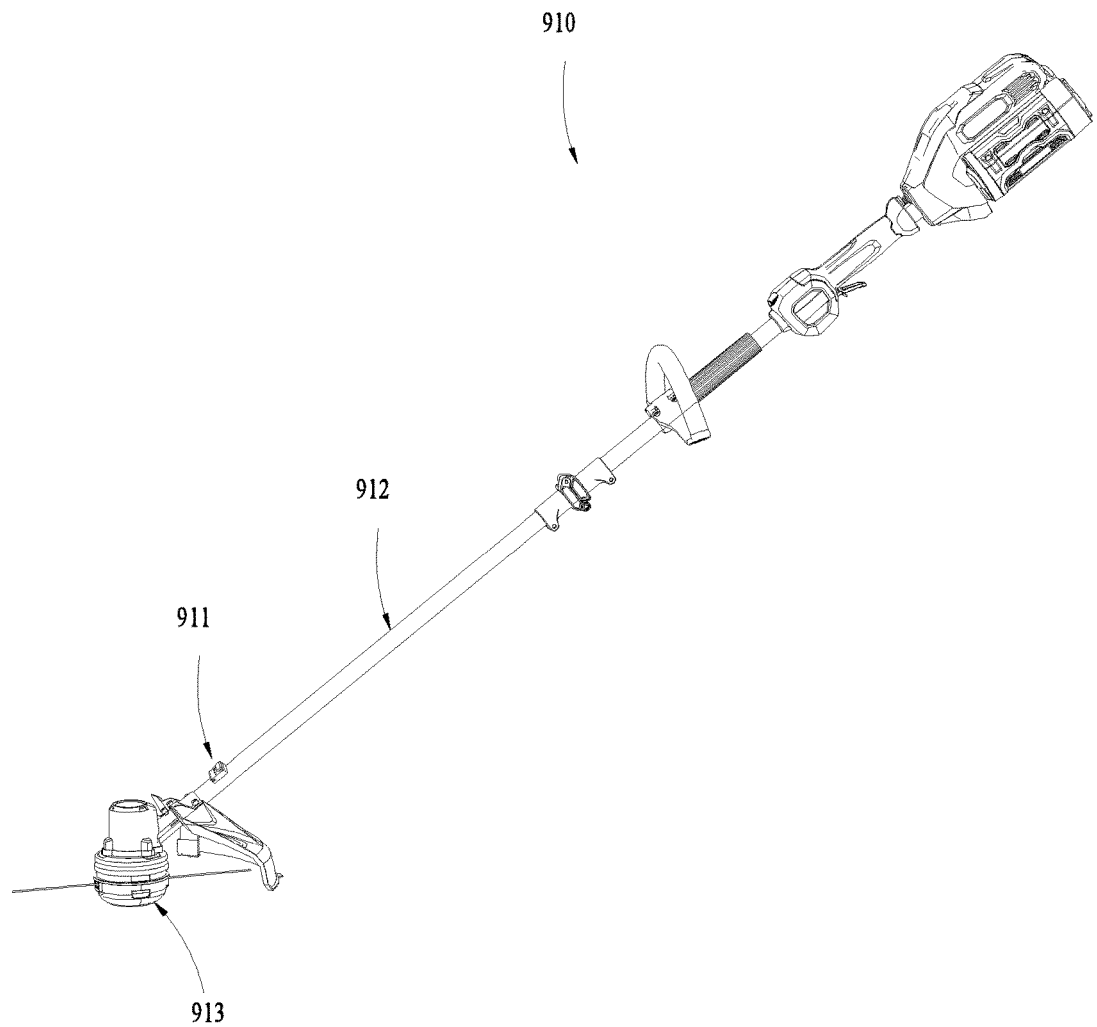
FIG. 10A is a schematic view of the second operating element disposed on a connecting rod assembly.

In some embodiments, a difference between the grass trimmer 910 in FIG. 10A and the grass trimmer 500 in FIG. 5A is the position of the second operating element. In FIG. 10A, the second operating element 911 is disposed on the connecting rod assembly 912 and close to the trimming head 913.

Figure 10B:
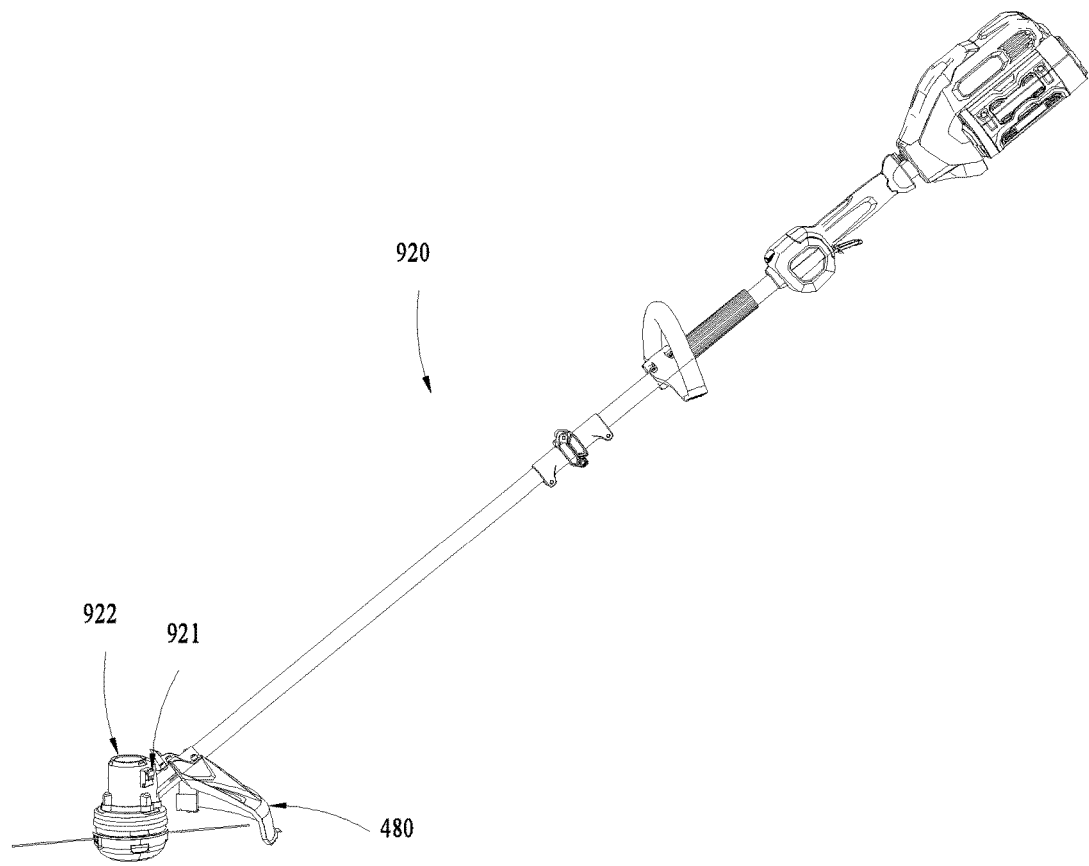
FIG. 10B is a schematic view of the second operating element disposed on the first housing.

As shown in FIG. 10B, a second operating element 921 of a grass trimmer 920 can be disposed on a first housing 922.

Figure 10C:
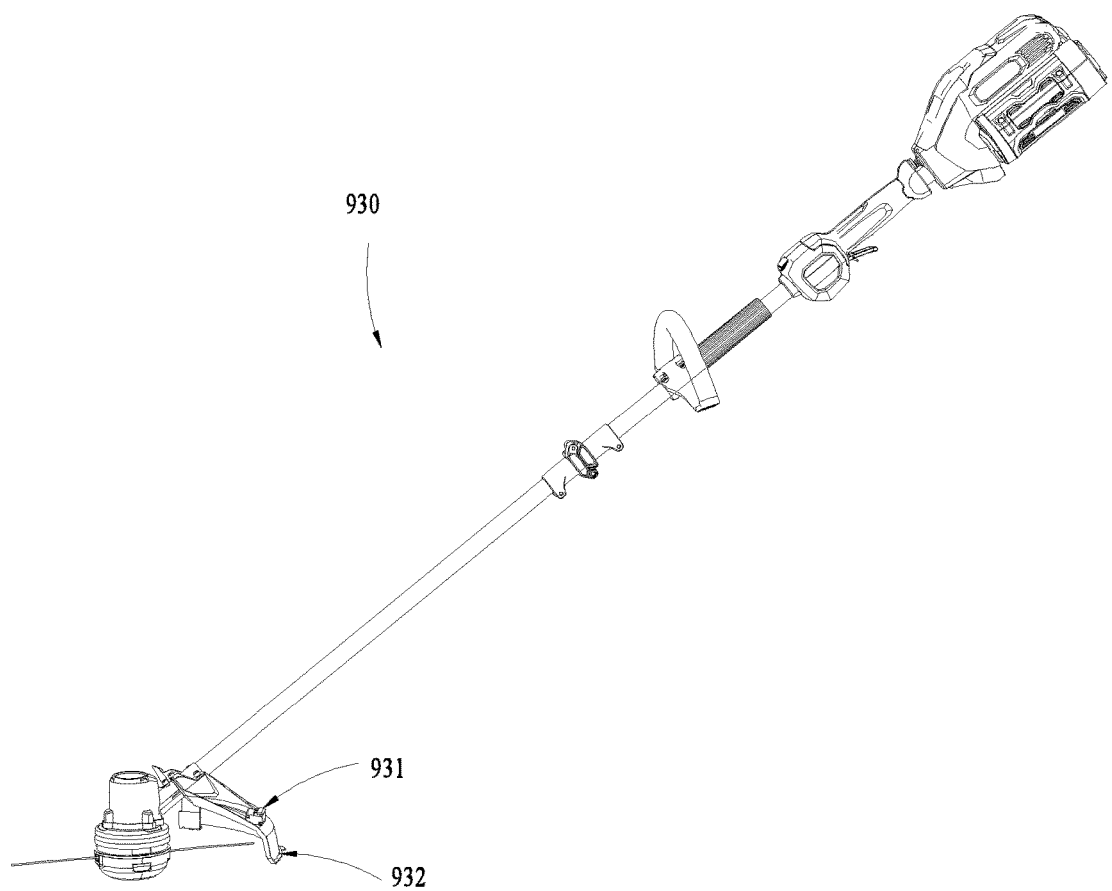
FIG. 10C is a schematic view of the second operating element disposed on a guard.

As shown in FIG. 10C, a second operating element 931 of a grass trimmer 930 can be disposed on a first housing 932.

The second operating element is disposed close to the trimming head, so that the user can start the auto-winding mode conveniently when the cutting line is inserted in the trimming head. Otherwise, the first operating element for starting the cutting mode is far from the second operating element, so that the user cannot touch the first operating element while the auto-winding is running. Similarly, the second operating element cannot be touched accidentally while the cutting mode is running.

Figure 11A:
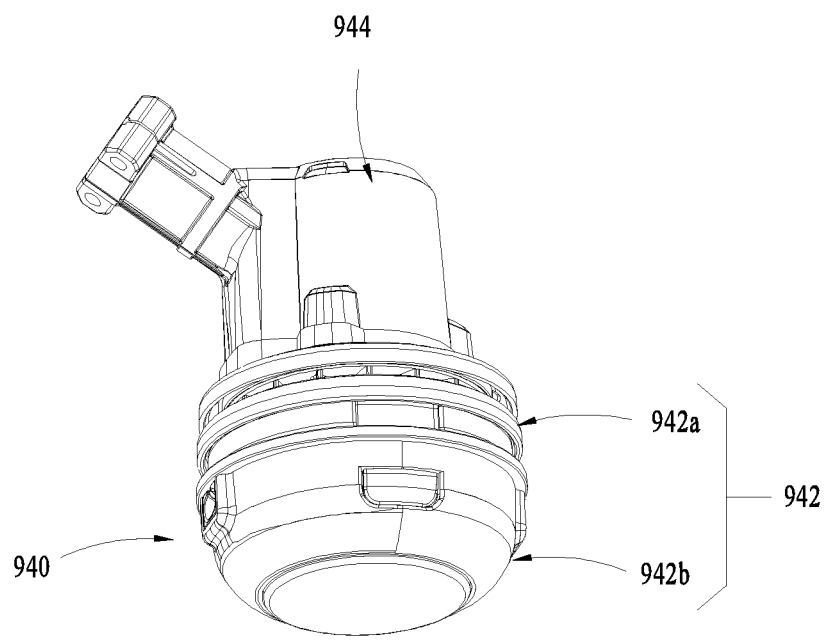
FIG. 11A is a schematic view of a grass trimmer having a line holding member.
Figure 11B:
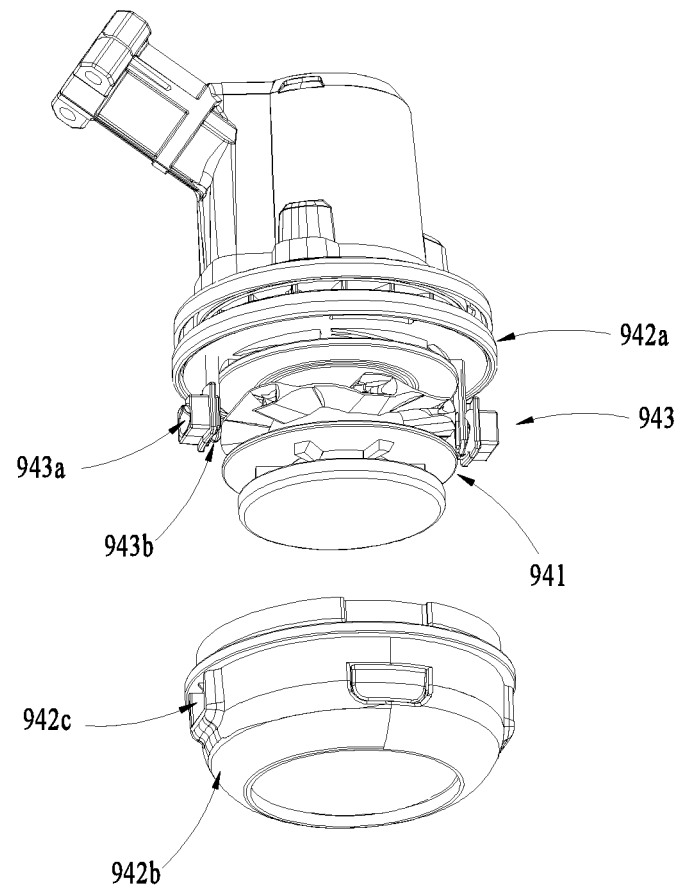
FIG. 11B is a schematic view of a head housing and a spool of the grass trimmer in FIG. 11A, wherein the head housing and the spool are separated.
Figure 11C:
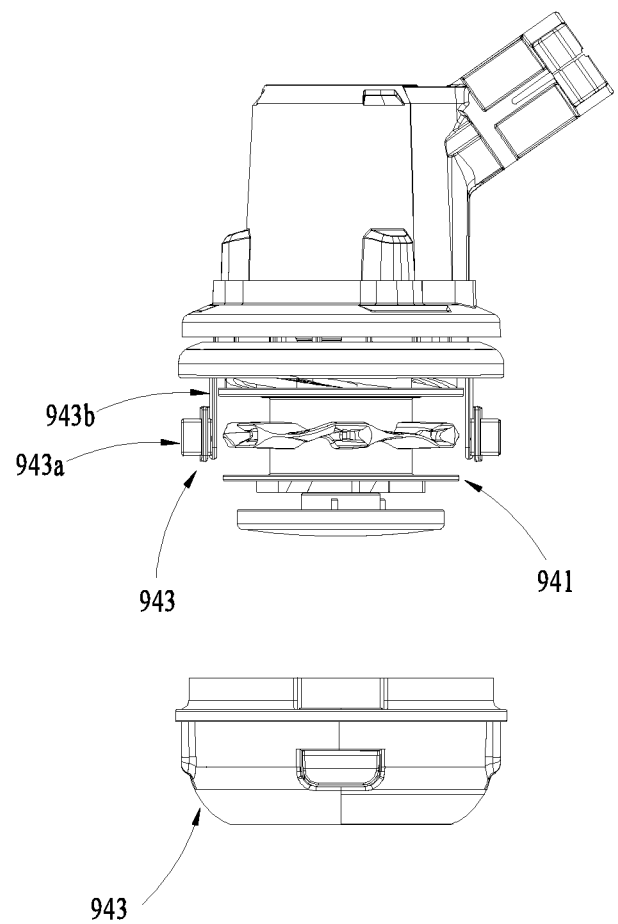
FIG. 11C is a plane view of the structure in FIG. 11A.

Referring to FIGS. 11A-11C, a grass trimmer 940 includes a spool 941, a head housing 942 and line frame elements 943. The spool 941 can be driven by a motor to rotate. The head housing 942 includes an upper cover 942a and a lower cover 942b which are detachable. The head housing 942 can be rotated relative to the spool 941. The line frame elements 943 can be mounted on the head housing 942, in particular on the upper cover 942a in a detachable or undetachable method. When the line frame elements 943 are mounted on the upper cover 942a, they can be rotated relative to the spool 941. Further, when the line frame elements 943 are mounted on the upper cover 942a, they can be rotated with the head housing 942 constituted by the upper cover 942a and the lower cover 942b synchronously, or with the upper cover 942a when the lower cover 942b is detached. Surely, the line frame elements 943 can be mounted on other part which is able to rotate relative to the spool 941.

The line frame elements 943 are formed with line frame structures 943a allowing the cutting line to pass through and connecting arms 943b for connecting the line frame structures 943a to make the line frame structures 943a locate on the outside of the spool 941. In some embodiments, taking the rotation axis of the spool 941 as an axial direction, the connecting arms 943b make the line frame structures 943a locate on the outside of the spool 941 in a circumferential direction.

When the line frame elements 943 are mounted on the head housing 942 in the undetachable method, the user can wind the cutting line without opening the head housing 942, that is without separating the upper cover 942a and the lower cover 942b. It is similar to the line winding method described above. The cutting line can be passed through apertures 942c of the head housing 942. Because the line frame elements 943 cannot be rotated relative to the head housing 942, the line frame structures 943a can be aligned with the apertures 942c. So, the cutting line can be passed through the line frame structures 943a and then inserted into the spool 941. Thus, when the auto-winding mode is entered, the spool 941 is rotated relative to the apertures 942c or the line frame structures 943a so that the cutting line is wound on the spool 941. The advantage is that the user can finish the line winding while not having to open the head housing 942.

The user also can realize the line winding in the method of opening the head housing 942, Firstly, the lower cover 942b is opened to expose the spool 941 and the line frame elements 943. And then, the cutting line is passed through the line frame structures 943a and inserted in the spool 941. When the line winding is ready, the grass trimmer can be operated so as to realize the relative rotation of the spool 941 and the line frame elements 943. So, the cutting line passes through the line frame structures 943a continuously and winds on the spool 941. When the line winding is finished, the lower cover 942b can be mounted back. The advantage is that, it is easy for the user to observe the state of line winding and control according to the state of line winding.

Alternatively, the line frame elements 943 can be omitted. A whole or a part of the head housing 942 can be made of transparent material, which can realize the object of observing the state of line winding as well.

Surely, the line frame elements 943 can be a detachable attachment. When it is needed to wind the cutting line, the head housing 942 can be opened, and the lower cover 942b can be separated. And then, the line frame elements 943 are mounted on the upper cover 942a or other part which is rotatable relative to the spool 941, for example a housing 944 for accommodating the motor. When the mounting is finished, the grass trimmer is passed through the line frame structures 943a and inserted in the spool 941. And then the spool 941 is driven to rotate. Surely, the line frame elements 943 can be driven. The cutting line can be wound on the spool 941 through the relative rotation between the spool 941 and the line frame elements 943. Then, the line frame elements 943 are detached, and the free ends of the cutting line can go out from the apertures 942c of the lower cover 942b. And then the lower cover 942b is coupled with the upper cover 942a, and the line winding is finished. Or, the upper cover 942a and the lower cover 942b can be formed with a half of the apertures 942c respectively. When the upper cover 942a and the lower cover 942b constitute a whole, the whole apertures 942c is formed. That is the upper cover 942a and the lower cover 942b are formed with two recesses respectively. After the line frame elements 943 are detached, the cutting line is located in the recesses of the upper cover 942a or the lower cover 942b, and then the upper cover 942a and the lower cover 942b are coupled as a whole. The cutting line can pass the apertures formed by the coupling of the upper cover 942a and the lower cover 942b. It is easy for the user to make the free ends of the cutting line go out of the head housing 942 from the inside.

The advantage of the detachable line frame elements 943 is that, for the grass trimmer with the head housing 942 being capable of detaching entirely or partially, the spool 941 can be exposed through detaching the head housing 942, and then the line frame elements 943 as an attachment is disposed (the line frame elements 943 may be not mounted on the head housing 942 but mounted on other part which is fixed relative to the motor, for example the housing of the Motor or the guard). And then the spool 941 is driven at a low speed so as to realize the auto-winding. This can make the previous grass trimmer without auto-winding function have the corresponding hardware structure for auto-winding after the line frame elements 943 are disposed. Surely, the speed of the motor for driving the spool 941 should be adjusted so that the spool 941 is rotated at a low speed during auto-winding to ensure user safety.

Referring to FIGS. 11A-11C, the line frame elements 943 are formed with the line frame structures 943a. When the auto-winding is performed, the line frame elements 943 can be rotated relative to the spool 941. The line frame elements 943 are equivalent to simulating the manual winding of the user's hand, and the line frame structures 943a are equivalent to the fingers for holding the cutting line. So, the line frame elements 943 can be defined as a line holding member for holding the cutting line so as to make the cutting line rotate relative to the spool. And the line frame structures 943a can be defined as a line holding structure which simulates the fingers to hold the cutting line at a location and allows the cutting line pass through the line frame structures 943a continuously so as to wind on the spool 941.

Figure 11D:
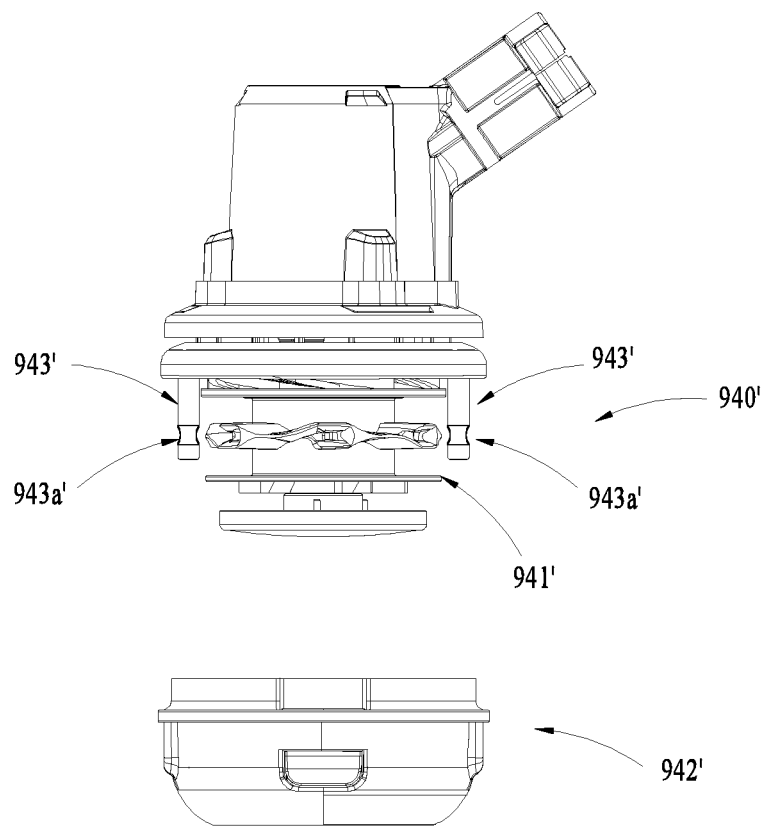
FIG. 11D is a schematic view of an exemplary line holding member.

As shown in FIG. 11D, a trimming head 940' includes a spool 941' and a head housing 942', which is similar to the trimming head 940 in FIGS. 11A-11C. The difference is that the line frame elements 943 are replaced by the winding pins 943'.

Similarly, the head housing 942' can be constituted by an upper cover 942a' and a lower cover 942b' which are detachable. The winding pins 943' similar to the line frame elements 943 can be detachable or undetachable, which can be mounted on other part being capable of rotating relative to the spool 941'. The difference is that the winding pins 943' are not formed with the line frame structures 943a, but formed with concave parts 943a', The concave parts 943a' can locate the cutting line going around the concave parts 943a'. When the winding pins 943' are rotated relative to the spool 941', they can drive the cutting line through the friction force so as to realize the auto-winding. So, the winding pins 943' can be defined as a line holding member, and the concave parts 943a' can be defined as a line holding structure.

Figure 12A:
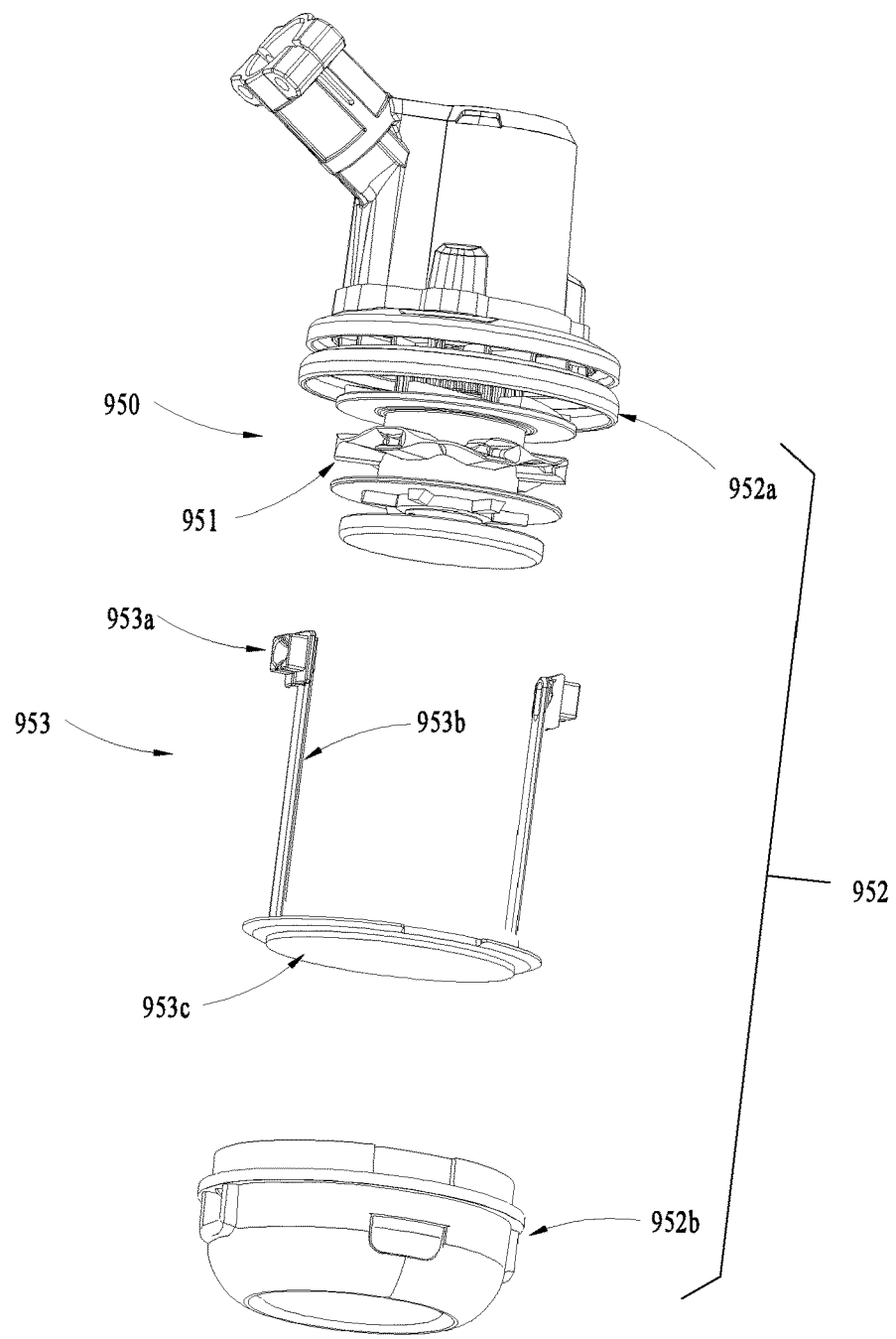
FIG. 12A is a schematic view of a trimming head and a line holding member acted as an attachment.
Figure 12B:
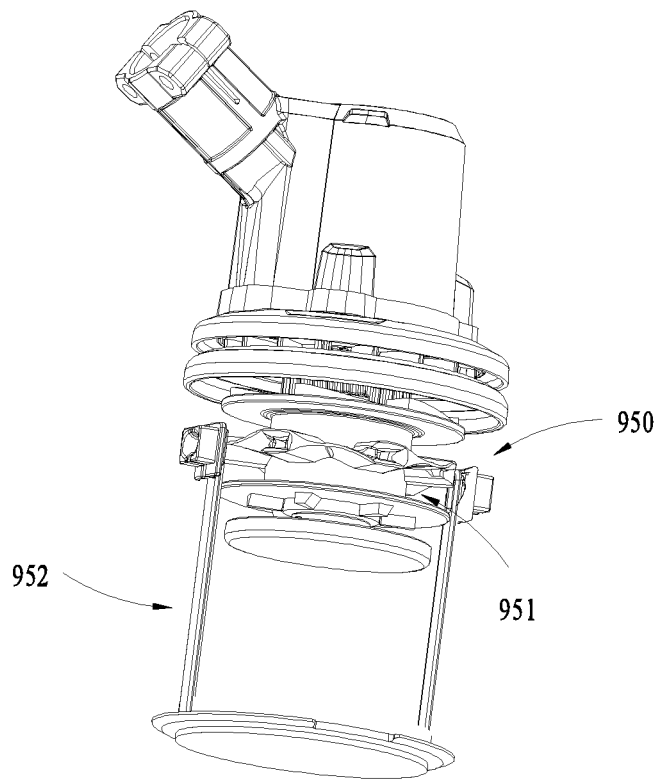
FIG. 12B is a schematic view of the line holding member in FIG. 12A, wherein the line holding member is in a working state.

Referring to FIGS. 12A-12B, line frame elements 953 can be acted as functional attachments which are independent of a trimming head 950. Line frame elements 953 include a fixing seat 953c except line frame structures 953a and connecting arms 953b. The fixing seat 953c is connected with the connecting arms 953b. When it is needed to wind the cutting line automatically, an upper cover 952a and a lower cover 952b of a head housing 952 are separated so as to expose a spool 951. And then, the cutting line is passed through the line frame structures 953a and inserted into the spool 951. And then, a motor is started to drive the spool 951. The spool 951 is rotated relative to the line frame elements 953 so as to realize the auto-winding.

Figure 12C:
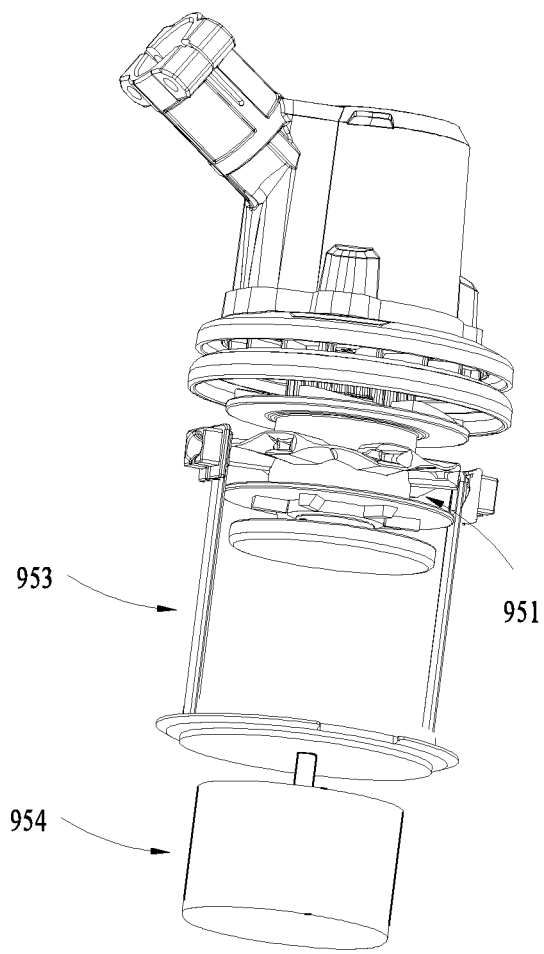
FIG. 12C is a schematic view of a line frame element, wherein the line frame element is driven by a motor.

In the embodiment in FIG. 12C, an auxiliary device such as a bracket can be used to fix the grass trimmer or the spool 951, and an extra motor 954 is used to drive the line frame elements 953 to rotate relative to the spool 951. So, the auto-winding is realized. In this embodiment, the requirements of configuration of the grass trimmer itself is reduced. The auto-winding can be realized through the line frame elements 953 acting as separate attachments or a combination of the line frame elements 953 and a corresponding driving device, as long as the head housing 952 can be opened. And it is no need to change the grass trimmer too much.

Figure 13A:
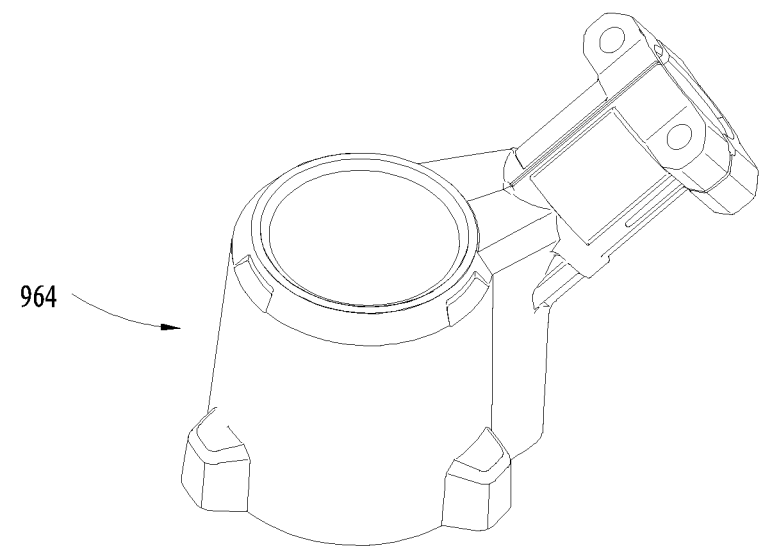
FIG. 13A is a schematic view of an energy storing device, a motor and a trimming head.
Figure 13A:
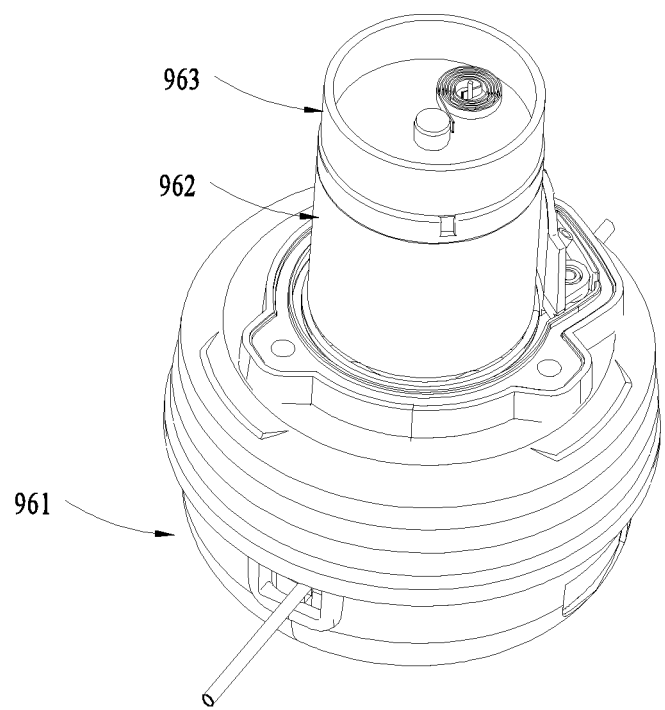
Figure 13B:
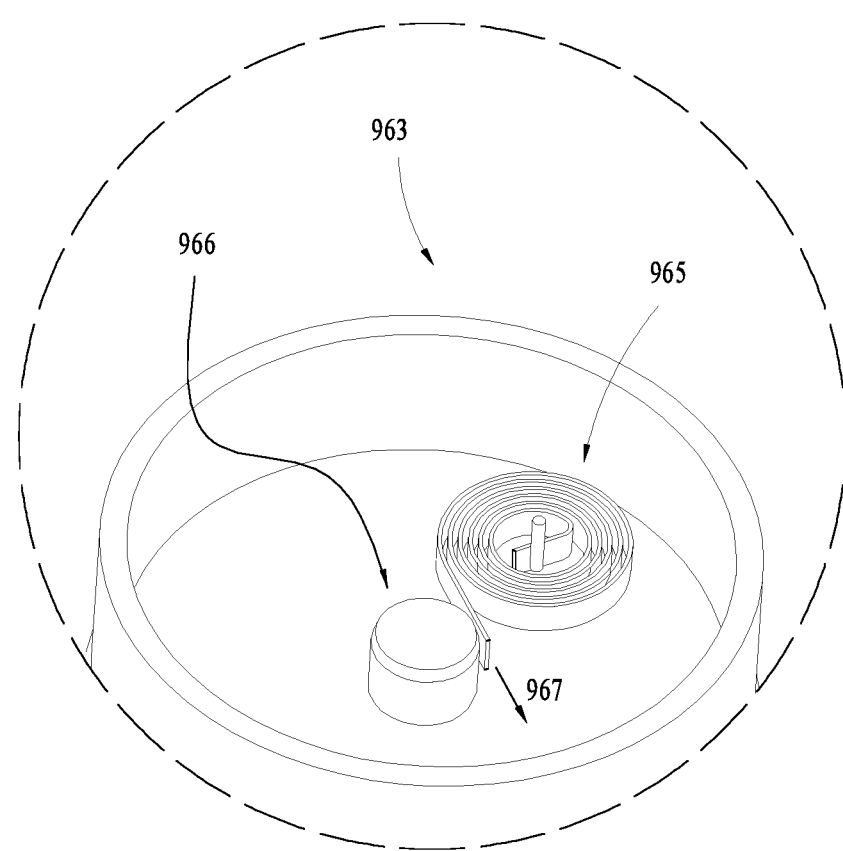
FIG. 13B is an enlarged view of a part of the structure in FIG. 13A.

Referring to FIGS. 13A and 13B, a grass trimmer includes a trimming head 961, a motor 962 and an energy storing device 963.

The motor 962 is used to drive the trimming head 961 to rotate so as to cut vegetation. The trimming head 961 includes a spool and a head housing. The spool is accommodated in the head housing. The detail structure of the trimming head 961 can refer to the trimming head 410 in FIGS. 4A-4D.

The grass trimmer includes a housing 964 for accommodating the motor 962. In some embodiments, the motor 962 is an electric motor having a motor shaft 966 for outputting power.

The grass trimmer has the function of auto-winding. The spool can be rotated relative to the head housing so that the cutting line winds on the spool automatically. Thus, the function of auto-winding is realized. The energy storing device 963 is able to drive one of the spool and the head housing to rotate relative to the other so as to realize the function of auto-winding. The motor 962 rotates to make the energy storing device 963 store energy. Then, the user can control the energy storing device 963 to release energy so as to realize the function of auto-winding.

In some embodiments, the energy storing device 963 is disposed within the housing 964, which is mounted on the top of the motor 962. The energy storing device 963 includes an elastic element 965 which is a coil spring. The coil spring is coupled with the motor shaft 966 on an end. When the motor shaft 966 is rotated, it drives the end of the coil spring to move in a direction indicated by an arrow 967. And the other end of the coil spring is fixed. At this moment, the coil spring stores energy. When it is needed to realize the function of auto-winding, the coil spring retracts to drive the motor shaft 966 to rotate reversely. The motor shaft 966 is connected with the spool or the head housing, so one of the spool or the head housing is driven by the motor shaft 966 to rotate relative to the other. Thus, the function of auto-winding is realized.

A method for controlling the grass trimmer, in particular a method for controlling the grass trimmer to wind the cutting line based on the embodiments described above is illustrated as flowing.

As described before, the grass trimmer at least includes the spool, the line holding member and the motor. The spool is used to mount the cutting line. In some embodiments, the cutting line can be mounted on the spool in a winding method or other method such as storing. The main function of the line holding member is similar to the function of the fingers against the cutting line while winding the cutting line with hands. That is the line holding member produces a limiting effect to make the cutting line revolve (taking the spool as a reference) and allow the cutting line to pass the line holding member and wind on the spool. The motor can drive one of the spool and the line holding member, so that the line holding member simulates the relative motion pattern of the hand and the spool when mounting the cutting line manually. That is, the relative rotation is created between the spool and the line holding member.

In is noted that, the line holding member can be constituted by a housing for accommodating the spool. For example, the head housing can be acted as the line holding member.

Figure 14A:
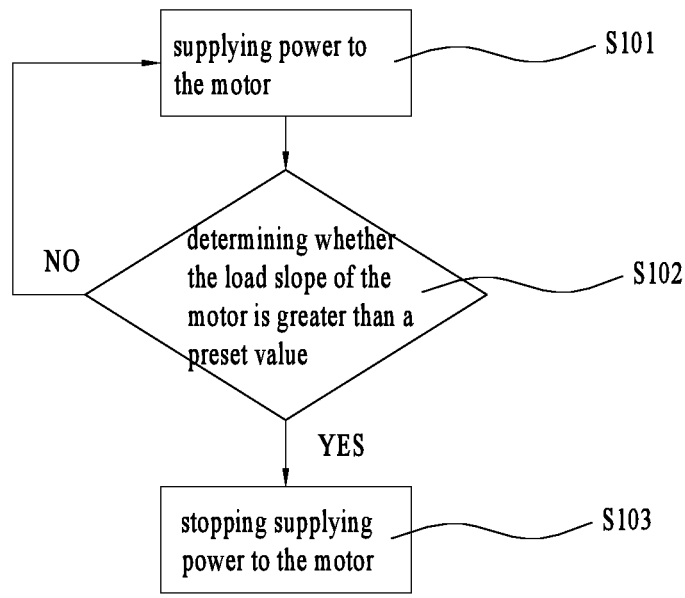
FIG. 14A is a flow diagram showing a control method for controlling winding of a grass trimmer.

As shown in FIG. 14A, the control method includes: S101 supplying power to the motor so as to produce a relative rotation between the spool and the line holding member. In some embodiments, the control method supplies power to the motor when the grass trimmer is operated by the user. The power supplied to the motor can be electric energy.

Further, the grass trimmer includes a controller and an operating element. The controller is used to control whether to supply power to the motor. When the operating element is activated by the user, the grass trimmer is controlled by the controller to supply power to the motor. Alternatively, if the operating element is activated again, the grass trimmer is controlled by the controller to stop supplying power to the motor.

Further, the grass trimmer includes another operating element. When the operating element is activated again, the grass trimmer is controlled by the controller to stop supplying power to the motor. Alternatively, the two different operating elements are needed to be pressed to make the grass trimmer supply power to the motor.

Otherwise, the grass trimmer can be stopped from supplying power to the motor in an automatic method. The operating method includes: S101 supplying power to the motor, S102 determining whether the load slope of the motor is greater than a preset value, and S103 stopping supplying power to the motor. In some embodiments, the controller determines whether to stop supplying power to the motor according to the load slop of the motor (the slope in the present disclosure should be considered as including mathematic definition which indicates rising tendency such as be derivative). When the load slope of the motor is greater than the preset value, the grass trimmer is controlled automatically to stop supplying power to the motor. When the load slope of the motor isn't greater than the preset value, the grass trimmer is controlled to supply power to the motor continuously. The load state can be determined according to the speed or the speed slope of the motor. When the speed slope is less than a preset value, the controller stops supplying power to the motor.

When the motor is an electric motor, the current slope of the electric motor can be used to make a similar judgement control. In some embodiments, when the current slope of the electric motor is greater than a preset value, the controller stops supplying power to the motor.

Figure 14B:
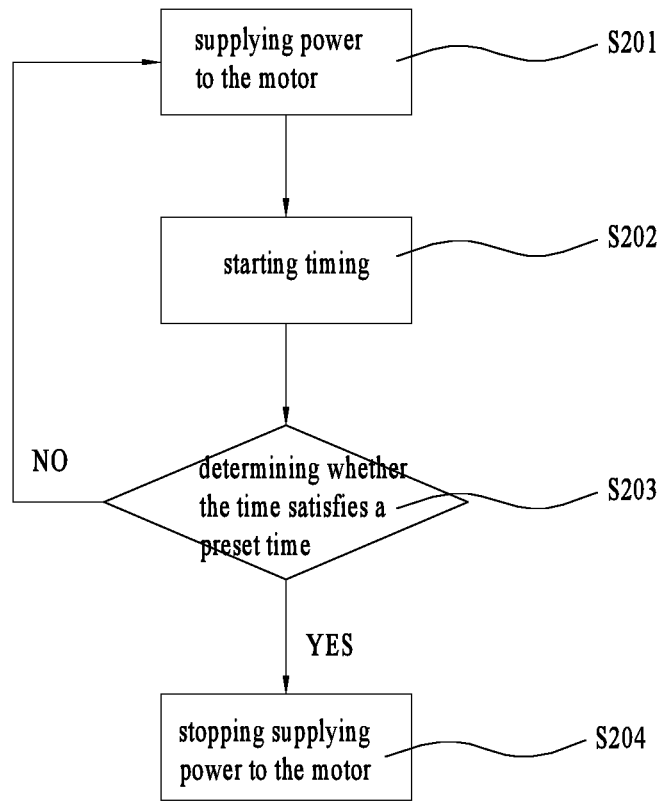
FIG. 14B is another flow diagram showing a control method for winding of a grass trimmer.

As shown in FIG. 14B, alternatively, the control method can use a timing method. The control method includes: S201 supplying power to the motor, S202 starting timing, S203 determining whether the time satisfies a preset time, and S204 stopping supplying power to the motor. In some embodiments, when the grass trimmer is controlled by the controller to supply power to the motor, timing is started. When the time satisfies the preset time, the grass trimmer is controlled to stop supplying power to the motor. when the time does not satisfy the preset time, the grass trimmers controlled to supply power to the motor continuously.

Otherwise, the motor can be provided with different power so that the spool and the line holding member can rotate at a first relative speed and a second relative speed respectively. The speed of the motor can be changed, so the relative rotation speed between the spool and the line holding member can be changed. However, when the grass trimmer supplies power to the motor to mount the cutting line, the relative rotation speed between the spool and the line holding member should be less than the rotation speed of the cutting line or the spool while the cutting line is cutting vegetation.

Figure 14C:
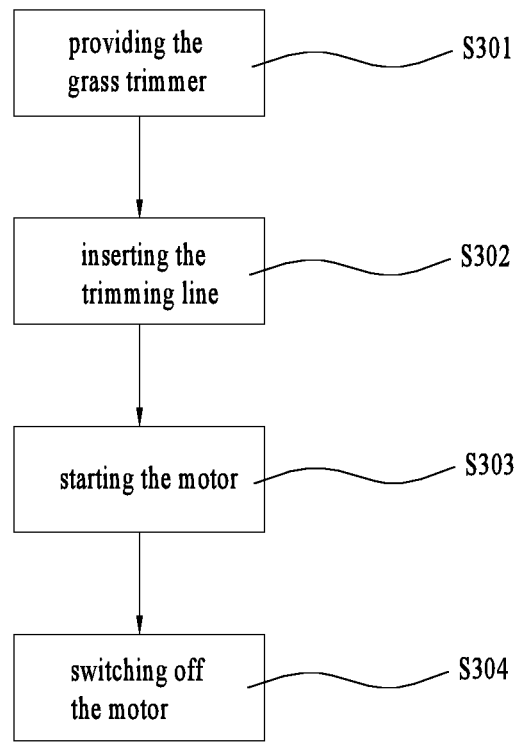
FIG. 14C is a flow diagram showing an operating method for winding of a grass trimmer

As shown in FIG. 14C, a method for operating the grass trimmer to wind the cutting line is illustrated as following. The method mainly includes the following steps:

S301 providing the grass trimmer.

In this step, the grass trimmer includes the spool for winding the cutting line, line holding member being formed with line holding structure allowing the cutting line to pass through and the motor being capable of driving one of the spool and the line holding member.

However, the grass trimmer in this step can be the grass trimmer in the foregoing examples. It is noted that the line holding member is detachable.

S302 inserting the cutting line.

In this step, the cutting line is associated with the line holding member and inserted in the spool. As for associating the cutting line with the line holding member, it is dependent on the specific form of the line holding member and the line holding structure, which can refer to the examples described above. Similarly, inserting in the spool can be understood as inserting in the holes or apertures formed on the spool or other structure which can limit the ends of the cutting line to hold the cutting line thereon. This step can make both the spool and the line holding structure act on the cutting line so as to get ready to mount the cutting line.

S303 starting the motor.

The user can start the motor through the operating element or an action activating the sensor disposed on the grass trimmer, so that the relative rotation is produced between the spool and the line holding member.

S303 switching off the motor.

The user can switch off the motor to make the spool and the line holding member be relatively static. However, the controller of the grass trimmer can be used to determine when to switch off the motor.

Alternatively, the operating element disposed on the grass trimmer can be triggered to start the motor, and the motor can be switched off by triggering the operating element once again or by triggering another operating element.

The above illustrates and describes basic principles, main features and advantages of the present disclosure. Those skilled in the art should appreciate that the above embodiments do not limit the present disclosure in any form. Technical solutions obtained by equivalent substitution or equivalent variations all fall within the scope of the present disclosure.

What is claimed is:

1. A grass trimmer, comprising:
   a trimming head;
   a driving device for driving the trimming head to rotate so as to cut vegetation; and
   an operating device configured for a user to operate to control the grass trimmer;
   wherein the trimming head comprises a spool and a line holding member, the spool is used to wind a cutting line, and the line holding member includes a line holding structure allowing the cutting line to pass through or bypass,
   wherein the driving device comprises a motor, the grass trimmer has a cutting mode for cutting vegetation and an auto-winding mode for winding the cutting line onto the spool, in the auto-winding mode, the motor drives at least one of the spool and the line holding member to make the spool and the line holding member rotate relatively to wind the cutting line on the spool, and
   the operating device comprises a first operating element for activating the cutting mode and a second operating element for activating the auto-winding mode.

2. The grass trimmer of claim 1, wherein the:
   a first operating element is used for the user to operate to start the motor, and
   the second operating element for the user to operate so as to choose the auto-winding mode.

3. The grass trimmer of claim 1, wherein:
   a first operating element for starting the motor so that the motor runs in a first running state, and
   the second operating element for starting the motor so that the motor runs in a second running state.

4. The grass trimmer of claim 3, wherein a rotation direction of the motor in the first running state is different from the rotation direction of the motor in the second running state.

5. The grass trimmer of claim 4, wherein a rotation speed of the motor in the first running state is different from the rotation speed of the motor in the second running state.

6. The grass trimmer of claim 1, wherein the grass trimmer comprises a damping device for damping at least one of the spool and the line holding member.

7. The grass trimmer of claim 6, wherein the damping device comprises a damping element for applying a resistance force on the spool to stop the spool from rotating.

8. The grass trimmer of claim 6, wherein the damping device comprises a damping element for applying a resistance force on the line holding member to damp the rotation of the line holding member.

9. The grass trimmer of claim 6, wherein the line holding member is rotated in a first direction in the auto-winding mode, and the damping device comprises a damping element for stopping the spool from rotating in the first direction.

10. The grass trimmer of claim 6, wherein the spool is rotated in a second direction in the auto-winding mode, and the damping device comprises a damping element for stopping the line holding member from rotating in the second direction.

11. The grass trimmer of claim 1, wherein
the line holding member comprises a head housing for accommodating the spool, the head housing includes an outer aperture allowing the cutting line to pass through, and the spool includes an inner aperture for fixing the cutting line or allowing the cutting line to pass through,
in the cutting mode, the spool and the head housing are rotated synchronously, and when the cutting mode is finished, the outer apertures and the inner apertures are aligned in a circumferential direction.

12. The grass trimmer of claim 1, wherein the grass trimmer comprises a line breaking device for cutting off the cutting line in the auto-winding mode.

13. The grass trimmer of claim 12, wherein the line breaking device comprises a line breaking element, the trimming head is rotatable with respect to the line breaking element, and in the auto-winding mode, the trimming head drives the cutting line to pass the line breaking element so as to cut off the cutting line.

14. The grass trimmer of claim 12, wherein the line breaking device comprises a line breaking element, the trimming head and the line breaking element are rotated synchronously, and in the auto-winding mode, the trimming head drives the cutting line to close to the line breaking element so as to cut off the cutting line.

15. The grass trimmer of claim 1, wherein in the cutting mode, the trimming head and the line holding member are rotated synchronously, the trimming head is rotated in a first direction in the cutting mode, and one of the spool and the line holding member is rotated relative to the other in a second direction in the auto-winding mode.

16. The grass trimmer of claim 15, wherein the driving mechanism is in a first driving state in the cutting mode and in a second driving state in the auto-winding mode, the first driving state is different from the second driving state.

17. The grass trimmer of claim 15, wherein the motor is rotated along a first direction in the cutting mode and rotated along a second direction in the auto-winding mode.

18. The grass trimmer of claim 15, wherein the motor is rotated at a first speed in the cutting mode and rotated at a second speed in the auto-winding mode, the first speed is different from the second speed.

19. The grass trimmer of claim 15, wherein the motor is rotated along a first direction at a first speed in the cutting mode and rotated along a second direction at a second speed in the auto-winding mode, and the first speed is higher than the second speed.

20. The grass trimmer of claim 19, wherein a ratio between the first speed and the second speed is greater than or equal to 5 and less than or equal to 300.

21. The grass trimmer of claim 1, wherein the grass trimmer comprises:
a detecting device configured to detect a physical parameter for determining whether the winding of the cutting line is finished,
a controller configured to control the motor so as to make the grass trimmer exit the auto-winding mode according to electric signal of the detecting device.

22. The grass trimmer of claim 21, wherein the detecting device is electrically connected with the motor to detect current of the motor.

23. The grass trimmer of claim 22, wherein the controller cuts off power of the motor when the current of the motor is greater than a preset value.

24. The grass trimmer of claim 22, wherein the controller cuts off power of the motor when the current slope of the motor is greater than a preset value.

25. The grass trimmer of claim 21, wherein the grass trimmer comprises a magnetic element mounted on one of the spool and the line holding member, and the detecting device comprises a Hall sensor for detecting the magnetic element,
wherein the controller determines the rotation speed of the magnetic element according to a signal of the Hall sensor, and
when the rotation speed of the magnetic element reaches a preset value, the grass trimmer exits the auto-winding mode.

26. The grass trimmer of claim 21, wherein the grass trimmer comprises a magnetic element mounted on one of the spool and the line holding member, and the detecting device comprises a Hall sensor for detecting the magnetic element,
wherein the controller determines the rotation number of the magnetic element according to a signal of the Hall sensor, and
when the rotation number of the magnetic element reaches a preset value, the grass trimmer exits the auto-winding mode.

27. The grass trimmer of claim 21, wherein the detecting device detects the rotation speed of the motor, and when the rotation speed of the motor reaches a preset value, power of the motor is cut off.

28. The grass trimmer of claim 21, wherein the detecting device detects the rotation number of the motor, and when the rotation number of the motor reaches a preset value, power of the motor is cut off.

29. The grass trimmer of claim 21, wherein the detecting device comprises a position sensor for detecting a position of the cutting line.

* * * * *